(12) United States Patent
Anwar et al.

(10) Patent No.: US 12,505,106 B1
(45) Date of Patent: Dec. 23, 2025

(54) REASSIGNMENT OF PROCESSING NODES

(71) Applicant: Cisco Technology, Inc., San Jose, CA (US)

(72) Inventors: Tameem Anwar, San Francisco, CA (US); Alexandros Batsakis, San Francisco, CA (US); Tianyi Gou, San Francisco, CA (US); Mehul Goyal, Pleasanton, CA (US); Ashish Mathew, San Mateo, CA (US); Douglas Rapp, San Francisco, CA (US); Sai Krishna Sajja, Union City, CA (US); Anish Shrigondekar, Sunnyvale, CA (US); Igor Stojanovski, San Francisco, CA (US); Eric Woo, San Francisco, CA (US); Zhenghui Xie, Cupertino, CA (US); Ruochen Zhang, Milpitas, CA (US); Sophia Rui Zhu, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/735,936

(22) Filed: Jun. 6, 2024

Related U.S. Application Data

(63) Continuation of application No. 18/123,758, filed on Mar. 20, 2023, now Pat. No. 12,019,634, which is a continuation of application No. 17/162,536, filed on Jan. 29, 2021, now Pat. No. 11,609,913.

(60) Provisional application No. 63/092,639, filed on Oct. 16, 2020.

(51) Int. Cl.
*G05B 23/02* (2006.01)
*G06F 16/2455* (2019.01)
*G06F 16/2458* (2019.01)
*G06F 16/248* (2019.01)

(52) U.S. Cl.
CPC .. *G06F 16/24554* (2019.01); *G06F 16/24552* (2019.01); *G06F 16/2477* (2019.01); *G06F 16/248* (2019.01)

(58) Field of Classification Search
None
See application file for complete search history.

(56) References Cited

U.S. PATENT DOCUMENTS

| 10,162,875 | B2 * | 12/2018 | Hattori | G06F 11/2097 |
| 10,474,544 | B1 * | 11/2019 | Li | G06F 11/0709 |
| 10,740,009 | B2 * | 8/2020 | Chen | G06F 3/0629 |
| 10,795,735 | B1 * | 10/2020 | Potnis | G06F 11/2048 |
| 2019/0155714 | A1 * | 5/2019 | Zhang | G06N 5/025 |

* cited by examiner

*Primary Examiner* — Debbie M Le
(74) *Attorney, Agent, or Firm* — Shook, Hardy & Bacon L.L.P.

(57) ABSTRACT

A data intake and query system can manage the search of large amounts of data using one or more processing nodes. When a new processing node is added or becomes available, the node coordinator can reassign duties from one or more processing nodes to the new processing node. The node coordinator can initially assign the new processing node one or more groups of data for backup purposes. At a later time, the node coordinator can reassign the new processing node to the one or more groups of data for searching purposes.

20 Claims, 43 Drawing Sheets

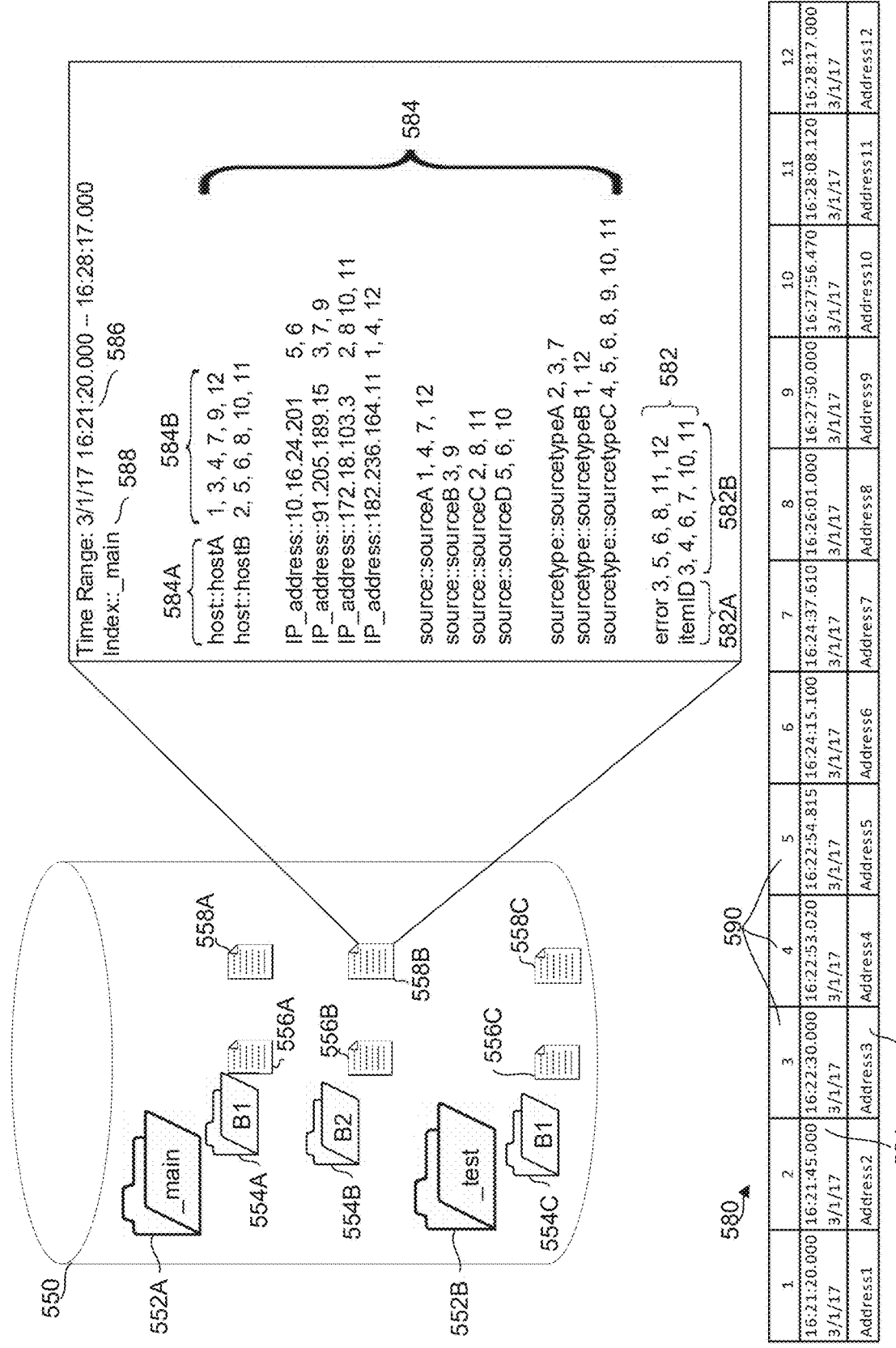

| Time | Host | Source | Source Type | Event |
|---|---|---|---|---|
| 10/10/2000 1:55 p.m. | www1 | access.log | access_combined | 127.0.0.1 -- frank [10/Oct/2000:13:55:36 -0700] "GET/apache.gif HTTP/1.0" 200 2326 0.0947 |
| 10/10/2000 1:56 p.m. | www2 | access.log | access_combined | 127.0.0.1 -- bob [10/Oct/2000:13:56:36 -0700] "GET/mickey_mouse.gif HTTP/1.0" 200 2980 0.0899 |
| 10/10/2000 1:57 p.m. | www2 | access.log | access_combined | 127.0.0.1 -- carbs [10/Oct/2000:13:57:36 -0700] "GET/donald_duck.gif HTTP/1.0" 200 2900 0.0857 |
| 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

Configuration File 716

Clientip = <set of events> | <regex rule> —— 717
Status_code = <set of events> | <regex rule>
Response_time = <set of events> | <regex rule>
Size_of_returned_object = <set of events> | <regex rule>

Search bar 710

Keyword Search Directly in Event Data

Search Time Field Extraction

FIG. 7B

| Row | Time | | Host | Source | Source Type | Event |
|---|---|---|---|---|---|---|
| 55000 | 10/10/2016 | 1:55 p.m. | www1 | access.log | access_combined | 127.0.0.1 - frank [10/Oct/2016:13:55:36 -0700] "GET /apache.gif HTTP/1.0" 200 2326 0.0947  *731* |
| 55001 | 10/10/2016 | 1:56 p.m. | www2 | access.log | access_combined | 127.0.0.2 - bob [10/Oct/2016:13:56:36 -0700] "GET /mickey_mouse.gif HTTP/1.0" 200 2980 0.0899  *732* |
| 55002 | 10/10/2016 | 1:57 p.m. | www2 | access.log | access_combined | 127.0.0.1 - carlos [10/Oct/2016:13:57:36 -0700] "GET /donald_duck.gif HTTP/1.0" 200 2900 0.0857 |
| 55003 | 10/10/2016 | 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 | 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 | 2:00 p.m. | www1 | access.log | access_combined | 127.0.0.1 - matt [10/Oct/2016:14:00:36 -0700] "GET /goofy.gif HTTP/1.0" 200 2920 0.0987  *733* |
| 55006 | 10/10/2016 | 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 | 2:02 p.m. | www1 | access.log | access_combined | 127.0.0.1 - jack [10/Oct/2016:14:02:36 -0700] "GET /muppets.gif HTTP/1.0" 200 5000 0.0667  *734* |

*723*

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

*722*

| Event Reference Value | Field Name | Field Value | User ID |
|---|---|---|---|
| 55000 | clientip | 127.0.0.1 | frank |
| 55005 | clientip | 127.0.0.1 | matt |

| Data Summary | | | |
|---|---|---|---|
| Hosts (5) | Sources (8) | Sourcetypes (3) | ✕ | filter

| Host ◊ | | Count ◊ | Last Update ◊ |
|---|---|---|---|
| mailsv | ⌄ | 9,829 | 4/29/14 1:32:47.000 PM |
| vendor_sales | ⌄ | 30,244 | 4/29/14 1:32:46.000 PM |
| www1 | ⌄ | 24,221 | 4/29/14 1:32:44.000 PM |
| www2 | ⌄ | 22,595 | 4/29/14 1:32:47.000 PM |
| www3 | ⌄ | 22,975 | 4/29/14 1:32:45.000 PM |

Original Search:
Search "error" | stats count BY host ← 1602

Sent to peers:
Search "error" | prestats count BY host ← 1604

Executed by search head:
Aggregate the prestats results received from peers ← 1606

REASSIGNMENT OF PROCESSING NODES

RELATED APPLICATIONS

Any and all applications for which a foreign or domestic priority claim is identified in the Application Data Sheet as filed with the present application are incorporated by reference under 37 CFR 1.57 and made a part of this specification. The present application is a continuation of U.S. Pat. No. 12,019,634, filed on Mar. 20, 2023 and entitled "REASSIGNING A PROCESSING NODE FROM DOWNLOADING TO SEARCHING A DATA GROUP," which is a continuation of U.S. Pat. No. 11,609,913, filed on Jan. 29, 2021 and entitled "REASSIGNING DATA GROUPS FROM BACKUP TO SEARCHING FOR A PROCESSING NODE," which claims priority to U.S. Provisional Patent Application No. 63/092,639, filed on Oct. 16, 2020 and entitled "USING PROCESSING NODE MAPS TO MANAGE DATA IN A DATA INTAKE AND QUERY SYSTEM," each of which is hereby incorporated by reference.

U.S. patent application Ser. No. 17/162,536 was filed on Jan. 29, 2021 concurrently with the following U.S. Patent Applications, each of which is incorporated by reference herein in its entirety:

| U.S. patent application No. | Patent Application Title | Filing Date |
|---|---|---|
| 17/162477 | USING PROCESSING NODE MAPS TO INCREMENTALLY ASSIGN ADDITIONAL DATA GROUPS TO A PROCESSING NODE | Jan. 29, 2021 |
| 17/162491 | SEARCHING BUCKETS IDENTIFIED BY A NODE COORDINATOR AND BUCKETS GENERATED BY A SEARCH NODE | Jan. 29, 2021 |

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems preprocess data based on anticipated data analysis needs. In particular, specified data items may be extracted from the generated data and stored in a data system to facilitate efficient retrieval and analysis of those data items at a later time. At least some of the remainder of the generated data is typically discarded during preprocessing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements and in which:

FIGS. 5B and 5C are block diagrams illustrating embodiments of various data structures for storing data processed by the data intake and query system.

FIG. 7B illustrates an example of processing keyword searches and field searches, in accordance with disclosed embodiments.

FIG. 7C illustrates an example of creating and using an inverted index, in accordance with example embodiments.

FIG. 8A is an interface diagram of an example user interface for a search screen, in accordance with example embodiments.

FIG. 8B is an interface diagram of an example user interface for a data summary dialog that enables a user to select various data sources, in accordance with example embodiments.

FIGS. 9, 10, 11A, 11B, 11C, 11D, 12, 13, 14, and 15 are interface diagrams of example report generation user interfaces, in accordance with example embodiments.

DETAILED DESCRIPTION

Figure 1:
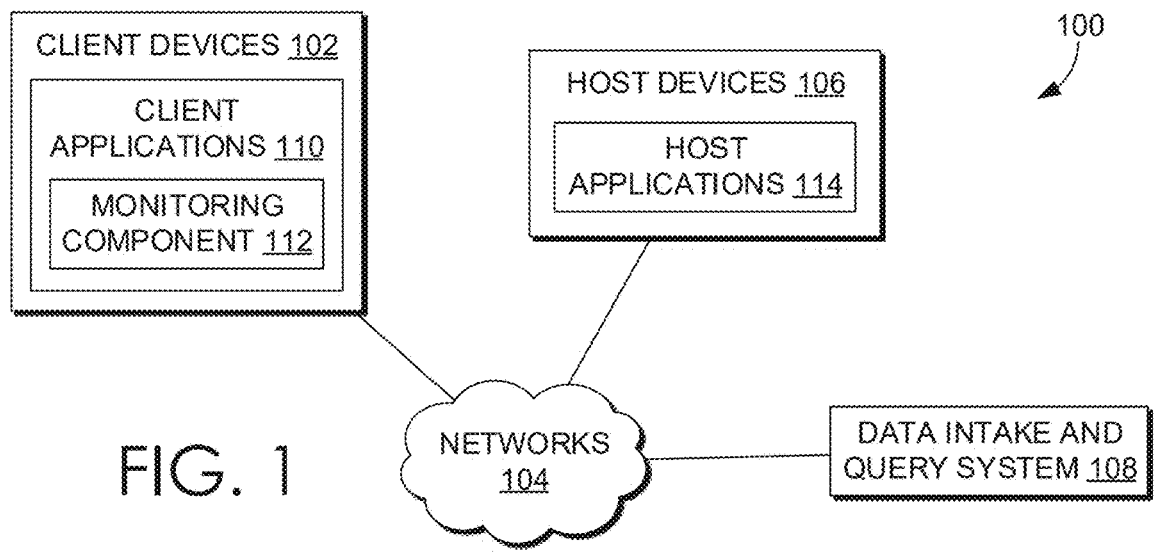
FIG. 1 is a block diagram of an example networked computer environment, in accordance with example embodiments.

Embodiments are described herein according to the following outline:

1.0. General Overview
2.0. Operating Environment
  2.1. Host Devices
  2.2. Client Devices
  2.3. Client Device Applications
  2.4. Data Server System
  2.5. Data Server System with Ingestor, Message Bus, and node coordinator
  2.6. Cloud-Based System Overview
  2.7. Searching Externally-Archived Data
  2.8. Data Ingestion
  2.9. Query Processing
  2.10. Pipelined Search Language
  2.11. Field Extraction
  2.12. Example Search Screen
  2.13. Data Models
  2.14. Acceleration Technique
  2.15. Security Features
  2.16. Data Center Monitoring
  2.17. IT Service Monitoring
3.0. Processing Data Using Ingestors and a Message Bus
  3.1. Ingestor Data Flow example
  3.2. Ingestor Flow Examples
  3.3. Indexer Data Flow example
  3.4. Indexer Flow examples
4.0. Using a Node coordinator and Processing node map identifiers to Manage Data
  4.1. Recovering Pre-Indexed Data Following a Failed Indexer
  4.2. Mapping Groups of Data and Indexers to a Processing node map identifier for Searching
  4.3. Searching Buckets Identified By The Node coordinator And Buckets Generated By The Search Node
  4.4. Search Recover Using a Shared Storage System Following a Failed Search Peer
  4.5. Using Processing Node Maps To Incrementally Assign Additional Data Groups To A Processing Node
    4.5.1. Iterative Processing Node Maps
    4.5.2. Iterative Processing Node Map Flow
  4.6. Reassigning Data Group From Backup To Searching For A Processing Node
    4.6.1 Data Group Reassignment Flow
  4.7. Using Processing Node Maps And Data Group Reassignments To Transition A Processing Node Into Use
5.0 Example Embodiments
6.0. Terminology 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters forms a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LAN, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, an environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2A:
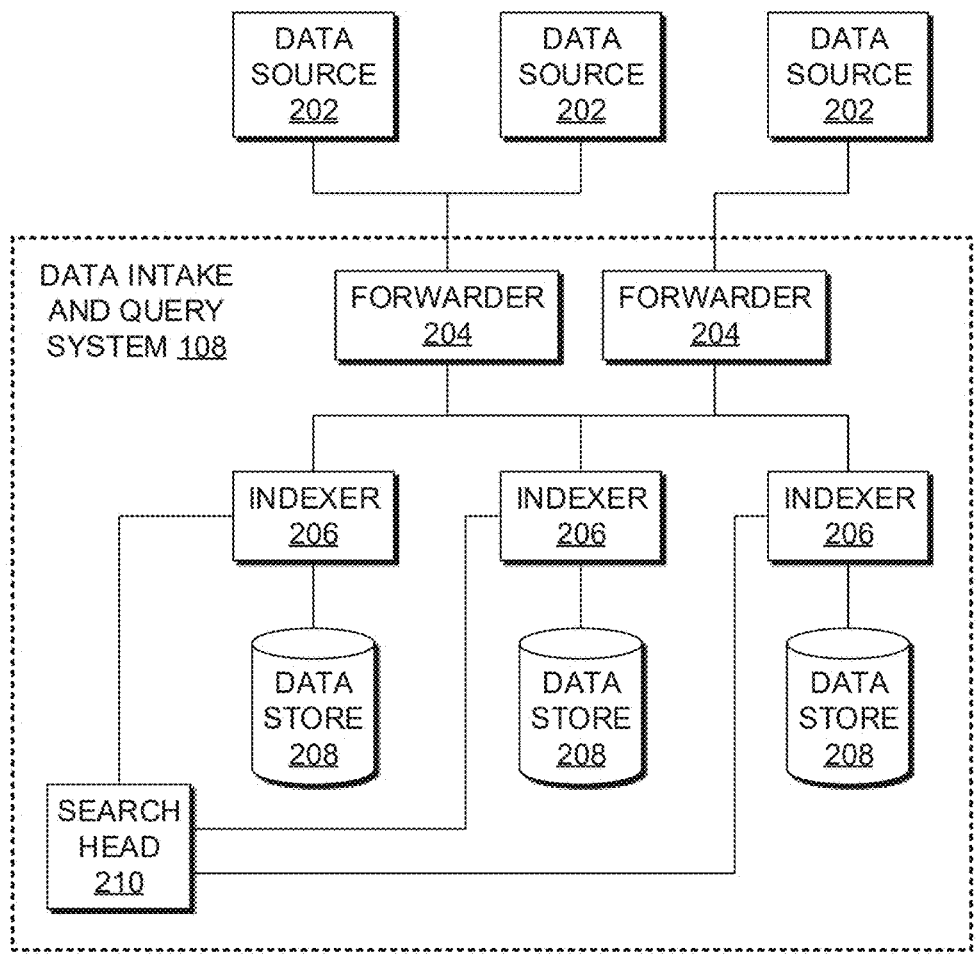
FIG. 2A is a block diagram of an example data intake and query system, in accordance with example embodiments.

FIG. 2A is a block diagram of an example data intake and query system 108, in accordance with example embodiments. System 108 includes one or more forwarders 204 that receive data from a variety of input data sources 202, one or more indexers 206 that process and store the data in one or more data stores 208, and one or more search heads 210 that are used to search the data in the data stores 208 and/or other data that is accessible via the data intake and query system 108. The various components of the data intake and query system 108 can be implemented on separate computer systems, or any one or any combination of the components may be implemented separate processes executing on one or more computer systems.

Each data source 202 broadly represents a distinct source of data that can be consumed by system 108. Examples of a data sources 202 include, without limitation, data files, directories of files, data sent over a network, event logs, registries, etc. In some embodiments, each data source can correspond to data obtained from a different machine, virtual machine, container, or computer system. In certain embodiments, each data source can correspond to a different data file, directories of files, event logs, or registries, of a particular machine, virtual machine, container, or computer system.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In certain embodiments, a forwarder 204 may be installed on a data source 202. In some such embodiments, the forwarder 204 may run in the background as the host data source 202 performs its normal functions. In some embodiments, a forwarder 204 may comprise a service accessible to data sources, such as client devices 102 and/or host devices 106, via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206.

Forwarders 204 route data to indexers 206. A forwarder 204 may also perform many of the functions that are performed by an indexer 206. For example, a forwarder 204 may perform keyword extractions on raw data or parse raw data to create events. A forwarder 204 may generate time stamps for events. Additionally, or alternatively, a forwarder 204 may perform routing of events to indexers 206.

Indexers 206 can be implemented as one or more distinct computer systems or devices and/or as one or more virtual machines, containers, PODS, or other isolated execution environment. The indexers 206 can perform a number of operations on the data they receive including, but not limited to, keyword extractions on raw data, removing extraneous data, detecting timestamps in the data, parsing data, creating events from the data, grouping events to create buckets, indexing events, generating additional files, such as inverted indexes or filters to facilitate performant searching, storing buckets, events, and/or any additional files in the data stores 208, and searching events or data stored in the data stores 208. Additional functionality of the indexers will be described herein.

The data stores 208 can be implemented as separate and distinct data stores and/or be implemented as part of a shared computing system or cloud storage system, such as, but not limited to Amazon S3, Google Cloud Storage, Azure Blob Storage, etc. Each data store 208 can be associated with a particular indexer 206 and store the events, buckets, or other data generated or processed by the particular indexer 206. Accordingly, a data store 208 may contain events derived from machine data from a variety of sources. The events may all pertain to the same component in an IT environment, and this data may be produced by the machine in question or by other components in the IT environment.

The search head 210 can be implemented as one or more distinct computer systems or devices and/or as one or more virtual machines, containers, PODS, or other isolated execution environment. The search head 210 can receive search requests from one or more client devices 102 or other devices. Based on the received search requests (also referred to herein as query or search query), the search head 210 can interact with the indexers 206 or other system components to obtain the results of the search request. As described herein, the received queries can include filter criteria for identifying a set of data and processing criteria for processing the set of data. The processing criteria may transform the set of data in a variety of ways, as described herein. Additional functionality of the search head 210 will be described herein.

2.5. Data Server System with Ingestor, Message Bus, and Node Coordinator

In some cases, forwarders 204 can prefer certain indexers 206 and send large quantities of data to the same indexer 206 even if other indexers 206 have more capacity. In such situations, this can decrease the throughput and performance of the data intake and query system 108. In addition, it can be difficult to update forwarders 204 given that they may be remotely located from the indexers 206, installed on a third party's system, and/or under the control of a third party. Further, given the number of tasks assigned to an indexer 206, if an indexer 206 fails, there can be a significant amount of processing to be redone.

Accordingly, in some cases, the data intake and query system 108 can include one or more ingestors and a message bus. The ingestors can be separate from the indexers 206 and perform some of the tasks of the processors, such as generating events from data. After generating the events, the ingestors can group the events and send the groups of events to the message bus. The ingestor can also track which events have been sent to the message bus and send an acknowledgement to a forwarder or other source.

Separately, indexers 206 can monitor their capacity to process or index additional data, and based on a determination that a particular indexer 206 has capacity to process additional data, the indexer 206 can request the group of events from the message bus, process the group of event, and store the events to a shared storage system 260.

In this way, the data intake and query system can increase its throughput, resiliency and performance. By splitting event generation tasks (assigned to ingestors) from indexing tasks (assigned to indexers), the system 108 can dynamically and independently scale ingestors to accommodate additional ingestion load and/or independently scale indexers to accommodate additional indexing load, thereby increasing the throughput of the system 108. When the amount of ingestion or indexing load decreases, the system 108 can dynamically and independently remove ingestors or indexers, respectively, thereby improving efficiency and resource utilization. Thus, the system 108 can have a different number of components generating events and indexing events.

By sending an acknowledgement when the events are on the message bus, the system 108 can reduce the amount of time to send an acknowledgment of data receipt, thereby improve the system's 108 responsiveness to sources and freeing up resources of the source for other tasks.

In addition, by keeping generated events on the message bus, the system 108 can improve resiliency in the event an indexer 206 fails. In such a scenario, because the events are already generated and available, another indexer 206 can skip event generation tasks and begin indexing tasks thereby increasing efficiency of the system and decreasing processing time.

By relying on a pull-based system or asynchronous processing, the system 108 can improve the load balancing or processing load across indexers 206. Specifically, as indexers 206 have capacity to handle additional tasks they can request them rather than having tasks assigned to them regardless of their backlog. Thus, indexers 206 with more resources or capacity can process more data. This too can increase the throughput of the system 108.

By providing event processing and routing closer to the forwarders 204, the system 108 can reduce its reliance on third parties updating the forwarders. Instead additional processing and routing functionality can be provided via the ingestors and/or message bus.

Figure 2B:
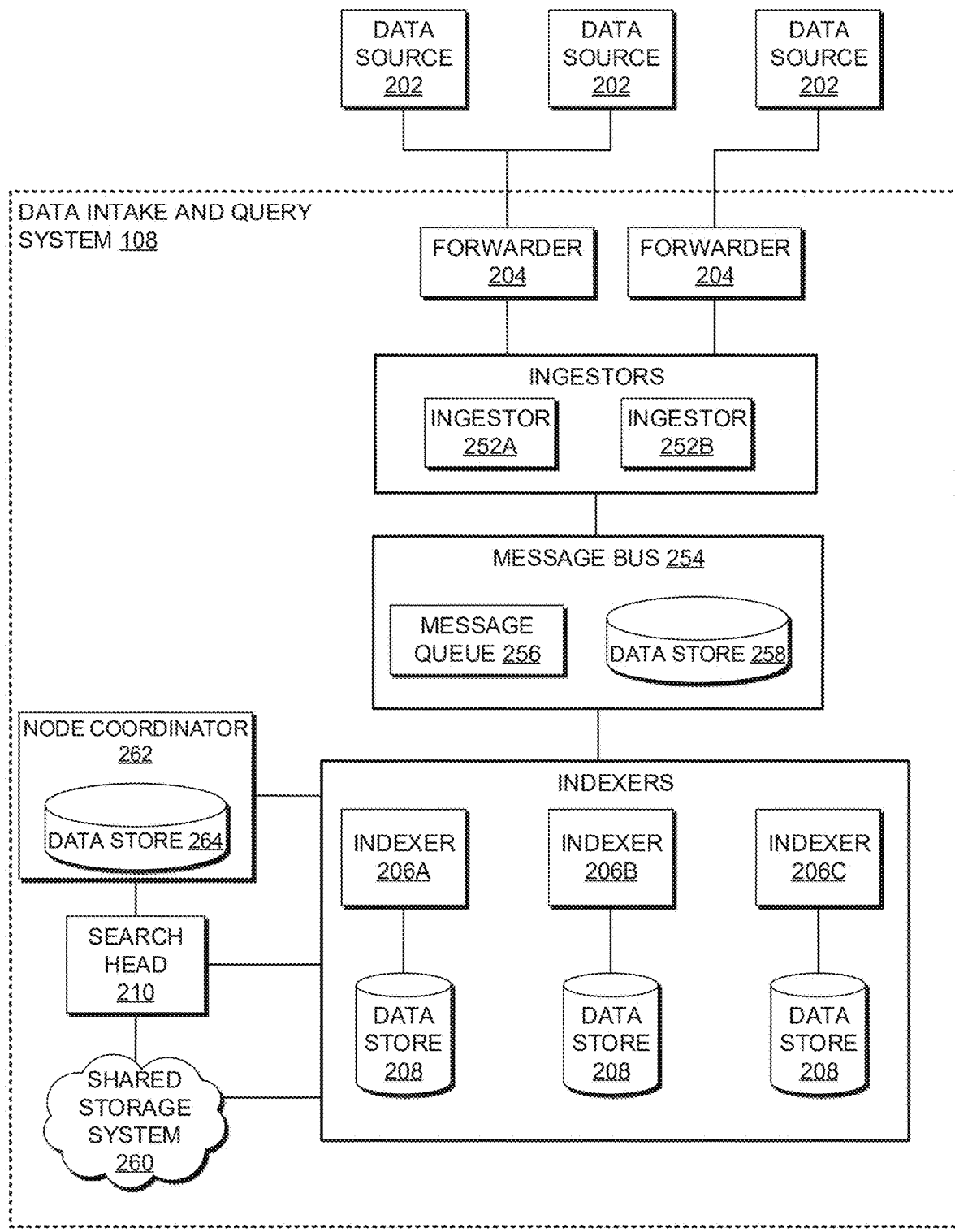
FIG. 2B is a block diagram of an example data intake and query system, in accordance with example embodiments.

FIG. 2B is a block diagram of an embodiment of the data intake and query system 108 that includes ingestors and a message bus. In the illustrated embodiment, the data intake and query system 108 can include one or more forwarders 204A, 204B (individually or collectively referred as forwarder 204 or forwarders 204, also referred to herein as forwarding agents) that receive data from one or more data sources 202, a search head 210, indexers 206A, 206B, 206C (individually or collectively referred as indexer 206 or indexers 206 also referred to herein as indexing nodes), ingestors 252A, 252B (individually or collectively referred as ingestor 252 or ingestors 252, also referred to herein as ingestion or ingesting nodes), a message bus 254, a node coordinator 262, and a shared storage system 260. It will be understood that the components illustrated in FIG. 2B are for illustrative purposes only and that the data intake and query system 108 can include fewer or more components. For example, the data intake and query system 108 can include more or less than three indexers 206, more or less than two ingestors 252, etc. The data sources 202, forwarders 204, indexers 206, and search head 210 in the illustrated embodiment of FIG. 2B can perform functions similar to the data sources 202, forwarders 204, indexers 206, and search head 210 described herein at least with reference to FIG. 2A. For example, one or more forwarders 204 (or forwarding agents) can be installed on each data sources 202, collect data from the data sources 202, and forward the collected data to the indexers 206. In certain embodiments, the communications between certain components of the data intake and query system 108 illustrated in FIG. 2A may be different from the communications between components of the data intake and query system 108 illustrated in FIG. 2B. For example, the forwarders 204 may forward data to the ingestors 252 and the indexers 206 may receive data from the message bus 254.

Although FIG. 2B illustrates some example communication pathways between various components of the data intake and query system 108, it will be understood that the components can be configured to communicate in a variety of ways. For example, any component may be configured to communicate with any other component (e.g., the node coordinator 262 can communicate with the shared storage system 260 or forwarders 204, etc.). In certain embodiments, certain components may be limited in their communications with other components. For example, the node coordinator 262 may not be communicatively coupled with the shared storage system 260. As another example, the forwarders 204 may be configured to communicate with the data sources 202 and ingestors 252, but not the indexers 206. In a similar manner, the ingestors 252 may be configured to communicate with the forwarders 204 and message bus 254, but not with the indexers 206. Each of the indexers 206 may be configured to communicate with the search head 210, message bus 254, node coordinator 262, and/or shared storage system 260, but may not be configured to communicate with the data sources 202, forwarders 204, or ingestors 252. Further, the data intake and query system 108 can include additional components which can communicate with any one or any combination of the aforementioned components. For example, the data intake and query system can include a HEC or other component that forwards data to the ingestors 252.

In some embodiments, some or all of the shared storage system 260, the search head 210, the indexers 206, the node coordinator 262, and/or the node coordinator data store 264 may be communicatively coupled. For example, any of the indexers 206 may be configured to individually communicate with any of the shared storage system 260, the search head 210, the node coordinator 262, and/or the node coordinator data store 264.

The shared storage system 260 can correspond to or be implemented as cloud storage, such as Amazon Simple Storage Service (S3) or Elastic Block Storage (EBS), Google Cloud Storage, Microsoft Azure Storage, etc. The shared storage system 260 can be made up of one or more data stores storing data that has been received from one or more data sources 202 and/or processed by the indexers 206. The shared storage system 260 can be configured to provide high availability, highly resilient, low loss data storage. In some cases, to provide the high availability, highly resilient, low loss data storage, the shared storage system 260 can store multiple copies of the data in the same and different geographic locations and across different types of data stores (e.g., solid state, hard drive, tape, etc.). Further, as data is received at the shared storage system 260 it can be automatically replicated multiple times according to a replication factor to different data stores across the same and/or different geographic locations.

Although only three indexers 206A, 206B, 206C (a first indexer 206A, a second indexer 206B, and a third indexer 206C, individually or collectively referred to as indexer 206 or indexers 206) and three data stores 208 are illustrated, it will be understood that the system 108 can include fewer or additional indexers 206 and/or data stores 208.

In addition, it will be understood that any one or any combination of the aforementioned components can be removed from the system 108. For example, in some cases, the system 108 can be implemented without ingestors 252. In some such cases, data from the forwarders 204 can be sent to the message bus 254, and indexers 206 can retrieve the data from the message bus 254, as described herein. In such cases, the system 108 can obtain the benefits of a pull-based system for ingesting and processing data, which can improve the load balancing between indexers 206. As another example, in certain cases, the system e108 can be implemented without a message bus 254. In some such cases, the ingestor 252 can generate events and the indexers 206 can index the events, as described herein. In such cases, the system 108 can obtain the benefits of divorcing ingestion/event generation from event indexing. As such, the system 108 can independently scale ingestors 252 and/or indexers 206 as desired. In yet other cases, the ingestors 252 and message bus 254 can be omitted. In some such cases, the indexers 206 can generate events, place the events in hot slices, roll the hot slices to warm slices and add them to an aggregate slice, and store the aggregate slice to the shared storage system 260, as described herein. In such cases, the system 108 can obtain the benefits of creating backup copies of the events/slices/buckets that are being processed by an indexers 206. Accordingly, it will be understood that the system 108 can be modified in a variety of ways and include various implementations.

2.5.1. Ingestor

The ingestors 252 (also referred to herein as ingestion nodes) can be implemented as one or more distinct computer systems or devices and/or as one or more virtual machines, containers, PODS, or other isolated execution environment that is isolated from other execution environments of a host computing system. In some embodiments, the ingestors 252 can receive events or data (e.g., log data, raw machine data, metrics, etc.) from a forwarder 204 or other source or component of the data intake and query system 108 (e.g., HEC, search head, etc.), perform keyword extractions on raw data, parse raw data, generate time stamps, and/or otherwise generate events from the raw data. As such, the ingestors 252 can perform certain functions that would typically be performed by the indexers 206. Accordingly, in certain embodiments in which the data intake and query system 108 includes ingestors 252, the ingestors 252 can be responsible for creating or generating events from received data and the indexers 206 can be responsible for combining events into buckets, indexing events in those buckets, and storing the buckets (locally and/or to the shared storage system 260). In certain embodiments that include a forwarder 204 or other component configured to generate events and an ingestor 252, the forwarder 204 (or other component) can forward the generated events to an ingestor 252 and the ingestor can provide the generated events to an indexer 206 (either directly or via the message bus 254).

By including an ingestor 252, the throughput and data resiliency of the data intake and query system can be improved. First, by having ingestors 252 that can be scaled up and down independent of the indexers 206, the data intake and query system 108 can more easily respond to increases or decreases in data to be ingested or data to be indexed. Further a slow indexer 206 need not affect the ingestion of data from forwarders 204 or other sources. Second, by splitting up the processing tasks of the indexer 206 between the indexers 206 and the ingestors 252, the data intake and query system 108 can increase its data resiliency given that each component will be operating on the data for less time. Further, by having the message bus 254 store the events after creation but before indexing, the data intake and query system can reduce the amount of processing required if an indexer 206 fails.

An ingestor 252 can use one or more processing pipelines, pipeline sets, buffers or queues (also referred to as producer-consumer queues), and/or computer processing threads to perform its functions. Each pipeline can perform one or more processing functions on data and may be implemented using one or more processing threads. A collection of pipelines can be placed sequentially such that the output of one pipeline can form the input of a subsequent pipeline thereby forming a pipeline set. The buffers or queues can be used to temporarily maintain results of a pipeline and/or be used to collect data for further processing by additional pipelines or for communication. The buffers or queues may also provide some relief in the event a downstream process takes longer than expected (e.g., processing events or communicating events to the message bus 254 takes more time than expected).

As a non-limiting example, an ingestor 252 may include one or more pipeline sets to process incoming data. In some cases, each pipeline set can include one or more event generation pipelines to generate events from the incoming data, a buffer or queue to temporarily store the output of the event generation pipelines, and one or more queue output pipelines or workers at the output of the queue to prepare data from the queue for communication to the message bus 254 and to communicate the prepared data to the message bus 254. In some cases, the buffer or queue can be implemented as a producer-consumer queue to separate a read path of the ingestor 252 (e.g., the event generation pipelines, etc.) with a write path of the ingestor 252 (e.g., the queue output pipelines, etc.). In this way, the buffer or queue can allow for reading and writing the data at different rates.

In some cases, the event generation pipelines can include one or more parsing pipelines to convert incoming data into a particular format (e.g., UTF-8), perform line-breaking on the data (e.g., break up a log file so that each line is represented by a separate pipeline data object), and/or extract header information (e.g., determine the host, source, and/or sourcetype of the data). In certain cases, the event generation pipelines can include one or more merging pipelines to merge multiple single lines together for events that are determined to be multi-line events. In some cases, the event generation pipelines can include one or more typing pipelines to annotate the data (e.g., indicate what punctuation is used in an event) and/or perform regex replacement (e.g., extract a host name from the data, etc.). The output of the event generation pipelines may be events that include raw machine data associated with a timestamp and further associated with metadata (e.g., host, source, and sourcetype). Further the output of the event generation pipelines can be placed in an output queue for further processing by one or more additional pipelines. In cases in which the ingestor 252 receives pre-formed events (e.g., a forwarder 204 generates events from the data and communicates the events to the ingestor 252), the ingestor 252 can place the events in the output queue. In some such embodiments, the ingestor 252 may place the events in the output queue without processing them using the event generation pipelines. In some such cases, the events may be processed by a subset of the event generation pipelines depending on how much processing was done by the forwarder 204. For example, if the event was parsed and merged, but not typed, the ingestor 252 can send the event to the typing pipeline while skipping the parsing and merging pipelines. Accordingly, an ingestor 252 can dynamically process the incoming data depending on the processing that was performed on it by a forwarder 204 or other component. In certain cases, the ingestor 252 can dynamically process the incoming data based on routing keys or identifiers in the received data or in metadata associated with the data that is to be processing. The routing keys or identifiers can indicate what processing has already been done on the data.

The output queue pipelines or worker can be used to group events from the queue together and/or encode the grouped events. In certain cases, the grouped events can be encoded using protobuf, thrift, S2S, other schema-based encoding, or other encoding devices, mechanisms, or algorithms. The grouped events can be sent to the message bus as a message payload. In certain cases, the ingestor 252 can group only whole events. In other words, the ingestor 252 may not split an event between multiple groups. As such, the size of a group of events can increase/decrease by one whole event. In certain cases, the ingestor 252 can split up parts of an event across multiple groups of events.

In some cases, the queue output pipelines or worker can also determine whether the grouped events are to be sent to the message queue 256 or the data store 258 of the message bus 254. In certain cases, the ingestor 252 can determine the size of the group events. Depending on the size of the grouped events, the ingestor 252 can send the grouped events to the message queue 256 or the data store 258 of the message bus 254. For example, if the grouped events satisfy or are larger than a message size threshold, the queue output pipelines or worker can send the grouped events to the data store 258, obtain a location reference of the grouped events in the data store 258, and send the location reference to the message queue 256. If the grouped events do not satisfy or are smaller than or equal to the message size threshold, the queue output pipelines or worker can send the grouped events to the message queue 256. In determining whether the grouped events satisfy the message size threshold, the queue output pipelines or worker can compare the message size threshold with the size of the grouped events without modification and/or compare the size of the grouped events after they are encoded. Similarly, in communicating the grouped events to the message bus 254, the queue output pipeline or worker can send the grouped events without modification and/or encode them and send an encoded version of the grouped events. The message size threshold can be based on size limits of a message as determined by the capacity or capabilities of the message bus 254 or message queue 256. In some cases, the message queue 256 may be external to or remote from the ingestors 252 and/or indexers 206 and may developed by a third party. As such, the message queue 256 may therefore have certain characteristics, capacity or limitations with regard to the size of messages that it can process. Accordingly, in some such cases, the message size threshold can be based on the capacity and/or capabilities of the message queue 256.

It will be understood that the pipelines described herein are for example purposes only and that each pipeline can perform fewer or more functions and that a pipeline set can include fewer or more pipelines. For example, additional pipelines or the pipelines described above can be used to extract or interpolate a timestamp for events, determine and/or associate event with metadata (e.g., host, source, sourcetype), encode a group of events, etc. Accordingly, it will be understood that any one or any combination of the functions described above can be generally understood as being performed by an ingestor 252. For example, it will be understood that an ingestor 252 can receive input data, dynamically process the input data depending on what processing the data has already undergone, generate events from the input data, group events to form grouped events, and communicate the grouped events to the message bus 254. In communicating the grouped events to the message bus, the ingestor 252 can send the grouped events to the message queue 256 or send the grouped events to the data store 258 and send a location reference to the grouped events in the data store to the message queue 256.

The ingestor 252 or a monitoring component, such as the node coordinator 262, can monitor or track the relationship between received data (or a data chunk), generated events, event groups, and message payload (e.g., which events were generated from which data and to which event groups were the events added and to what message the event groups correspond). For example, when a data chunk is received at the ingestor 252, the ingestor 252 can track which events were generated from that data chunk, the event groups to which the events were added, and the messages or message payloads that included the events. Accordingly, once a message payload or group of events has been stored in the message bus 254, the ingestor 252 can identify which events have been stored, and how many events that were generated from a particular data chunk received from a particular source have been stored to the message bus 254. As such, once all of the events generated from a particular data chunk have been saved to the message bus 254, the ingestor 252 can send an acknowledgement to the source of the data chunk, such as a forwarder 204, HEC, etc. Based on the received acknowledgement the source can delete the data chunk from any buffers, queues, or data stores that it has and/or send an acknowledgement to a data source 202, so that the data source 202 can delete the data chunk.

In some cases, the node coordinator 262 or other monitoring component can monitor the amount of data being processed by the ingestors 252 and/or the capacity of the ingestors 252. For example, each ingestor 252 can send the monitoring component various metrics, such as, but not limited to, CPU usage, memory use, error rate, network bandwidth, network throughput, bytes uploaded to the message bus 254 or message queue 256, time taken to encode the data, time taken to schedule and execute a job or pipeline, etc. Based on the information from the ingestors 252, the monitoring component can terminate one or more ingestors 252 (e.g., if the utilization rate of an ingestor 252 or the ingestors 252 satisfies a low utilization threshold, such as a 20% utilization or 20% utilization for ten consecutive minutes, etc.) and/or instantiate one or more additional ingestors 252 (e.g., if the utilization rate of the an ingestor 252 or the ingestors 252 satisfies a high utilization threshold, such as 90% utilization or 90% utilization for ten consecutive minutes). Any one or any combination of the aforementioned metrics can be used to determine whether to terminate or instantiate one or more ingestors 252. In some cases, the monitoring component can monitor an individual ingestor 252 to determine whether the individual ingestor 252 should complete the processing of the data that has been assigned to it and shut down or whether to instantiate an additional ingestor 252.

In some cases, the monitoring component can instantiate one or more additional ingestors 252 based on a frequency at which messages are placed on the message queue 256 or the amount of messages placed on the message queue. For example, if the frequency or amount of messages satisfies or falls below a frequency or amount threshold, this could mean that the ingestors 252 do not have sufficient capacity to process data and generate message payloads in a timely manner. In some such cases, the monitoring component can instantiate one or more additional ingestors 252 to improve throughput. As another scenario, if an amount of data being sent to the ingestors 252 satisfies an amount threshold or increases, then depending on the number of ingestors 252 instantiated, additional ingestors 252 can be instantiated. In a similar way, if the amount of data being sent to the ingestors 252 increases by a threshold amount, then additional ingestors 252 can be instantiated.

In certain cases, each individual ingestor 252 can be its own monitoring component (or monitor other ingestors 252) to determine whether it satisfies a low utilization threshold and should complete its processing (e.g., finish converting data into events, grouping the events, and sending the groups of events to the message bus 254) and shut down or whether it satisfies a high utilization threshold and should request that an additional ingestor 252 be instantiated.

In any case, increasing (creating/instantiating) or decreasing (terminating/shutting down) the number or quantity of ingestors 252 can be done dynamically and can be independent of the number of indexers 206 that are indexing data. In this way, there can be fewer or more components ingesting data (e.g., ingesting nodes) and creating events than components (e.g., indexing nodes) that are grouping events to form buckets and storing the buckets. Furthermore, by dynamically and independently scaling ingestors 252, the data intake and query system 108 can improve the data ingestion throughput and react to data surges or declines in a performant way. In addition, the data intake and query system can independently and separately react to too little or too much ingestion capacity and/or indexing capacity.

2.5.2. Message Bus

The message bus 254 can include a message queue 256 and/or a data store 258. In certain cases, the message queue 256 may be remotely located from the ingestors 252 and/or the indexers 206. In some cases, the message queue 256 can be a cloud-based message queue 256 that is instantiated in a cloud environment or shared resource environment or can be an on-prem message queue 256 that is instantiated in a non-shared resource environment.

The message queue 256 can operate according to a publish-subscribe ("pub-sub") message model. In accordance with the pub-sub model, data ingested into the data intake and query system 108 may be atomized as "messages," each of which is categorized into one or more "topics." The message queue 256 can maintain a queue for each such topic, and enable devices to "subscribe" to a given topic. As messages are published to the topic, the message queue 256 can function to transmit the messages to each subscriber, and ensure message resiliency until at least each subscriber has acknowledged receipt of the message (e.g., at which point the message queue 256 may delete the message). In this manner, the message queue 256 may function as a "broker" within the pub-sub model. A variety of techniques to ensure resiliency at a pub-sub broker are known in the art, and thus will not be described in detail herein. In one embodiment, a message queue 256 is implemented by a streaming data source. As noted above, examples of streaming data sources include (but are not limited to) Amazon's Simple Queue Service ("SQS") or Kinesis™ services, devices executing Apache Kafka™ or Pulsar software, or devices implementing the Message Queue Telemetry Transport (MQTT) protocol. Any one or more of these example streaming data sources may be utilized to implement a message queue 256 in accordance with embodiments of the present disclosure.

In some cases, the message queue 256 sends messages in response to a request by a subscriber. In some such cases, the message queue 256 can send a message in response to a request by an indexer 206. In response to the request, the message queue 256 can provide the message to the indexer 206. In some cases, and indexer 206 may request multiple messages simultaneously or concurrently. In some such cases, the message queue 256 can respond with the number of messages requested.

In certain cases, the message queue 256 can retain messages until they have been acknowledged by a subscriber. For example, after sending a message to an indexer 206, the message queue 256 can retain the message until it receives and acknowledgement from the indexer 206. If the message references data (e.g., grouped events) in the data store 258, then the data in the data store 258 can be deleted along with the message in the message queue 256. As described herein, in some cases the message queue 256 can receive an acknowledgment from an indexer 206 after the indexer 206 has stored all the events associated with a particular message (e.g., events in the message or events referenced by the message that are stored in the data store 258) in the shared storage system 260 (as part of a slice and/or as part of a bucket). In response to receiving the acknowledgement, the message queue 256 can delete the message and/or relevant events from the message queue 256 and/or data store 258.

The data store 258 can be implemented as a separate computing device and/or as a cloud-based data store as part of a cloud storage, such as, but not limited to, Amazon Simple Storage Service (S3) or Elastic Block Storage (EBS), Google Cloud Storage, Microsoft Azure Storage, etc. In certain cases, the data store 258 can be implemented as an object store. In some cases, the data store 258 can form part of the shared storage system 260, e.g., as a separately accessible data store of the shared storage system 260 and/or as a separate instance of cloud storage. The data store 258 can be configured to provide high availability, highly resilient, low loss data storage. In some cases, to provide the high availability, highly resilient, low loss data storage, the data store 258 can store multiple copies of the data in the same and different geographic locations and across different types of data stores (e.g., solid state, hard drive, tape, etc.). Further, as data is received at the data store 258 it can be automatically replicated multiple times according to a replication factor to different data stores across the same and/or different geographic locations.

The data store 258 can be used to store larger messages or larger groups of events received from the ingestors 252. In some cases, the size of a message or size of the group of events (in the aggregate) may exceed a message size limit of the message queue 256. For example, the message queue 256 may only have capacity for or be configured to process messages that are no larger than 256 kb. If the group of events (or message payload) for a message exceeds that size alone or in combination with other message data (e.g., a message header) then the ingestor 252 can store the group of events (or message payload) to the data store 258 and obtain a location reference to the group of events. The ingestor 252 can send the location reference to the message queue 256.

On the indexer side, upon downloading, requesting, or receiving a message with a location reference as the message payload, the indexer 206 can use the location reference to obtain the relevant events from the data store 258 (as a second message payload). In certain cases, the ingestor 252 determines whether the group of events exceeds the message size after it has encoded the group of events. In some cases, the ingestor 252 determines whether the group of events exceeds the message size after before or without encoding the group of events. It will be understood that the size 256 kb is a non-limiting example and that the ingestors 252 can be configured to use any data size as a message size threshold. Accordingly, an ingestor 252 can store groups of events that satisfy or exceed the message size threshold to the data store 258, obtain a location reference of the groups of events stored in the data store 258, and send the location reference to the message queue 256 for inclusion as part of a message (e.g., as the message payload).

2.5.3. Indexers

As described herein, an indexer 206 can be the primary indexing execution engine, and can be implemented as a distinct computing device, virtual machine, container, etc. For example, the indexers 206 can be tasked with parsing, processing, indexing, and/or storing the data received from the forwarders 204. Specifically, in some embodiments, the indexer 206 can parse the incoming data to identify timestamps, generate events from the incoming data, group and save events into buckets, generate summaries or indexes (e.g., time series index, inverted index, keyword index, etc.) of the events in the buckets, and store the buckets locally (for example, in the data store 208) and/or in shared storage system 216. In addition, as described herein, the indexers 206 can be used to search data. In embodiments where indexers 206 search data, they (or the component that does search data) may be referred to as "search peers" or "search nodes." Accordingly, reference to a search peer or search node can refer to an indexer 206 or other component or computing device configured to perform one or more search-related tasks. Furthermore, a reference to a processing node can refer to an indexer, an indexing node, a search peer, a search node, etc.

When an indexer 206 finishes processing or editing a bucket, it can store the bucket locally and/or to the shared storage system 260. As described herein, the buckets that are being edited by an indexer 206 can be referred to as hot buckets or editable buckets. For example, an indexer 206 can add data, events, and indexes to editable buckets in the data store 208, etc. Buckets in the data store 208 that are no longer edited by an indexer 206 can be referred to as warm buckets or non-editable buckets.

In some cases, such as where the data intake and query system 108 includes ingestors 252, the indexers' 206 processing tasks can be reduced. For example, as described herein, the ingestors 252 can be used to generate events from incoming data. In some such cases, the indexers 206 may not generate events, but may still group events (in buckets) for storage and searching. As part of grouping the events for storage and searching, the indexers 206 can group events by associated indexes. As described herein, the indexes may be user defined and applied to events from a particular source or host, or events having a particular sourcetype, or events received during a particular time window. In any case, an indexer 206 can determine to what index events are associated and group the events by index. Further, the indexer 206 can create buckets and slices for each index. The buckets and slices can be used for storing and searching events. In some cases, one or more slices can be used to form part of a bucket.

The indexer 206 can determine the amount of data that it will process. To do this, the indexer 206 can monitor its capacity for processing additional data. For example, the indexer 206 can monitor its CPU usage, memory use, error rate, network bandwidth, network throughput, time taken to process the data, time taken to schedule and execute a job or pipeline, the number of events, slices, and buckets that it is currently processing, time to download a message, time to decode a message, time to purge a message or send an acknowledgement, and/or time to renew messages if used or needed and amount of processing resources that it anticipates would be needed to process additional events. If the indexer 206 determines that it has sufficient resources to process additional events, it can request another message from the message queue 256. In response, the message queue 256 can provide the indexer 206 with a message.

Upon receipt of a message from the message queue 256, the indexer 206 can process the message. This can include decoding encoded events associated with the message, sorting the events (e.g., by index), storing the events in slices and buckets, etc. In cases where the message includes a reference to grouped events in the data store 258, processing the message can include retrieving the grouped events from the data store 258.

In certain cases, an indexer 206 can assign each event to a (hot) bucket and a (hot) slice. In some cases, the indexer 206 assigns the event to a bucket based on the index with which the event is associated and assigns the event to a slice based on the assigned bucket or index to which the event is associated. In some such cases, the indexer 206 can include at least one hot slice for each bucket and least one hot bucket for each index for which the indexer 206 is processing events. For example, if the indexer 206 is processing events associated with a main index, test index, and devops index, the indexer 206 can include three hot buckets associated with each of the indexes, respectively, and at least three hot slices associated with each of the three buckets, respectively (e.g., a main hot slice and main hot bucket, a test hot slice and test hot bucket, and a devops hot slice and devops hot bucket). In addition, the indexer 206 may include one or more warm slices and/or aggregate slices and one or more warm buckets for each index for which the indexer 206 is processing events. With continued reference to the example above, the indexer 206 may include six test warm slices as part of two test aggregate slices, three test warm buckets, five main warm slices as part of one main aggregate slices, seven main warm buckets, one devops warm slice as part of one devops aggregate slice, and one devops warm bucket.

Further, if the indexer 206 receives an event associated with an index for which there is no editable bucket or editable slice, the indexer 206 can generate an editable bucket or editable slice, as the case may be, and assign the event to the newly generated editable bucket or editable slice.

Based on a slice rollover policy, the indexer 206 can convert a hot or editable slice (slice to which events are being actively added) to a warm or non-editable slice and add it an aggregate slice. The aggregate slice can include one or more warm slices associated with the same bucket. The slice rollover policy can include any one or any combination of a hot slice size threshold, hot slice timing threshold, or other threshold. The thresholds can be user specified or based on processing characteristics of the indexer 206 or shared storage system 260 or other component of the data intake and query system 108. In some cases, once a hot slice size threshold (e.g., 1 MB) or hot slice timing threshold (e.g., 30 seconds) is satisfied or exceeded, the indexer 206 can convert the hot slice to a warm or non-editable slice and add it to an aggregate slice. In certain cases, before adding the warm slice to the aggregate slice, the indexer 206 can compress the warm slice, thereby reducing the amount of memory and disk space used to store the warm slice. When a hot slice becomes warm or non-editable, the indexer 206 can generate a new hot slice, begin filling it with events, and roll it to the aggregate slice based on the slice rollover policy in due course, etc. In this way, the indexer 206 can maintain a hot slice for accepting new events as they are received.

As described herein, in some cases, the indexers 206 can store a copy of data that it is processing (e.g., slices of data corresponding to a hot bucket) and/or a copy of the results of processing/indexing the data (e.g., warm buckets) in the shared storage system 260. Based on an aggregate slice backup policy, the indexer 206 can store the aggregate slices to the shared storage system 260. The aggregate slice backup policy can include any one or any combination of an aggregate slice size threshold, aggregate slice timing threshold, etc. The thresholds can be user specified or based on processing characteristics of the indexer 206, shared storage system 260, or other component of the data intake and query system. In some cases, once an aggregate slice size threshold (e.g., 10 MB) or aggregate slice timing threshold (e.g., 2 minutes) is satisfied or exceeded, the indexer 206 can flag or mark the aggregate slice for copying to the shared storage system 260 and/or copy the aggregate slice to the shared storage system 260.

In addition, in some cases, the aggregate slice backup policy can indicate how the aggregate slices are to be process and/or stored. For example, the aggregate slice backup policy can indicate that the aggregate slice is to be compressed prior to storage. By compressing the aggregate slice, the indexer 206 can reduce the amount of memory and/or disk space used to store the aggregate slice.

In certain cases, the aggregate slice backup policy can indicate that the slices of the aggregate slice are to be uploaded in data offset or logical offset order. For example, if the aggregate slice includes a first slice from the logical offset 0-1000, a second slice from logical offset 1001-2500, and a third slice from logical offset 2501-3600, the aggregate slice backup policy can indicate that the first slice is to be uploaded, stored, and acknowledged by the shared storage system 260 before beginning the upload of the second slice, and so on. In this way, if there are any issues with uploading the slices, the indexer 206 can provide a guarantee that if the third slice was uploaded then the first and second slices should also exist in the shared storage system 260. As such, in the event a restore is started (e.g., because the indexer 206 failed), the system can determine which slices are available to restore the lost data or bucket.

In certain cases, prior to copying an aggregate slice to the shared storage system 260, the indexer 206 can verify whether the bucket associated with the aggregate slice is being uploaded or has already been upload to the shared storage system 260. If the corresponding bucket is being uploaded or has already been uploaded, the indexer 206 may decide not to store the aggregate slice to the shared storage system 260 given that the corresponding bucket that is stored in the shared storage system 260 includes a copy of the data in the aggregate slice.

Upon storing the aggregate slices to the shared storage system 260, the indexer 206 can notify the message bus 254. In some cases, the indexer 206, or other monitoring component, such as the node coordinator 262, tracks which events came from which messages of the message bus. Once all of the events from a particular message have been copied to the shared storage system 260, the indexer 206 (or other monitoring component) can inform the message bus 254. In some cases, as each event of a message is stored to the shared storage system 260, the indexer 206 (or monitoring component) can inform the message bus 254. In either case, once all the events from a message are stored in the shared storage system 260 (either as part of an aggregate slice or as part of a bucket), the message bus 254 can purge the relevant message and events from the message queue 256 and data store 258.

By storing the aggregate slices to the shared storage system 260, the indexer 206 can improve the data availability and resiliency of the data intake and query system 108. For example, if the indexer 206A fails or becomes unavailable, another indexer 206B can be assigned to process the slices in the shared storage system 260 to form a bucket. As another example, if the indexer 206A is responsible for searching an aggregate slice as part of a search query but is unavailable, another indexer 206, such as indexer 206B, can be assigned to download the aggregate slice from the shared storage system 260 and search the aggregate slice. In certain cases, before searching the aggregate slice, the indexer 206B can use it to rebuild a corresponding bucket. For example, if the indexer 206A failed before the bucket corresponding to the aggregate slice was uploaded to the shared storage system 260 (or if only parts of the bucket, like the aggregate slices, were uploaded to the shared storage system 260), the indexer 206B can rebuild that bucket using the aggregate slice and then search the rebuilt bucket as part of the search.

Concurrent to storing aggregate slices to the shared storage system 260, the indexer 206 can generate buckets that include the events of the aggregate slices. In some cases, a bucket can include one or more aggregate slices or include events that can be found in one or more aggregate slices. Accordingly, as aggregate slices are copied to the shared storage system 260, the original aggregate slice (or the events contained therein) may remain as part of a hot bucket at the indexer 206.

Based on a bucket rollover policy, the indexer 206 can convert a hot or editable bucket to a warm or non-editable bucket. The bucket rollover policy can include any one or any combination of bucket size threshold, bucket timing threshold, or other threshold. The thresholds can be user specified or based on processing characteristics of the indexer 206, shared storage system 260 or other component of the data intake and query system 108. In some cases, once a bucket size threshold (e.g., 750 MB) or bucket timing threshold (e.g., 10 minutes) is satisfied or exceeded, the indexer 206 can convert the hot bucket to a warm bucket and store a copy of the warm bucket in the shared storage system 260. In some cases as part of storing the copy of the warm bucket to the shared storage system 260, the indexer 206 can mark or flag the warm bucket for upload. In certain cases, the indexer 206 can use the flag or marking to identify associated aggregate slices and/or hot slices that are not to be upload or are to be deleted. When a hot bucket is converted to a warm bucket or non-editable bucket, the indexer 206 can generate a new hot bucket, begin filling it with events, and roll it on the bucket rollover policy in due course, etc. In this way, the indexer 206 can maintain a hot bucket for accepting new events (for a particular index) as they are received.

After storing a copy of the warm bucket to the shared storage system 260, aggregate slices that are associated with the copied bucket and stored in the shared storage system 260 can be deleted. As described herein, the aggregate slices associated with a bucket include the events of the bucket. When a warm bucket is copied to the shared storage system 260, the aggregate slices (and events) are copied as part of the bucket along with other bucket-related information and files (e.g., inverted indexes, metadata, etc.). Accordingly, once a copy of a warm bucket is stored in the shared storage system 260, aggregate slices stored in the shared storage system 260 before the warm bucket was copied include duplicate data and can be deleted (e.g., by the node coordinator 262, shared storage system 260, and/or the indexer 206). In addition, the indexer 206 can delete any hot slices or aggregate slices associated with the rolled warm bucket that remain on the indexer 206.

By storing a copy of the warm bucket to the shared storage system 260, the indexer 206 can improve the data availability and resiliency of the data intake and query system 108. For example, if the indexer 206 fails or becomes unavailable to search a bucket that it stored to the shared storage system 260 or is otherwise responsible for searching, another indexer 206 can be assigned to search the bucket.

As described herein, a monitoring component, such as the node coordinator 262 can manage data of the data intake and query system 108 based on a processing node map. In the event a first indexer 206A fails during indexing or search, the monitoring component can assign a second indexer 206 to index or search the data that had been assigned to the first indexer 206A for indexing and/or searching, respectively. In this way, the node coordinator 262 and shared storage system 260 can improve the data availability and resiliency of the data intake and query system 108.

In some embodiments, once the slices of data or warm buckets are copied to the shared storage system 260, an indexer 206 can notify a monitoring component, such as the node coordinator 262, that the data associated with the hot or warm bucket has been stored. In some cases, the indexer 206 can provide the monitoring component with information about the buckets stored in the shared storage system 260, such as, but not limited to, location information, index identifier, time range, etc. As described herein, the node coordinator 262 can use this information to update the node coordinator data store 264. In certain embodiments, the indexer 206 can update the node coordinator data store 264. For example, the indexer 206 can update the node coordinator data store 264 based on the information it receives from the shared storage system 260 about the stored buckets.

The indexer 206 or a monitoring component, such as the node coordinator 262, can monitor or track the relationship between received data (messages or message payload), events, hot/warm slices, aggregate slices, and buckets (e.g., which events came from which message or message payload and to which hot/warm slice, aggregate slice, and bucket were the events added). For example, when a message or message payload is received at the indexer 206, the indexer 206 can track which events were extracted from message payload, the hot/warm slice to which the events were added, the aggregate slice to which the hot/warm slice was added, and the bucket associated with or that includes the aggregate slice, etc. Accordingly, once an aggregate slice or bucket has been copied to the shared storage system 260, the indexer 206 can identify which events have been stored, and how many events that were extracted from a particular message received from the message bus 254 have been stored to the shared storage system 260. As such, once all of the events from a particular message have been saved to the shared storage system 260, the indexer 206 can send an acknowledgement to the message bus 254. Based on the received acknowledgement the message bus 254 can delete the message and associated events from the message queue 256 and/or data store 258.

Accordingly, in some cases, each event can be twice acknowledged as part of the ingestion and indexing process. Specifically, a first acknowledgement can indicate that an event has been generated and stored in the message bus 254 and that responsibility for ensuring the availability has passed to the message bus 254. A second acknowledgement can indicate that the event has been added to a bucket and/or aggregate slice and is stored in the shared storage system 260, and that responsibility for ensuring the availability has passed to the shared storage system 260. By using a dual acknowledgement, the data intake and query system 108 can increase throughput and data resiliency. Throughput and resiliency can be increased given that the amount of time that a particular component (other than the shared storage system 260) retains responsibility for a particular event is decreased. For example, rather than a forwarder 204 having to wait until an event is fully processed and stored before deleting a local copy of the data corresponding to the event, it can wait for the first acknowledgement indicating that the event has been stored in the message bus 254. As such, the components can more quickly delete copies of the particular event, thereby freeing up space for additional events. This can be especially be helpful where an indexer 206 fails during processing of an event. In such a scenario, the entire data pipeline from the forwarder 204 to the indexer is not delayed or backed up, and the forwarder 204 can continue to send data to an ingestor 252 for processing given that the failure of the indexer 206 does not affect a forwarder's output buffer or the ability of the forwarder 204 to forward data and receive acknowledgements for the data.

In some cases, the node coordinator 262 or other monitoring component can monitor the amount of data being processed by the indexers 206 and/or the capacity of the indexers 206. For example, each indexer 206 can send the monitoring component various metrics, such as, but not limited to, CPU usage, memory use, error rate, network bandwidth, network throughput, time taken to process the data, time taken to schedule and execute a job or pipeline, the number of events, slices, and buckets that it is currently processing, time to download a message, time to decode a message, time to purge a message or send an acknowledgement, and/or time to renew messages if used or needed, etc. Based on the information from the indexers 206, the monitoring component can terminate one or more indexers 206 (e.g., if the utilization rate of an indexer 206 or the indexers 206 satisfies a low utilization threshold, such as a 20% utilization or 20% utilization for ten consecutive minutes, etc.) and/or instantiate one or more additional indexers 206 (e.g., if the utilization rate of the an indexer 206 or the indexers 206 satisfies a high utilization threshold, such as 90% utilization or 90% utilization for ten consecutive minutes). In some cases, the monitoring component can monitor an individual indexer 206 to determine whether the individual indexer 206 should complete the processing of the data that has been assigned to it and shut down or whether to instantiate an additional indexer 206. In some cases, the monitoring component can instantiate one or more additional indexers 206 based on a frequency at which messages are requested from the message queue 256 or the amount of messages requested from the message queue. For example, if the frequency or amount of requests satisfies or falls below a frequency or amount threshold, this could mean that the indexers 206 do not have sufficient capacity to process messages in a timely manner. In some such cases, the monitoring component can instantiate one or more additional indexers 206.

In certain cases, each individual indexer 206 can be its own monitoring component (or monitor other indexers 206) to determine whether it satisfies a low utilization threshold and should complete its processing (e.g., assigning events it has to hots/warm slices, assigning warm slices to aggregate slices, storing aggregate slices to the shared storage system 260, and storing relevant buckets to the shared storage system 260) and shut down or whether it satisfies a high utilization threshold and should request that an additional indexer 206 be instantiated.

In any case, increasing (creating/instantiating) or decreasing (terminating/shutting down) the number or quantity of indexers 206 can be done dynamically and can be independent of the number of ingestors 252 that are ingesting data and generating events. In this way, there can be fewer or more components indexing data (e.g., indexing nodes) and generating slices, aggregate slices, and buckets than components (e.g., ingesting nodes) that are creating events. Furthermore, by dynamically and independently scaling indexers 206, the data intake and query system 108 can improve the data indexing throughput and react to data surges or declines in a performant way. In addition, the data intake and query system can independently and separately react to too little or too much ingestion capacity and/or indexing capacity.

2.5.4. Node Coordinator

The node coordinator 262 can be used to manage processing, storage, and searching within the data intake and query system 108. For example, the node coordinator 262 can maintain a node coordinator data store 264 with information relating to mappings between available indexers and groups of data or mappings between multiple groups of data. In the event the number of available indexers changes (e.g., an indexer fails, an indexer is created), the node coordinator 262 can be used to modify the mappings in response to the change.

The node coordinator 262 can be communicatively coupled to one or more components of the data intake and query system 108, such as any combination of one or more of the indexers 206, the search head 210, the shared storage system 260, and/or the node coordinator data store 264. For example, the node coordinator 262 can receive or communicate indexer identifiers, processing node map identifiers, data identifiers, status identifiers, etc. from one or more components of the data intake and query system 108 and can maintain at least some of this information in the node coordinator data store 264.

In some cases, the node coordinator 262 can manage data relating to indexers of the data intake and query system 108. For example, the node coordinator data store 264 can maintain a different indexer identifier (sometimes referred to as a processing node identifier) for each indexer 206. In some cases, if an indexer 206 becomes unresponsive or unavailable, the node coordinator 262 can update the node coordinator data store 264 to remove an indexer identifier associated with that indexer 206, or update a table to indicate that the indexer 206 is not available. As a corollary, if an additional indexer 206 is detected (e.g., generated), the node coordinator 262 can update the node coordinator data store 264 to include an indexer identifier associated with that indexer 206. In this way, the node coordinator data store 264 can include up-to-date information relating to which indexers 206 are included and/or available/unavailable. Furthermore, in some cases, the node coordinator 262 can receive or maintain status identifiers of the indexers. For example, the node coordinator 262 may receive updates regarding indexer availability or unavailability. In some cases, the node coordinator 262 can maintain the indexer identifiers or status identifiers by receiving status update communications or "heartbeats" from the indexers 206.

In some cases, the node coordinator 262 can manage assignments between data groups and processing nodes of the data intake and query system 108. For example, the node coordinator 262 can create or manage processing node maps, which can indicate assignments between groups of data and indexers for processing, storage, or search. In some cases, a processing node map can indicate any of the following assignments: data slice(s) to indexer assignment, bucket(s) to indexer assignment, or partition(s) to indexer assignment.

The terms "group of data" or "data group" are used interchangeably herein and are used broadly to refer to any group of data associated with the data intake and query system 108. By way of non-limiting example, a group of data can include pre- and/or post processed data. In some cases, a group of data can correspond to one or more hot buckets and/or warm buckets. In some cases, a group of data can include a set of one or more slices of data before it is processed by an indexer 206 (e.g., slices of a hot bucket). In some cases, a group of data can include a bucket or the content of a bucket, such as one or more files that include a group of events generated from one or more slices of data, an inverted index corresponding to the events, etc. In some cases, a group of data can include a partition.

The term "partition" is used broadly to refer to an inter-relationship of a multiple data groups, such as groups of data slices and/or buckets. As such, a partition can include a groups of data slices, a group of buckets, or a groups of data slices and buckets. The data groups of the partition can be included as part of a partition based on any of various factors, such as having the same host, source, or sourcetype or being processed or assigned to be processed by the same indexer or set of indexers. By way of non-limiting example, a partition can include multiple buckets that are included in the partition based on an indication that a common indexer has processed (e.g., created the buckets) or will process the buckets (e.g., for search or storage purposes).

As another example, the node coordinator 262 can manage information relating to the data groups of the data intake and query system 108. For example, the node coordinator 262 can create or manage data interrelationship maps (further described below), which indicate mappings between different data groups. For example, in some cases, a data interrelationship map can indicate which data groups (e.g., buckets, data slices) are included in a particular partition. As another example, in some cases, a data interrelationship maps can indicate which data groups (e.g., data slices) are included in a particular bucket.

In some cases, the node coordinator 262 can manage the data of the data intake and query system 108 using a combination of the processing node maps and data interrelationship maps. As a non-limiting example, a processing node map can indicate an assignment of a first partition to a first indexer, and a data interrelationship map can indicate an association between the first partition and a plurality of buckets. In some such cases, based on the association of the first indexer with the first partition and the association of the first partition with the plurality of buckets, the node coordinator 262 can use the processing node map and the data interrelationship map to determine that the first indexer is to be responsible for (e.g., for search purposes or for backup purposes) the plurality of buckets.

In some cases, the node coordinator 262 can manage data identifiers that identify data groups. For example, if the group of data includes data slices, a bucket, or a partition, the data identifier can include a data slice identifier, a bucket identifier, or a partition identifier, respectively.

In some cases, the node coordinator 262 can manage location information. For example, the node coordinator 262 can maintain the node coordinator data store 264 with information regarding where data is stored, such a location of the data in the shared storage system 260 or information usable to identify the location of the data in the shared storage system 260. In some cases, the node coordinator 262 can maintain information that indirectly identifies a location of a data group. For example, in some cases, the data groups are stored to the shared storage system 260 according to a data storage policy, where the data storage policy indicates where or how to store the data groups (e.g., in a particular directory). Accordingly, in some cases, because data groups are stored based on the data storage policy, indexers know where to look in the shared storage system 260 to find data groups. Thus, in some cases, any indexer can find and download data groups in the shared storage system 260 by using only the data identifier (e.g., bucket identifier) and without also receiving a location of the desired data group.

As mentioned, the node coordinator 262 can maintain the node coordinator data store 264. The node coordinator 262 can populate the node coordinator data store 264 and/or update it over time with the data that it determines from the indexers 206 and/or search head 210. For example, as information changes, the node coordinator 262 can update the node coordinator data store 264. In this way, the node coordinator data store 264 can retain an up-to-date database of information.

In some cases, the node coordinator 262 can maintain the node coordinator data store 264 by pinging the indexers 206 for information or passively receiving it based on the indexers 206 independently reporting the information. For instance, the node coordinator 262 can ping or receive information from the indexers 206 at predetermined intervals of time, such as every X number of seconds, or every X minute(s), etc. In addition or alternatively, the indexers 206 can be configured to automatically send their data to the node coordinator 262 and/or the node coordinator 262 can ping a particular indexer 206 after the passage of a predetermined period of time (for example, every X number of seconds or every X minutes) since the node coordinator 262 requested and/or received data from that particular indexer 206. In some cases, the indexers 206 can communicate data to the node coordinator 262 responsive to a particular event (e.g., generation of a bucket). For example, the indexer 206 can receive data for processing and can generate a bucket to store the data. In some cases, the indexer 206 communicates data (e.g., bucket identifier, bucket status identifier (hot, warm), etc.) to the node coordinator 262 to tell the node coordinator 262 that it generated a bucket. The indexer 206 can communicate this information before it stores any data in the bucket, after it stores data in the bucket, or concurrently while storing data in the bucket.

In some cases, the node coordinator 262 can maintain the node coordinator data store 264 by receiving status update communications from the indexers 206. Status update communications or "heartbeats" can occur periodically or according to a schedule, policy, or algorithm. For example, a time-based schedule may be used so that heartbeats may be performed every X number of seconds, or every X minute(s), and so forth. In some cases, the node coordinator 262 can determine that an indexer 206 is unavailable, failing, or that an indexer did not process assigned data based on the status update communications or absence of status update communications from the indexer 206, and can update the node coordinator data store 264 accordingly. In some cases, the status update communications may include information about the indexer 206 or an environment in which the indexer 206 is operating, a current resource allocation of the indexer, such as CPU utilization over a particular period of time, available memory, available local storage, operating temperature, or any other information regarding the status, performance, operation, or environment of the indexer.

In some cases, the node coordinator 262 can maintain the node coordinator data store 264 by receiving communications from the indexers 206 based on the occurrence of particular events. For example, in some cases, the indexers 206 can be configured to update the node coordinator 262 each time the indexer 206 generates a new bucket or new bucket identifier. For example, an indexer 206 can communicate a bucket identifier to the node coordinator 262 and/or an indication that the bucket is hot in response to the indexer 206 generating the bucket. The indexer 206 can communicate this information before, after, or concurrent with the indexer adding any data to the bucket. As another example, in some cases, the indexers 206 can be configured to update the node coordinator 262 each time the indexer 206 converts a hot bucket to a warm bucket and/or stores the warm bucket in the shared storage system 260 shared storage. In this way, the node coordinator 262 can update the node coordinator data store 264 to include data regarding a status of the buckets, such as whether the bucket it hot or warm. In some cases, when an indexer 206 informs the node coordinator 262 that it has created a hot bucket it can provide information about the bucket, such as an index associated with the bucket a start time of the bucket, and/or other metadata. In certain cases, when the indexer informs the node coordinator 262 that a hot bucket has been rolled to warm, it can provide information about the warm buckets, such as, the start time and end time of the bucket, index associated with the bucket, etc.

2.5.5. Node Coordinator Data Store

The node coordinator data store 264 can store information relating to the groups of data that are stored, processed, and/or searched by the data intake and query system 108 and/or the components associated with the data intake and query system 108. In some embodiments, this information can include indexer identifiers, data identifiers, status identifiers, data interrelationship maps, and/or processing node maps. The node coordinator data store 264 can be maintained (for example, populated, updated) by the node coordinator 262. As mentioned, in some embodiments, the node coordinator 262 and node coordinator data store 264 can be separate or independent of the indexer 206. Furthermore, in some cases, the node coordinator data store 264 can be separate from or included in, or part of, the node coordinator 262. In still other cases, the node coordinator data store 264 and the node coordinator 262 may be universal across many instances of data intake and query system 108

A processing node map can indicate various assignments of data groups to indexers (also referred to herein as processing nodes). For example, if the data group is a partition, the processing node map can indicate an assignment of the partition to an indexer, and if the data group is a bucket or data slice, the processing node map can indicate an assignment of the bucket or the data slice to an indexer.

The node coordinator 262 can generate and/or modify processing node maps and/or assignments (sometimes referred to as indexer assignments) of processing node maps according a processing node map generation policy. The processing node map generation policy can indicate how to distribute/assign data groups to indexers. In some cases, the processing node map generation policy indicates that data groups are to be assigned to indexers in a round robin, random, or particular order. In some such cases, the processing node map generation policy indicates the same indexer 206 that had the data originally should be assigned to search the data. In some cases, the processing node map generation policy indicates that the node coordinator 262 can determine an indexer assignment based on information received from the indexer 206. For example, the node coordinator 262 can create or update an indexer assignment in response to receiving a data identifier from the indexer 206. The node coordinator 262 can use the indexer assignments to determine which indexer 206 is assigned to process, store, or search a particular group of data.

In some cases, the processing node map generation policy indicates that data groups are to be assigned to indexers according to a hashing algorithm, such as a consistent hashing algorithm. For example, the processing node map generation policy can indicate to perform a hash on the data groups and assign the data groups to the indexers based on the hash. As a non-limiting example, the processing node map generation policy can include instructions for the node coordinator 262 to use a modulo operand on the data groups to be assigned to determine to which indexer that data is to be assigned. However, it will be understood that the processing node map generation policy can indicate a variety of mechanisms to assign data groups to indexers.

A non-limiting example of a data structure for storing a processing node map is illustrated in Table 1.

TABLE 1

| Processing Node Map ID | Indexer ID | Data ID |
|---|---|---|
| 65 | A423 | 1, 3, 6 |
|  | 2226 | 2, 4, 10 |
|  | B603 | 71, 23, 32 |

In the example illustrated by Table 1, the processing node map indicates various assignments of data groups to indexers. In particular, the processing node map indicates that the data associated with data identifiers 1, 3, 6 is to be searched by the indexer A423. In other words, the processing node map indicates that the data associated with data identifiers 1, 3, 6 is assigned to the indexer A423. Furthermore, the processing node map indicates that the data associated with data identifiers 2, 4, 10 is to be searched by the indexer 2226 and that the data associated with data identifiers 71, 23, 32 is to be searched by the indexer B603. As mentioned, the data identifiers may correspond to partitions IDs, bucket ID (hot buckets, warm buckets), etc.

As shown, the processing node map includes a processing node map identifier 65, which is unique to processing node map. In this way, the processing node map associates the processing node map identifier 65 with all three of the assignments identified above. It will be understood that the processing node map entries can be configured in a variety of ways. It will be understood that the processing node map data structure can include fewer, more, or different information.

In some cases, the node coordinator 262 can manage data of the data intake and query system 108 using the processing node map of Table 1. As a non-limiting example, if indexer A423 communicated the processing node map identifier 65 to the node coordinator 262, the node coordinator 262 can consult the processing node map of Table 1 to identify the assignment associated with indexer A423 (in this case, indexer A423 is assigned to data identifiers 1, 3, 6). Based on the information in the processing node map (e.g., when data identifiers 1, 3, 6 correspond to buckets or data slices), the node coordinator 262 can respond to the indexer A423 with data identifiers 1, 3, 6. In some cases (e.g., when data identifiers 1, 3, 6 correspond to partitions), the node coordinator 262 may consult a data interrelationship map (described below) to identify data groups associated with partitions 1, 3, 6, and can respond to the indexer A423 with identifiers of those identified data groups.

In some cases, a processing node map may associate multiple indexers to the same data group. For example, the processing node map can indicate an assignment of a first data group to a first indexer and at least one second indexer. In some such cases, the assignments can be tiered assignments, such that one assignment takes precedence over the second assignment. For example, in some cases, the assignment of the first data group to the first indexer can be a primary assignment, where the first indexer is assigned the primary responsibility of performing a search on data associated with the first data group, and the assignment of the first data group to the one or more second indexers can be secondary assignments, where the one or more second indexers are assigned a secondary responsibility of performing the search on the data associated with the first data group, should the first indexer fail or otherwise become unavailable. In some cases, indexers assigned a secondary responsibility of performing a search will effectively function as a backup to the indexer assigned the primary assignment. For example, indexers that are assigned a secondary assignment can be configured to download some or all of the data associated with the data group, thereby allowing for an efficient transition from secondary assignment to primary assignments, should the indexer assigned the primary assignment fail. In some cases, the different assignments are not necessarily tiered, but still function similarly to the primary/secondary assignments described above. For example, in some cases, the assignment of the first data group to the first indexer can be a "search assignment" and the assignment of the first data group to the one or more second indexers can be "backup assignments." A search assignment can indicate that an indexer is responsible for downloading, to its local storage, at least a portion of the data associated with the data group (if the data is not already located in its local storage) and executing searches on at least a portion of the data associated with the data group. A backup assignment can indicate that an indexer is responsible for downloading, to local storage, at least a portion of the data associated with the data group (if the data is not already located in its local storage). In this way, should the indexer associated with the search assignment fail, or should the node coordinator otherwise determine to modify assignments (e.g., reassign a backup assignment as a search assignment), the indexer(s) associated with the backup assignment has already locally stored some or all of the data associated with the data groups and thus can be efficiently transitioned into the search assignment role. In some cases, an indexer assigned as a backup assignment does not execute searches on data associated with the data group, at least not until the assignment is reassigned as a search assignment.

A non-limiting example of a data structure for storing a processing node map that includes search assignments and backup assignments is illustrated in Table 2.

TABLE 2

| Processing Node Map ID | Indexer ID | Data ID for Search | Data ID for Backup |
|---|---|---|---|
| 70 | A423 | 1, 4 | 2, 3 |
|  | 2226 | 3, 6 | 4, 5 |
|  | B603 | 2, 5 | 1, 6 |

In the example illustrated by Table 2, the processing node map indicates various search assignments of data groups to indexers. In particular, the processing node map indicates a search assignment of the data associated data identifiers 1, 4 to indexer A423, a search assignment of the data associated data identifiers 3, 6 to indexer 2226, and a search assignment of the data associated data identifiers 2, 5 to indexer B603. Further, the processing node map indicates various backup assignments of data groups to indexers. In particular, the processing node map indicates a backup assignment of the data associated data identifiers 2, 3 to indexer A423, a backup assignment of the data associated data identifiers 4, 5 to indexer 2226, and a backup assignment of the data associated data identifiers 2, 5 to indexer B603.

As shown, each data identifier 1, 2, 3, 4, 5, 6 is assigned to at least two indexers: once in a search assignment and (at least) once in a backup assignment. Furthermore, no indexer A423, 2226, B603 is assigned for search purposes (search assignment) and backup purposes (backup assignment) to the same data identifiers.

In some cases, if an indexer 206 becomes unresponsive or unavailable, the node coordinator 262 can update the node coordinator data store 264 to remove an indexer identifier associated with that indexer 206. In this way, the node coordinator data store 264 can include up-to-date information relating to which indexers 206 are included and/or available. In certain embodiments, such as where an indexer identifier is associated with a processing node map (e.g., assigned to one or more data groups), the node coordinator 262 can remove reference to the indexer identifier in the processing node map and/or reassign other indexers to process and/or search the data that had previously been assigned to the now-unavailable indexer 206.

As a non-limiting example with reference to Table 2, if the node coordinator 262 determined that indexer A423 has failed or is otherwise unavailable, the node coordinator 262 can create new search assignments for data identifiers 1, 4 and new backup assignments for data identifiers 2, 3. In particular, since indexer 2226 was assigned as the backup to data identifier 4, the node coordinator 262 can reassign the search assignment of data identifier 4 to indexer 206. Furthermore, indexer B603 was assigned as the backup to data identifier 1, the node coordinator 262 can reassign the search assignment of data identifier 1 to indexer B603. The node coordinator 262 can also reassign the backup assignment of data identifiers 2, 3. In this example, since indexer 206 has the search assignment of data identifier 3, the node coordinator 262 can assign the backup assignment of data identifier 3 to indexer B603 so that indexer 206 is not assigned for both search and backup purposes. For similar reasoning, the node coordinator 262 can assign the backup assignment of data identifiers 1, 2, 4 to indexers 2226, 2226, and B603, respectively. Furthermore, since the node coordinator 262 has made changes to the processing node map (or has generated a new processing node map), the node coordinator 262 also generates a new processing node map identifier. In some cases, the node coordinator 262 can use a consistent hashing algorithm to make assignments between the data identifiers and the indexers. In some such cases, when an indexer becomes unavailable or is added, the node coordinator 262 can use the consistent hashing algorithm to generate a new bucket map with assignments for the remaining (or new group) of indexers. Table 3, below, illustrates an example a processing node map that corresponds to the reassignments described in this example.

TABLE 3

| Processing Node Map ID | Indexer ID | Data ID for Search | Data ID for Backup |
|---|---|---|---|
| 71 | 2226 | 4, 3, 6 | 1, 2, 5 |
|  | B603 | 1, 2, 5 | 3, 4, 6 |

As another example, in some cases, a processing node map data structure can include filter criteria, the groups of data can include groups of data that satisfy the filter criteria, indexer identifiers may be omitted, or data identifiers may be omitted. Additional details regarding information useable with certain embodiments of the processing node map identifier data structure are disclosed in U.S. patent application Ser. No. 16/778,511, filed Jan. 21, 2020, entitled "RECOVERING PRE-INDEXED DATA FROM A SHARED STORAGE SYSTEM FOLLOWING A FAILED INDEXER," which is hereby incorporated by reference in its entirety for all purposes.

In some cases, the processing node map identifiers may not be directly associated with bucket identifiers (e.g., the processing node map identifier data structure shown in Table 1 may not include bucket identifiers). In some such embodiments, a separate data structure may associate individual data identifiers (e.g., partition identifiers) with individual bucket identifiers. For example, a data interrelationship map can indicate various assignments or associations between data groups. For example, a data interrelationship map can indicate which data groups (e.g., buckets, data slices) are included in a particular partition. As another example, a data interrelationship map can indicate which data groups (e.g., data slices) are included in a particular bucket.

A non-limiting example of a data structure for storing a data interrelationship map is illustrated in Table 4.

TABLE 4

| Partition ID | Bucket ID |
|---|---|
| 1 | B2, B6, B8, B50, B51, B54, B56, B59, B63, B66, B67 (hot) |
| 2 | B3, B5, B9, B40, B42, B43, B44, B48, B70, B73, B89 (hot) |
| 3 | B1, B7, B10, B13, B15, B18, B75, B90, B92, B101, B300 (hot) |
| 6 | B24, B206 (hot) |

In the illustrated embodiment, the data interrelationship map includes four data interrelationship assignments. Each data interrelationship assignment associates a first data group identifier with a set of second data group identifiers. For purposes of this example, the first data group identifier is a "Partition ID" and the second data group identifier is a "Bucket ID." However, as described herein, the contents of a data group can vary across embodiments.

In the illustrated embodiment, the partition identifier "1" is associated with the data identifiers B2, B6, B8, B50, B51, B54, B56, B59, B63, B66, B67 corresponding to eleven buckets, the partition identifier "2" is associated with the data identifiers B3, B5, B9, B40, B42, B43, B44, B48, B70, B73, B89, corresponding to eleven buckets, the indexer identifier "3" is associated with the data identifiers B1, B7, B10, B13, B15, B18, B75, B90, B92, B101, B300, corresponding to eleven buckets, and the partition identifier "6" is associated with the data identifiers B24, B206 corresponding to two buckets.

In some cases, the data interrelationship map can indicate a status of one or more the groups of data. For instance, based on the above example, second data identifiers B67, B89, B300, B206 identify hot buckets, and B2, B6, B8, B50, B51, B54, B56, B59, B63, B66, B3, B5, B9, B40, B42, B43, B44, B48, B70, B73, B1, B7, B10, B13, B15, B18, B75, B90, B92, B101, B24 identify warm buckets.

The node coordinator 262 can update the interrelationship map as buckets are created, rolled to warm, etc. As described herein, an indexer can inform the node coordinator 262 when it generates a (hot) bucket, and provide the node coordinator 262 with a bucket ID for the new bucket. The node coordinator 262 can assign the bucket ID to a partition ID in the interrelationship map. In some cases, the node coordinator 262 can assign the new bucket ID to a partition that is already assigned to the indexer that created the bucket.

Furthermore, the indexer can inform the node coordinator 262 when it converts the hot bucket into a warm bucket. For example, if an indexer 206 converts a hot bucket into a warm bucket, it can communicate this change to the node coordinator 262. The node coordinator 262 can update the data interrelationship map to indicate that the bucket is warm.

Any one or any combination of the data structures shown in Tables 1, 2, 3 and 4 can be used to organize, structure, or search, the data in the node coordinator data store 264. For example, in some cases, the data structures of Table 2 can be used to identify a processing node map identifier and indexer identifiers for a search head and/or identify data identifiers for specific search peers. Similarly, the data structure of Table 2 can be used to identify data identifiers for specific data groups (e.g., buckets).

As described herein, in some cases, the node coordinator 262 can manage the data of the data intake and query system 108 using a processing node map and a data interrelationship map. As a non-limiting example, a processing node map can indicate assignments of a first partition to a first indexer, and a data interrelationship map can indicate an association between the first partition and a plurality of buckets. In some such cases, based on the association of the first indexer with the first partition and the association of the first partition with the plurality of buckets, the node coordinator 262 can use the processing node map and the data interrelationship map to determine that the first indexer is to be responsible for (e.g., for search purposes or for backup purposes) the plurality of buckets.

It will be understood that the data interrelationship map entries can be configured in a variety of ways. It will be understood that the data interrelationship map data structure can include fewer, more, or different information.

In some cases, the node coordinator data store 264 includes one or more metrics associated with one or more of the indexers 206. For example, the metrics can include, but are not limited to, one or more performance metrics such as CPU usage, memory use, error rate, network bandwidth, network throughput, time taken to process the data, time taken to schedule and execute a job or pipeline, the number of events, slices, and buckets that it is currently processing, time to download a message, time to decode a message, time to purge a message or send an acknowledgement, and/or time to renew messages if used or needed, or the like. For example, the node coordinator data store 264 can include information relating to a utilization rate of an indexer 206, such as an indication of which indexers 206, if any, are working at maximum capacity or at a utilization rate that satisfies utilization threshold, such that the indexer 206 should not be used to process additional data for a time. As another example, the node coordinator data store 264 can include information relating to an availability or responsiveness of an indexer 206, an amount of processing resources in use by an indexer 206, or an amount of memory used by an indexer 206. Similarly, any one or any combination of the metrics related to the ingestors 252 can be stored in the node coordinator data store 265.

In some cases, the node coordinator data store 264 includes one or more status identifiers associated with one or more of the indexers 206. For example, in some cases, a status identifier associated with one or more of the indexers 206 can include information relating to an availability of an indexer 206. For example, the node coordinator data store 264 can include an indication of whether an indexer 206 is available or unavailable. In some cases, as described herein, if an indexer 206 becomes unavailable, the node coordinator 262 and/or the node coordinator data store 264 can disassociate that indexer 206 from (and/or can associate an available indexer 206 to) one, some, or all processing node map identifiers, data identifiers, or the like, and can associate an available indexer 206. In certain cases, any time an indexer is 206 is removed or added to the system, the node coordinator 262 can generate a new processing node map. In this way, any data, processing, or querying that is assigned to an indexer 206 that becomes unavailable can be re-assigned to an available indexer 206.

In some cases, a determination of the availability of an indexer 206 can be based on a status update (or absence of a status update) from the indexer 206. In some instances, an indexer 206 is considered available if it is instantiated or running, provides periodic status updates to the node coordinator 262, and/or is responsive communications from the node coordinator 262. In some cases, an indexer 206 is considered available if one or more metrics associated with the indexer 206 satisfies a metrics threshold. For example, an indexer 206 can be considered available if a utilization rate of the indexer 206 satisfies a utilization rate threshold. As another example, an indexer 206 can considered available if an amount of memory used by or available to the indexer 206 satisfies a memory threshold (non-limiting example: available memory >10% of total memory, etc.). As another example, an indexer 206 can be considered available if an amount of available processing resources of the indexer 206 satisfies a processing resources threshold (non-limiting example: CPU usage <90% of capacity, etc.). Similarly, in some cases, an indexer 206 can be considered unavailable if one or more, or some or all, metrics associated with the indexer 206 do not satisfy a metrics threshold.

The node coordinator data store 264 can store information relating to data of the data intake and query system 108. For example, the node coordinator data store 264 can include location information for some or all of the sets of one or more slices of data (before or after processing), some or all of the buckets, etc. Location information can include a reference to a location at which a group of data is stored or an identifier that can be used to determine the location based on a data storage policy. The location information can identify a location in local storage (for example, identifying a particular indexer 206 and/or data store 208) and/or a location in the shared storage system 260. As described herein, the node coordinator data store 264 can also include filter criteria, an identification of which data satisfies the different filter criteria, the storage location of that data, and which indexers 206 are assigned to search that data, etc.

If an indexer 206 later deletes data from its local storage, it can communicate this change to the node coordinator 262. The node coordinator 262 can update the indexer assignment to indicate that the indexer 206 no longer has the data stored locally. In some such cases, the node coordinator 262 can assign an indexer 206 to be responsible for searching the data. For example, the node coordinator 262 can assign the same indexer 206 that had the data originally, other indexers 206 that are processing data, or indexers 206 that do not process or store, data but are dedicated to searching data. The node coordinator 262 can store the updated assignment in the node coordinator data store 264.

In a similar fashion, the node coordinator 262 and/or node coordinator data store 264 can store any one or any combination of the aforementioned pieces of information with regard to the ingestors 252. For example, the node coordinator 262 and/or node coordinator data store 264 can store ingestor identifiers, metrics, status identifiers, etc. Further, the node coordinator 262 can make any type of determination about the availability, capacity, and/or utilization of the ingestors 252. Further, as described herein, a separate component or monitoring component can be used to implement any one or any combination of the aforementioned features of the node coordinator 262.

In some cases, a node coordinator 262 may be unaware of groups of data stored in the shared storage system 260. For example, in some cases, the node coordinator 262 may have lost or deleted information relating to the one or more groups of data. In other instances, data may be migrated from other storage systems, databases, or methods of ingesting data, and the node coordinator 262 may add information about this data to the node coordinator data store 264, as well as assign this data to various partitions, buckets, and/or processing nodes within the data intake and query system 108, as described herein.

In some cases, the groups of data stored in the shared storage 260 that are not known by the node coordinator 262, may not be searchable by the data intake and query system 108. For example, these groups of data may not be included in a data interrelationship map and/or a processing node map. In some such cases, when the node coordinator 262 provides a list of data identifiers to processing nodes for search, the data identifiers for the groups of data unknown to the node coordinator 262 may be omitted.

The node coordinator 262 can use various techniques to make these previously unknown groups of data available for search. In some cases, the node coordinator 262 can create tasks to discover unknown groups of data or to bootstrap the unknown groups of data so that they can be searched. For example, based on some known information about data stored in the shared storage system 260, the node coordinator 262 can generate a task for a processing node to review the shared storage system 260 to identify groups of data to be added for searching, etc. In some cases, the known information can include, but is not limited to, an index or directory name or identifier associated with the groups of data, a physical location, etc. For example, the node coordinator 262 may be aware that an index "main" exists in the shared storage system 260, but may not have any information about the buckets of the index "main."

In certain cases, the node coordinator 262 can obtain the information about the unknown groups of data based on user input. For example, a user may input the name of an index or directory that is unknown to the node coordinator 262 or input an instruction to discover or incorporate the data from a particular index or directory into the data intake and query system 108 corresponding to the node coordinator 262 or to make the data searchable by the data intake and query system 108 corresponding to the node coordinator 262. In certain cases, the user input can indicate that another data intake and query system is being merged with the data intake and query system 108 corresponding to the node coordinator 262, or that data is being migrated to the data intake and query system 108 corresponding to the node coordinator 262. Based in the instruction to merge or migrate data, the node coordinator 262 can receive a list of directory or index names/identifiers, physical location, etc., associated with the data to be merged/migrated. In certain cases, the node coordinator 262 can generate a task for each physical location, directory or index name/identifier, etc. In this way, the node coordinator 262 can distribute the work between multiple processing nodes.

In some cases, the node coordinator 262 can obtain information about the unknown groups of data by scanning one or more file directories of the shared storage system 260 and/or scanning a map of indexes or directories to corresponding groups of data, etc. For example, the node coordinator 262 can scan file directories or indexes of the shared storage system 260 and compare the scanned information with a list of known directories or indexes, respectively. If a directory is discovered that does not correspond to a known index or other information known to the node coordinator 262 or an unknown index is discovered, the node coordinator 262 can generate a task to further scan the directory, index, etc. Similarly, the node coordinator 262 can scan a map of indexes to groups of data. If the node coordinator 262 determines that a particular index does not have any groups of data associated with it, it can generate a task to discover groups of data associated with the index, etc.

In some cases, the node coordinator 262 can make the generated tasks available to the processing nodes. In some such cases, depending on the availability of the processing nodes, the processing nodes can retrieve and execute the tasks. The availability may be determined based on the amount of data being processed or searched by a processing node, the processor and/or memory utilization of the processing node, expected searches, etc. In certain cases, the node coordinator 262 can assign the tasks to one or more processing nodes based on their availability, etc. In some cases, the node coordinator 262 can instantiate an additional processing node to execute one or more tasks, etc.

As part of the task, the processing node can use the known information to identify groups of data. This can include querying the shared storage system 260 for additional information regarding the one or more groups of data. For example, the processing node may provide the shared storage system 260 with the name of the known directory or index and request summary information or metadata relating to any groups of data associated with the directory or index. (e.g., bucket identifiers, start time, end time, number of events, etc.). The shared storage system 260 can identify the relevant summary information or metadata and begin sending it to the processing node. In certain cases, the shared storage system 260 can send the relevant metadata in chunks. For example, the shared storage system 260 can send the processing node metadata associated with 1,000 or 1,000,000 buckets at a time. In some cases, the shared storage system 260 can send the groups of data themselves or portions of the groups of data, such as one or more files of the groups of data, etc. For example, the shared storage system 260 can send entire buckets or files of a buckets, such as, but not limited to, a metadata file, raw machine data file, inverted index file, etc.

The processing node can forward the received information to the node coordinator 262, and the node coordinator 262 can store it in the data store 264. Once the processing node has received the information of (all of) the groups of data corresponding to the known information that the processing node sent to the shared storage system 260, the processing node can inform the node coordinator 262 that the task has been completed. If for some reason, the processing node does not complete the task (e.g., within a threshold period of time), the node coordinator 262 can allow (or assign) another processing node to complete the task.

Using the information about the different groups of data, the node coordinator 262 can assign the groups of data to different data groups. For example, the node coordinator 262 can assign buckets to partitions using the metadata received about those buckets (e.g., using the bucket identifier, start time, end time, etc.). In assigning the groups of data to different data groups, the node coordinator 262 can update relevant data interrelationship maps. For example, the node coordinator 262 can add bucket identifiers corresponding to the identified buckets to the interrelationship maps. In some cases, the node coordinator 262 can assign the groups of data to different data groups in a load-balanced fashion. In certain cases, the node coordinator 262 can generate new data groups for the groups of data. For example, the node coordinator can generate one or more new partitions and assign the identified buckets to the new partitions.

The node coordinator can also generate new processing node maps. In some cases, the new processing node maps may have the same data groups assigned to the same processing nodes, however, the groups of data assigned to the different data groups may have changed. For example, while the same partitions may be assigned to the same processing nodes, the buckets assigned to those partitions may have changed. Accordingly, in some cases, to generate the new processing node map, the node coordinator 262 can renumber or generate a new processing node map identifier for a legacy processing node map (processing node map that existed prior to the task completion). In certain cases, the node coordinator 262 discards some or all of the legacy processing node maps and generates new ones.

By generating a new processing node map and/or a new identifier for a legacy processing node map, the node coordinator 262 can cause the processing nodes to update to include the data identifiers of the discovered groups of data. For example, the next time a search head requests a processing node map, the node coordinator 262 can send the search head 210 the new processing node map identifier (for a new or legacy processing node map). The search head 210 can forward the new processing node map identifier to a processing node. In response, the processing node can request the data identifiers associated with the new processing node map identifier from the node coordinator 262. In response, the node coordinator 262 can respond with the data identifiers associated with the new processing node map identifier, including the data identifiers for the groups of data that were discovered as a result of the task.

In certain cases, rather than generating a new processing node map identifier, the node coordinator 262 can send an instruction to some or all of the processing nodes to discard any processing node maps in their cache. By having the processing nodes flush their caches, the next time the processing nodes receive a particular processing node map identifier, they can request a list of data identifiers assigned to them from the node coordinator 262 for the particular processing node map identifier. As described herein, the list of data identifiers received from the node coordinator 262 can include the data identifiers associated with the groups of data discovered as a result of the task.

In some cases, the node coordinator 262 can instruct the processing nodes to review their cache and send a list of the data identifiers for the different processing node maps that the processing nodes have in their cache. The processing nodes can send a list of processing node map identifiers and data identifier corresponding to those processing node map identifiers to the node coordinator 262. The node coordinator 262 can compare the data identifiers for each particular processing node map identifier with the data identifiers that it has for the processing node map identifiers and respond to the processing nodes based on the difference, including information about any groups of data that are not included in the processing node maps of the processing nodes. For example, if processing node A indicates that it has five buckets assigned to it as part of processing node map identifier 65 and the node coordinator has twenty buckets assigned to processing node A as part of processing node map identifier 65, the node coordinator 262 can respond to processing node A with information (e.g., metadata, summary information, etc.) about the additional fifteen buckets and instruct processing node A to update its processing node map for the processing node map identifier 65 to include the information about the fifteen buckets. In certain cases, the processing nodes can generate one or more directories or file paths based on the received information.

2.6. Cloud-Based System Overview

The example data intake and query system 108 described in reference to FIGS. 2A and 2B comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
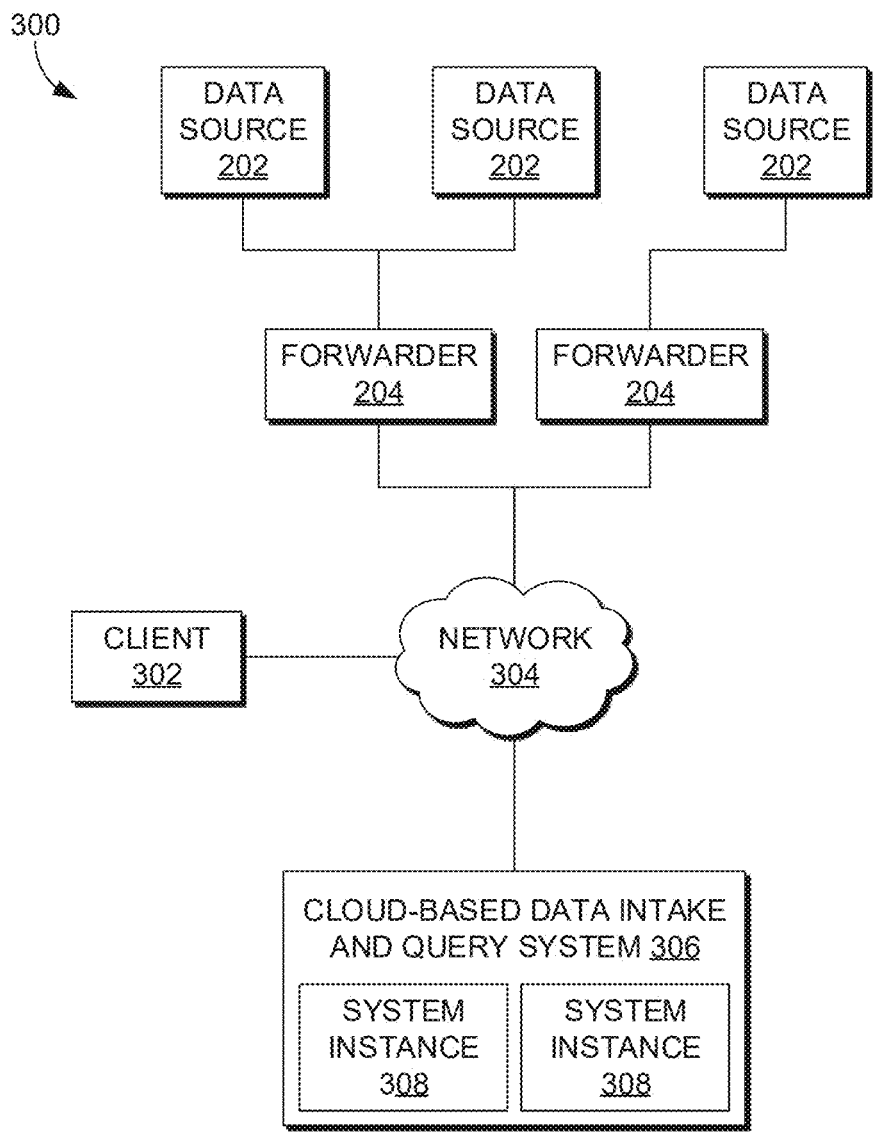
FIG. 3 is a block diagram of an example cloud-based data intake and query system, in accordance with example embodiments.

FIG. 3 illustrates a block diagram of an example cloud-based data intake and query system. Similar to the system of FIGS. 2A and 2B, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.7. Searching Externally-Archived Data

Figure 4:
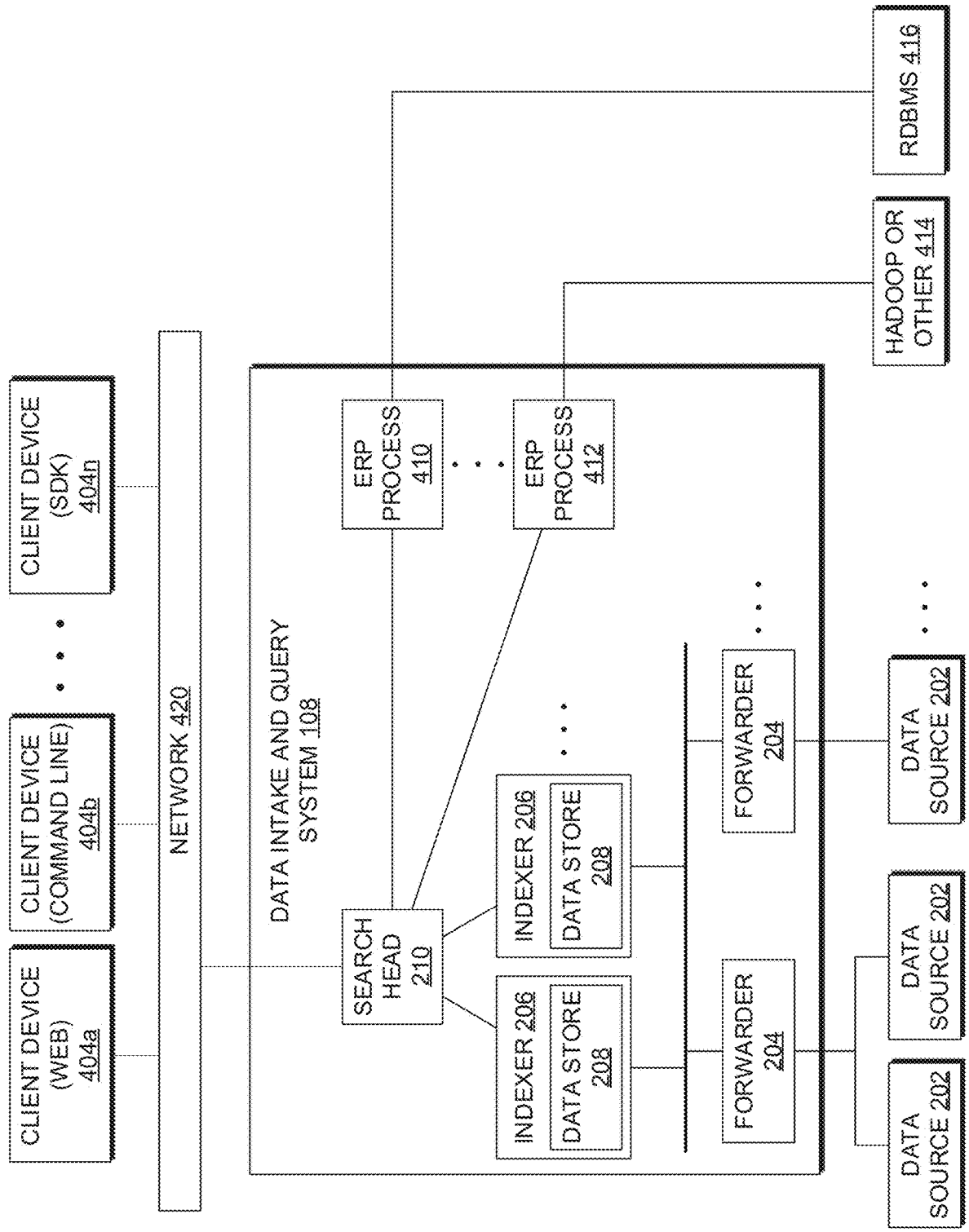
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404*a*, 404*b* . . . 404*n* may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.7.1. ERP Process Features

The ERP processes described above may include two operation modes: a streaming mode and a reporting mode.

The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results-when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.8. Data Ingestion

Figure 5A:
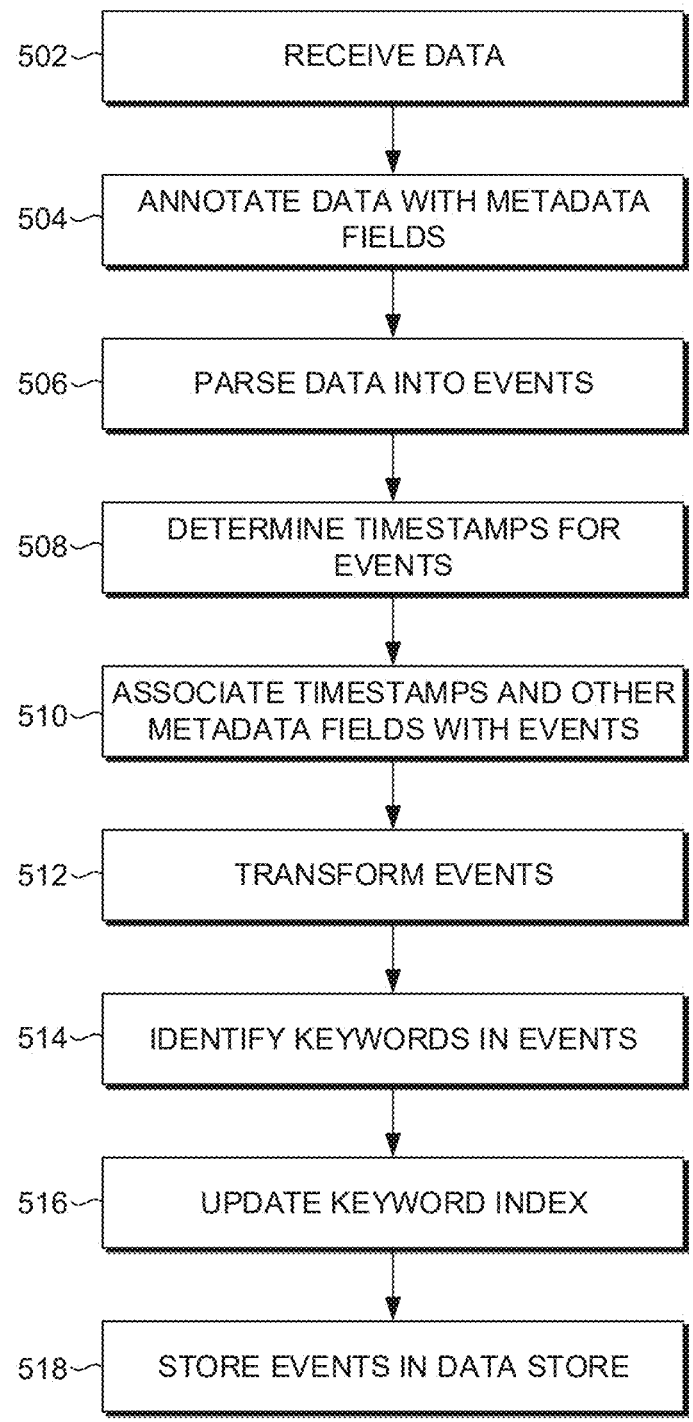
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.8.1. Input

At block 502, a forwarder receives data from an input source, such as a data source 202 shown in FIGS. 2A and 2B. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.8.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

Figure 5B:
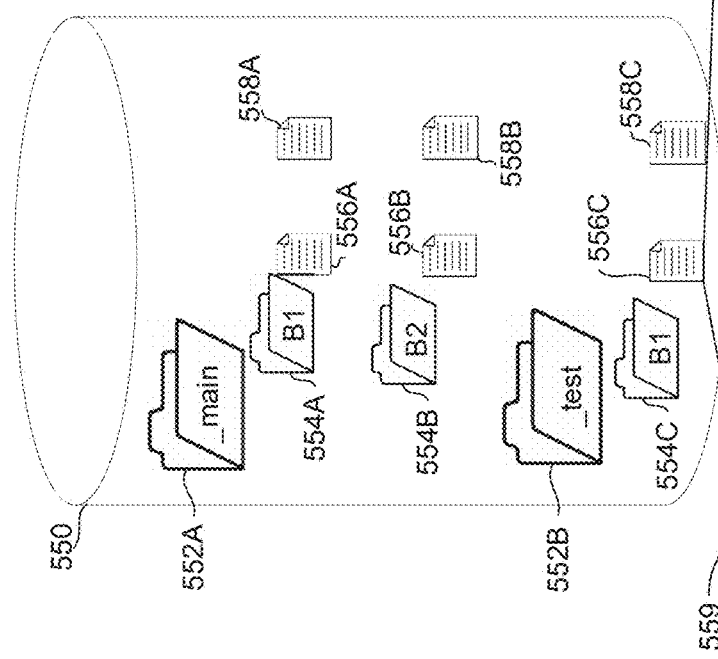

FIG. 5B (and FIG. 5C) is block diagram illustrating embodiments of various data structures for storing data processed by the system 108, such as data processed by an indexer 206. FIG. 5B includes an expanded view illustrating an example of machine data stored in a data store 550 of the data storage system 116. It will be understood that the depiction of machine data and associated metadata as rows and columns in the table 559 of FIG. 5B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 5B the data store 550 includes a directory 552 (individually referred to as 552A, 552B) for each index that contains a portion of data stored in the data store 550 and a sub-directory 554 (individually referred to as 554A, 554B, 554C) for one or more buckets of the index. In the illustrated embodiment of FIG. 5B, each sub-directory 554 corresponds to a bucket and includes an event data file 556 (individually referred to as 556A, 556B, 556C) and an inverted index 558 (individually referred to as 558A, 558B, 558C). However, it will be understood that each bucket can be associated with fewer or more files and each sub-directory 554 can store fewer or more files.

In the illustrated embodiment, the data store 550 includes a_main directory 552A associated with an index "_main" and a_test directory 552B associated with an index "_test." However, the data store 550 can include fewer or more directories. In some embodiments, multiple indexes can share a single directory or all indexes can share a common directory. Additionally, although illustrated as a single data store 550, it will be understood that the data store 550 can be implemented as multiple data stores storing different portions of the information shown in FIG. 5B. For example, a single index can span multiple directories or multiple data stores.

Furthermore, although not illustrated in FIG. 5B, it will be understood that, in some embodiments, the data store 550 can include directories for each tenant and sub-directories for each index of each tenant, or vice versa. Accordingly, the directories 552A and 552B can, in certain embodiments, correspond to sub-directories of a tenant or include sub-directories for different tenants.

In the illustrated embodiment of FIG. 5B, two sub-directories 554A, 554B of the_main directory 552A and one sub-directory 552C of the_test directory 552B are shown. The sub-directories 554A, 554B, 554C can correspond to buckets of the indexes associated with the directories 552A, 552B. For example, the sub-directories 554A and 554B can correspond to buckets "B1" and "B2," respectively, of the index "main" and the sub-directory 554C can correspond to bucket "B1" of the index "_test." Accordingly, even though there are two "B1" buckets shown, as each "B1" bucket is associated with a different index (and corresponding directory 552), the system 108 can uniquely identify them.

Although illustrated as buckets "B1" and "B2," it will be understood that the buckets (and/or corresponding sub-directories 554) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 5B, the files associated with a particular bucket can be stored in the sub-directory corresponding to the particular bucket. Accordingly, the files stored in the sub-directory 554A can correspond to or be associated with bucket "B1," of index "main," the files stored in the sub-directory 554B can correspond to or be associated with bucket "B2" of index "_main," and the files stored in the sub-directory 554C can correspond to or be associated with bucket "B1" of index "test."

FIG. 5B further illustrates an expanded event data file 556C showing an example of data that can be stored therein. In the illustrated embodiment, four events 560, 562, 564, 566 of the machine data file 556C are shown in four rows. Each event 560-566 includes machine data 570 and a timestamp 572. The machine data 570 can correspond to machine data received and processed by the system 108, such as machine data received and processed by the indexer 206.

Metadata 574-578 associated with the events 560-566 is also shown in the table 559. In the illustrated embodiment, the metadata 574-578 includes information about a host 574, source 576, and sourcetype 578 associated with the events 560-566. Any of the metadata can be extracted from the corresponding machine data, or supplied or defined by an entity, such as a user or computer system. The metadata fields 574-578 can become part of, stored with, or otherwise associated with the events 560-566. In certain embodiments, the metadata 574-578 can be stored in a separate file of the sub-directory 554C and associated with the machine data file 556C. In some cases, while the timestamp 572 can be extracted from the raw data of each event, the values for the other metadata fields may be determined by the system 108 (e.g., the indexers 206) based on information it receives pertaining to the host device 106 or data source 202 of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, the machine data of events 560-566 can be identical to portions of the machine data used to generate a particular event. Similarly, the entirety of machine data received by the system 108 (or an indexer 206) may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. For example, the machine data of a corresponding event (or events) may be modified such that only a portion of the machine data is stored as one or more events, or the machine data may be altered to remove duplicate data, confidential information, etc., before being stored as one or more events.

In FIG. 5B, the first three rows of the table 559 present events 560, 562, and 564 and are related to a server access log that records requests from multiple clients processed by a server, as indicated by entry of "access.log" in the source column 576. In the example shown in FIG. 5B, each of the events 560-564 is associated with a discrete request made to the server by a client. The raw machine data generated by the server and extracted from a server access log can include the IP address 540 of the client, the user id 541 of the person requesting the document, the time 542 the server finished processing the request, the request line 543 from the client, the status code 544 returned by the server to the client, the size of the object 545 returned to the client (in this case, the gif file requested by the client) and the time spent 546 to serve the request in microseconds. In the illustrated embodiment of FIGS. 5B, the raw machine data retrieved from a server access log is retained and stored as part of the corresponding events 560-564 in the file 556C.

Event 566 is associated with an entry in a server error log, as indicated by "error.log" in the source column 576 that records errors that the server encountered when processing a client request. Similar to the events related to the server access log, all the raw machine data in the error log file pertaining to event 566 can be preserved and stored as part of the event 566.

Saving minimally processed or unprocessed machine data in a data store associated with metadata fields in the manner similar to that shown in FIG. 5B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.8.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc. A non-limiting example of a bucket is described herein at least with reference to FIGS. 5B and 5C.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

FIG. 5C illustrates an embodiment of another file that can be included in one or more subdirectories 554 or buckets (described in greater detail herein at least with reference to FIG. 5B). Specifically, FIG. 5C illustrates an exploded view of an embodiments of an inverted index 558B in the sub-directory 554B, associated with bucket "B2" of the index "main," as well as an event reference array 580 associated with the inverted index 558B.

In some embodiments, the inverted indexes 558 can correspond to distinct time-series buckets. As such, each inverted index 558 can correspond to a particular range of time for an index. In the illustrated embodiment of FIG. 5C, the inverted indexes 558A, 558B correspond to the buckets "B1" and "B2," respectively, of the index "_main," and the inverted index 558C corresponds to the bucket "B1" of the index "test." In some embodiments, an inverted index 558 can correspond to multiple time-series buckets (e.g., include information related to multiple buckets) or inverted indexes 558 can correspond to a single time-series bucket.

Each inverted index 558 can include one or more entries, such as keyword (or token) entries 582 or field-value pair entries 584. Furthermore, in certain embodiments, the inverted indexes 558 can include additional information, such as a time range 586 associated with the inverted index or an index identifier 588 identifying the index associated with the inverted index 558. It will be understood that each inverted index 558 can include less or more information than depicted. For example, in some cases, the inverted indexes 558 may omit a time range 586 and/or index identifier 588.

In some such embodiments, the index associated with the inverted index 558 can be determined based on the location (e.g., directory 552) of the inverted index 558 and/or the time range of the inverted index 558 can be determined based on the name of the sub-directory 554.

Token entries, such as token entries 582 illustrated in inverted index 558B, can include a token 582A (e.g., "error," "itemID," etc.) and event references 582B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the system 108 (e.g., the indexers 206) can identify each word or string in an event as a distinct token and generate a token entry for the identified word or string. In some cases, the system 108 (e.g., the indexers 206) can identify the beginning and ending of tokens based on punctuation, spaces, etc. In certain cases, the system 108 (e.g., the indexers 206) can rely on user input or a configuration file to identify tokens for token entries 582, etc. It will be understood that any combination of token entries can be included as a default, automatically determined, or included based on user-specified criteria.

Similarly, field-value pair entries, such as field-value pair entries 584 shown in inverted index 558B, can include a field-value pair 584A and event references 584B indicative of events that include a field value that corresponds to the field-value pair (or the field-value pair). For example, for a field-value pair sourcetype::sendmail, a field-value pair entry 584 can include the field-value pair "sourcetype::sendmail" and a unique identifier, or event reference, for each event stored in the corresponding time-series bucket that includes a sourcetype "sendmail."

In some cases, the field-value pair entries 584 can be default entries, automatically determined entries, or user specified entries. As a non-limiting example, the field-value pair entries for the fields "host," "source," and "sourcetype" can be included in the inverted indexes 558 as a default. As such, all of the inverted indexes 558 can include field-value pair entries for the fields "host," "source," and "sourcetype." As yet another non-limiting example, the field-value pair entries for the field "IP_address" can be user specified and may only appear in the inverted index 558B or the inverted indexes 558A, 558B of the index "main" based on user-specified criteria. As another non-limiting example, as the indexers 206 indexes the events, it can automatically identify field-value pairs and create field-value pair entries 584. For example, based on the indexers' 206 review of events, it can identify IP_address as a field in each event and add the IP_address field-value pair entries to the inverted index 558B (e.g., based on punctuation, like two keywords separated by an '=' or ':' etc.). It will be understood that any combination of field-value pair entries can be included as a default, automatically determined, or included based on user-specified criteria.

With reference to the event reference array 580, each unique identifier 590, or event reference, can correspond to a unique event located in the time series bucket or machine data file 556B. The same event reference can be located in multiple entries of an inverted index 558. For example if an event has a sourcetype "splunkd," host "www1" and token "warning," then the unique identifier for the event can appear in the field-value pair entries 584 "sourcetype::splunkd" and "host::www1," as well as the token entry "warning." With reference to the illustrated embodiment of FIG. 5C and the event that corresponds to the event reference 3, the event reference 3 is found in the field-value pair entries 584 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 558 may include four sourcetype field-value pair entries 584 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 590 can be used to locate the events in the corresponding bucket or machine data file 556. For example, the inverted index 558B can include, or be associated with, an event reference array 580. The event reference array 580 can include an array entry 590 for each event reference in the inverted index 558B. Each array entry 590 can include location information 592 of the event corresponding to the unique identifier (non-limiting example: seek address of the event, physical address, slice ID, etc.), a timestamp 594 associated with the event, or additional information regarding the event associated with the event reference, etc.

For each token entry 582 or field-value pair entry 584, the event reference 582B, 584B, respectively, or unique identifiers can be listed in chronological order or the value of the event reference can be assigned based on chronological data, such as a timestamp associated with the event referenced by the event reference. For example, the event reference 1 in the illustrated embodiment of FIG. 5C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5C, the entries are sorted first by entry type and then alphabetically.

In some cases, inverted indexes 558 can decrease the search time of a query. For example, for a statistical query, by using the inverted index, the system 108 (or the indexers 206 or search head 210) can avoid the computational overhead of parsing individual events in a machine data file 556. Instead, the system 108 can use the inverted index 558 separate from the raw record data store to generate responses to the received queries.

2.9. QUERY PROCESSING

Figure 6A:
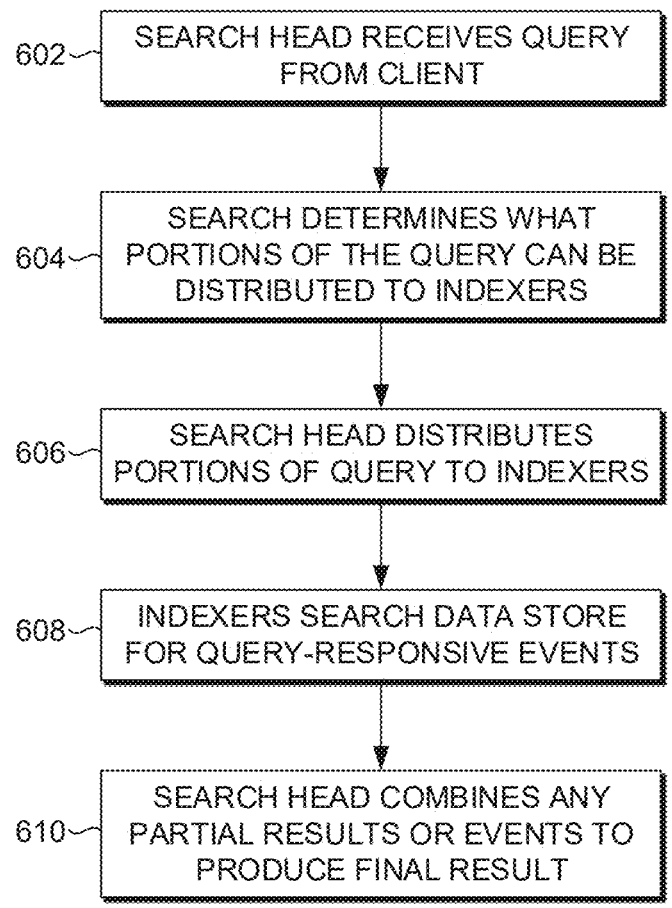
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a node coordinator, shown in FIG. 2B, but not shown in FIG. 2A) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.10. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
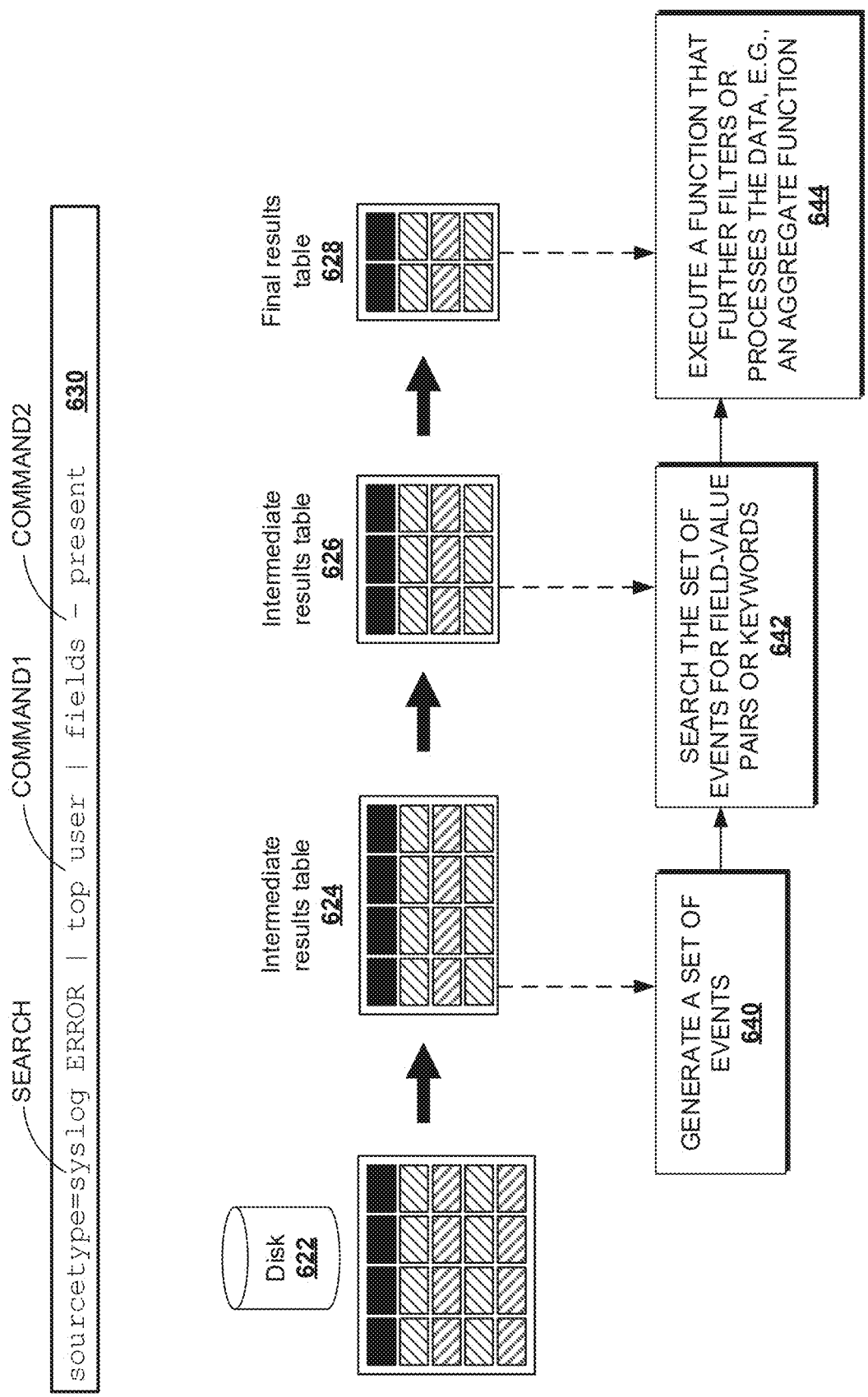
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630.

By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

2.11. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
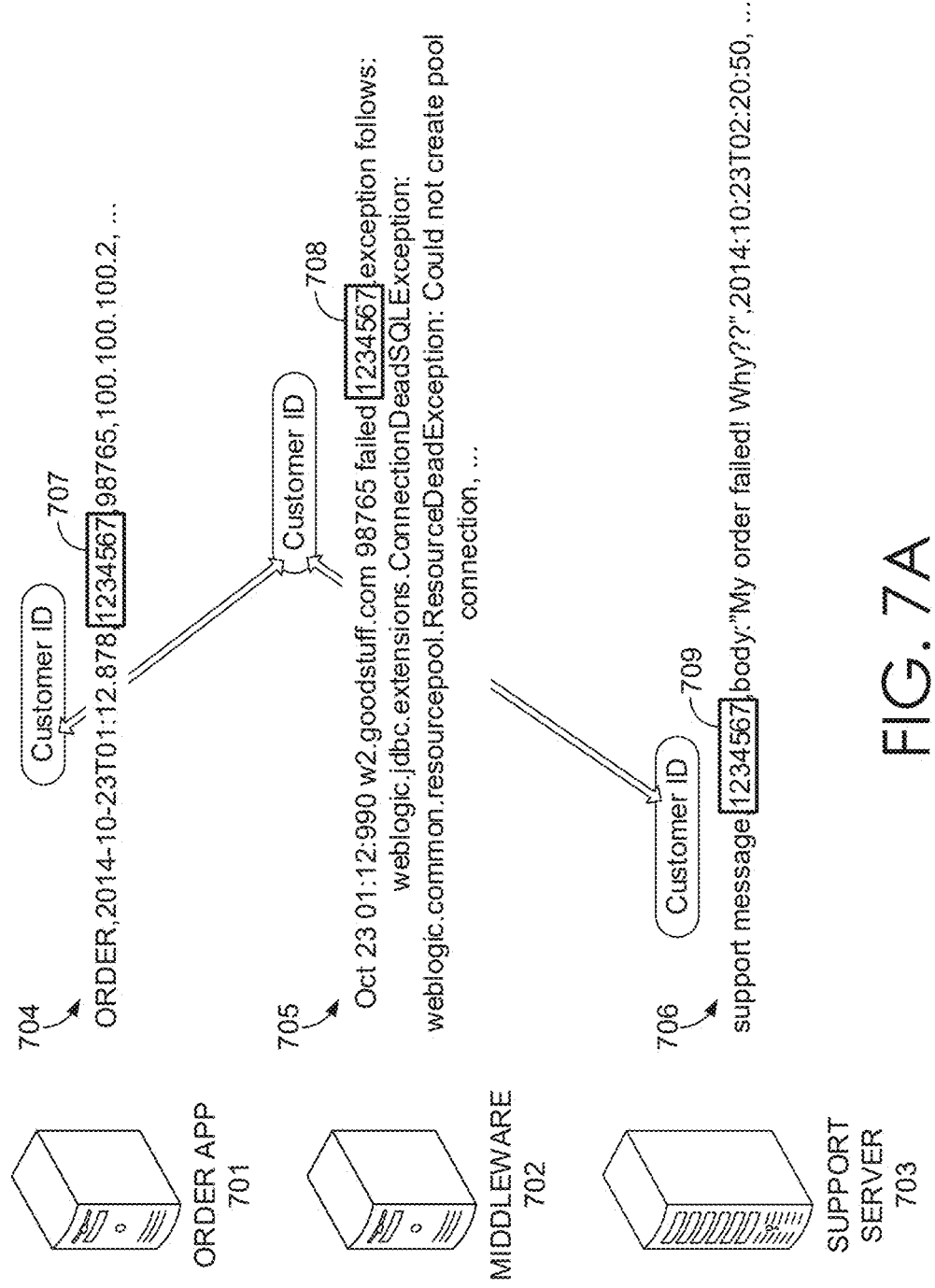
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 710 that includes only keywords (also known as "tokens"), e.g., the keyword "error" or "warning", the query search engine of the data intake and query system searches for those keywords directly in the event data 711 stored in the raw record data store. Note that while FIG. 7B only illustrates four events 712, 713, 714, 715, the raw record data store (corresponding to data store 208 in FIGS. 2A and 2B) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", the events 712, 713, and 714, will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the data intake and query system will search the event data directly and return the first event 712. Note that whether the keyword has been indexed at index time or not, in both cases the raw data of the events 712-715 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 716 during the execution of the search as shown in FIG. 7B.

Configuration file 716 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 716.

In some embodiments, the indexers may automatically discover certain custom fields at index time and the regular expressions for those fields will be automatically generated at index time and stored as part of extraction rules in configuration file 716. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 716 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 716 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 715 also contains "clientip" field, however, the "clientip" field is in a different format from the events 712, 713, and 714. To address the discrepancies in the format and content of the different types of events, the configuration file will also need to specify the set of events that an extraction rule applies to, e.g., extraction rule 717 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 716 and each of the extraction rules would comprise a different regular expression to parse out the associated field value. The most common way to categorize events is by source type because events generated by a particular source can have the same format.

The field extraction rules stored in configuration file 716 perform search-time field extractions. For example, for a query that requests a list of events with source type "access_combined" where the "clientip" field equals "127.0.0.1," the query search engine would first locate the configuration file 716 to retrieve extraction rule 717 that would allow it to extract values associated with the "clientip" field from the event data 720 "where the source type is "access_combined." After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, the events 712, 713, and 714 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 716 allows the record data store to be field searchable. In other words, the raw record data store can be searched using keywords as well as fields, wherein the fields are searchable name/value pairings that distinguish one event from another and can be defined in configuration file 716 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.12. Example Search Screen

Figure 8A:
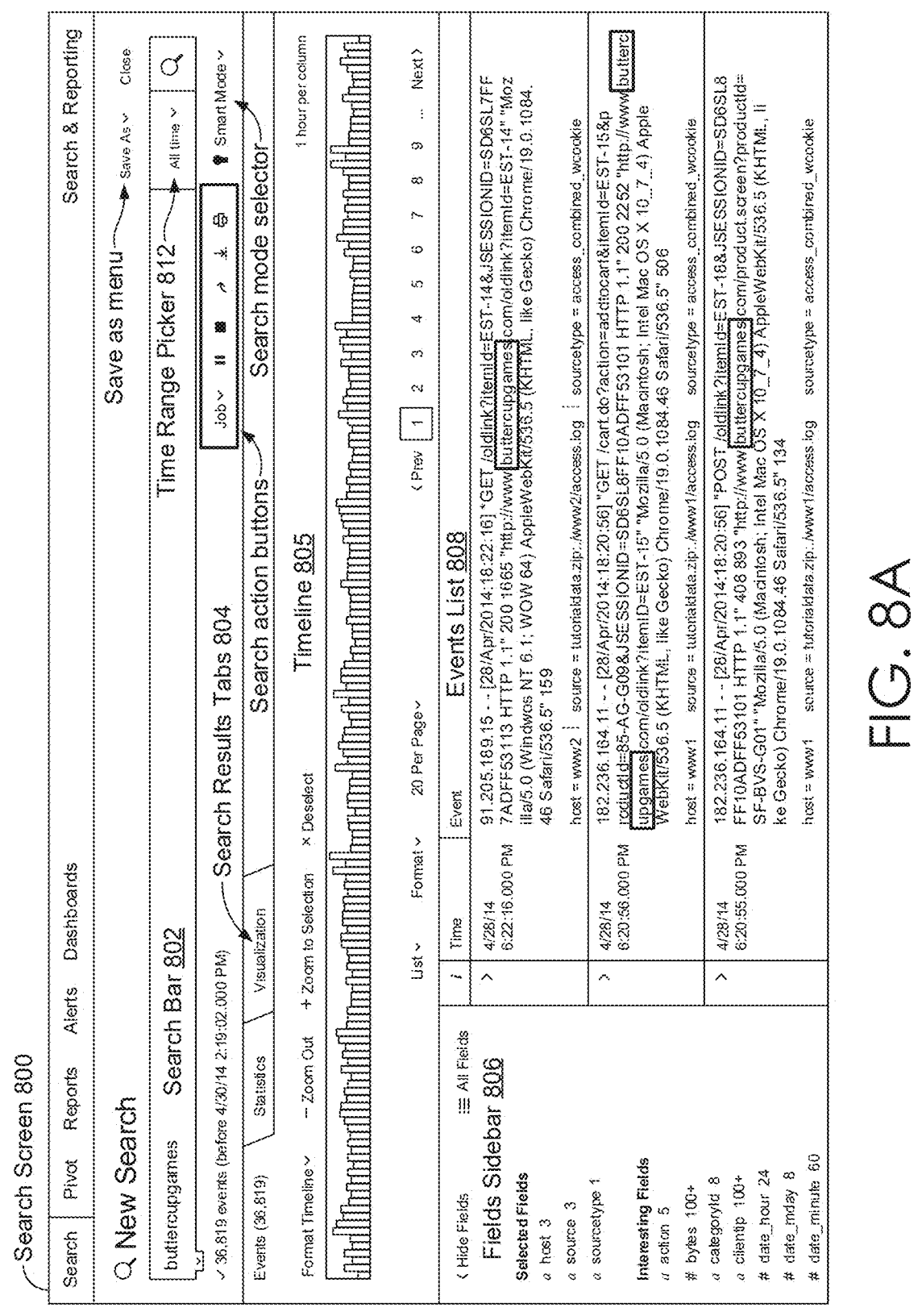

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.13. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
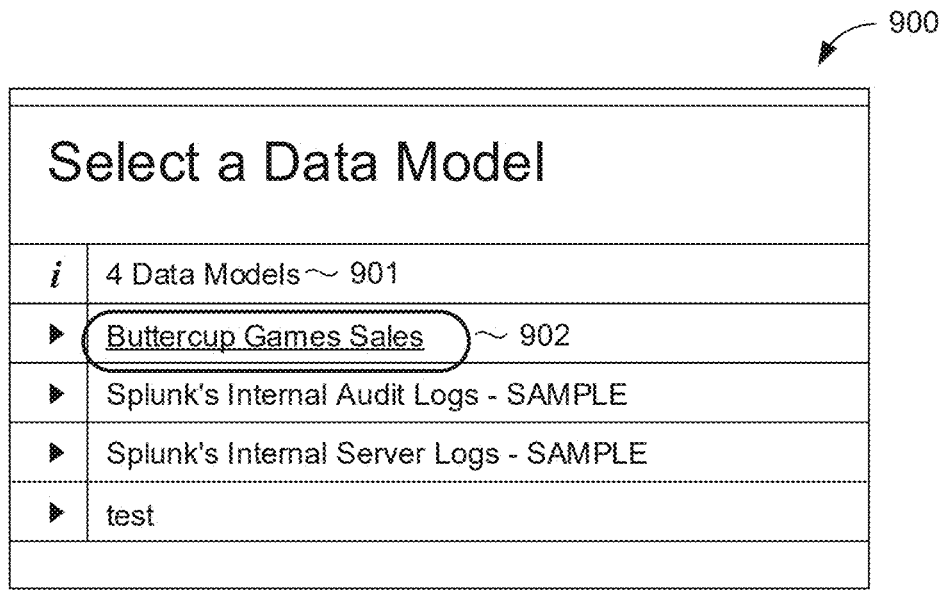

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
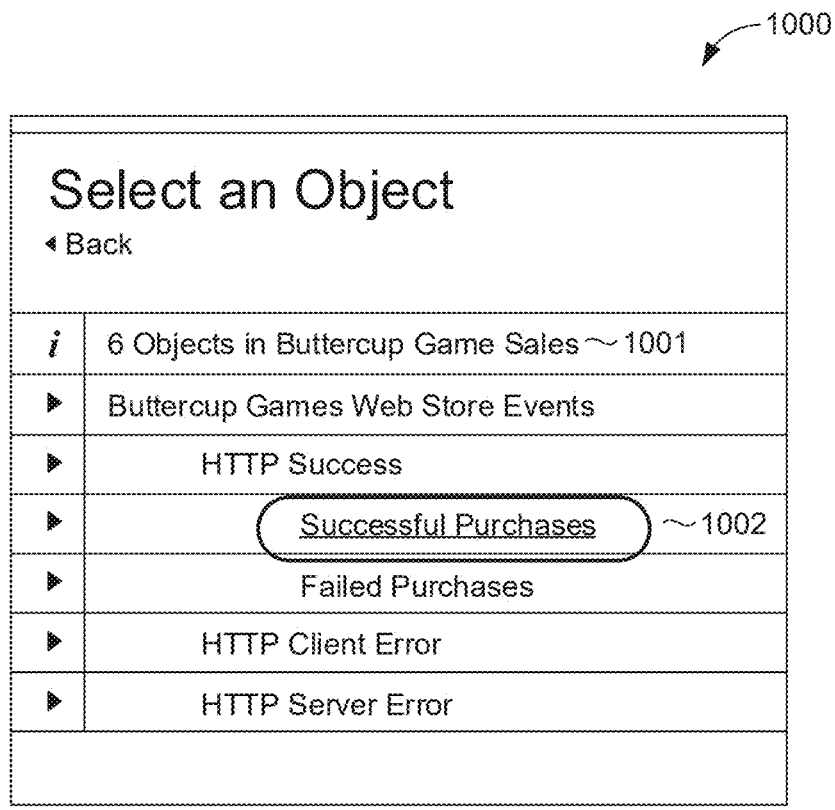

FIG. 10 illustrates an example data model object selection graphical user interface 1000 that displays available data objects 1001 for the selected data object model 902. The user may select one of the displayed data model objects 1002 for use in driving the report generation process.

Figure 11A:
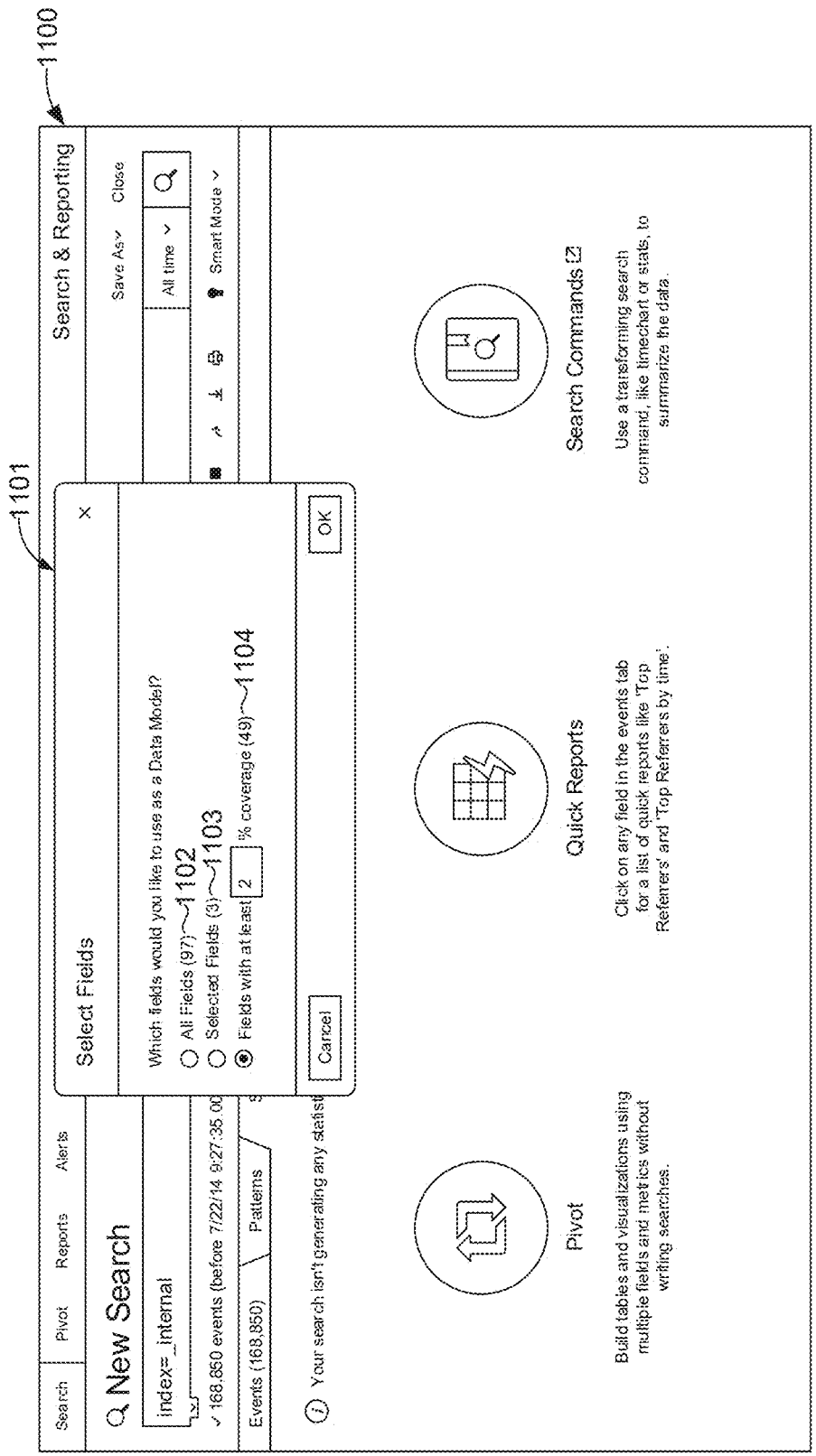

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
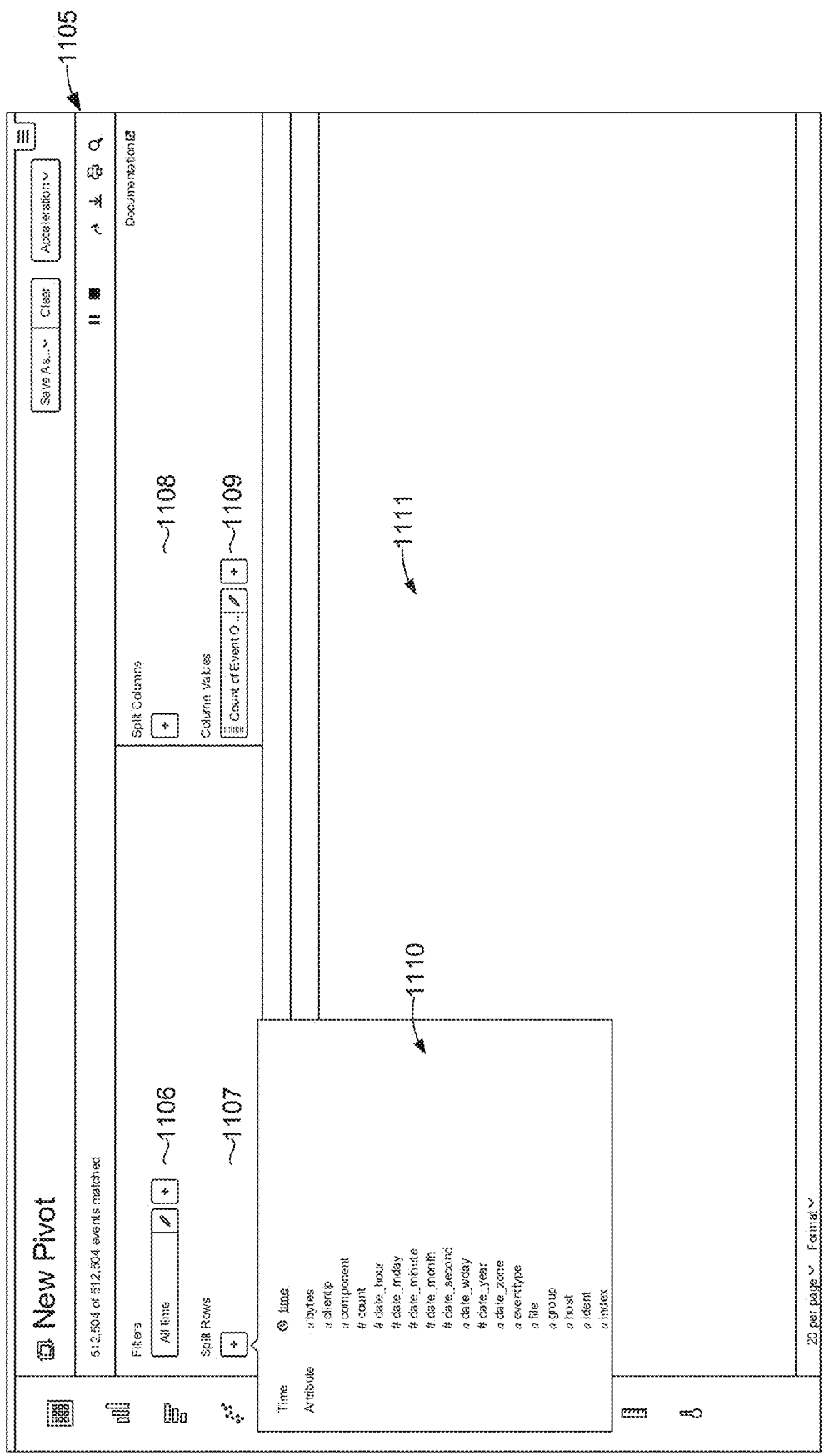
Figure 11C:
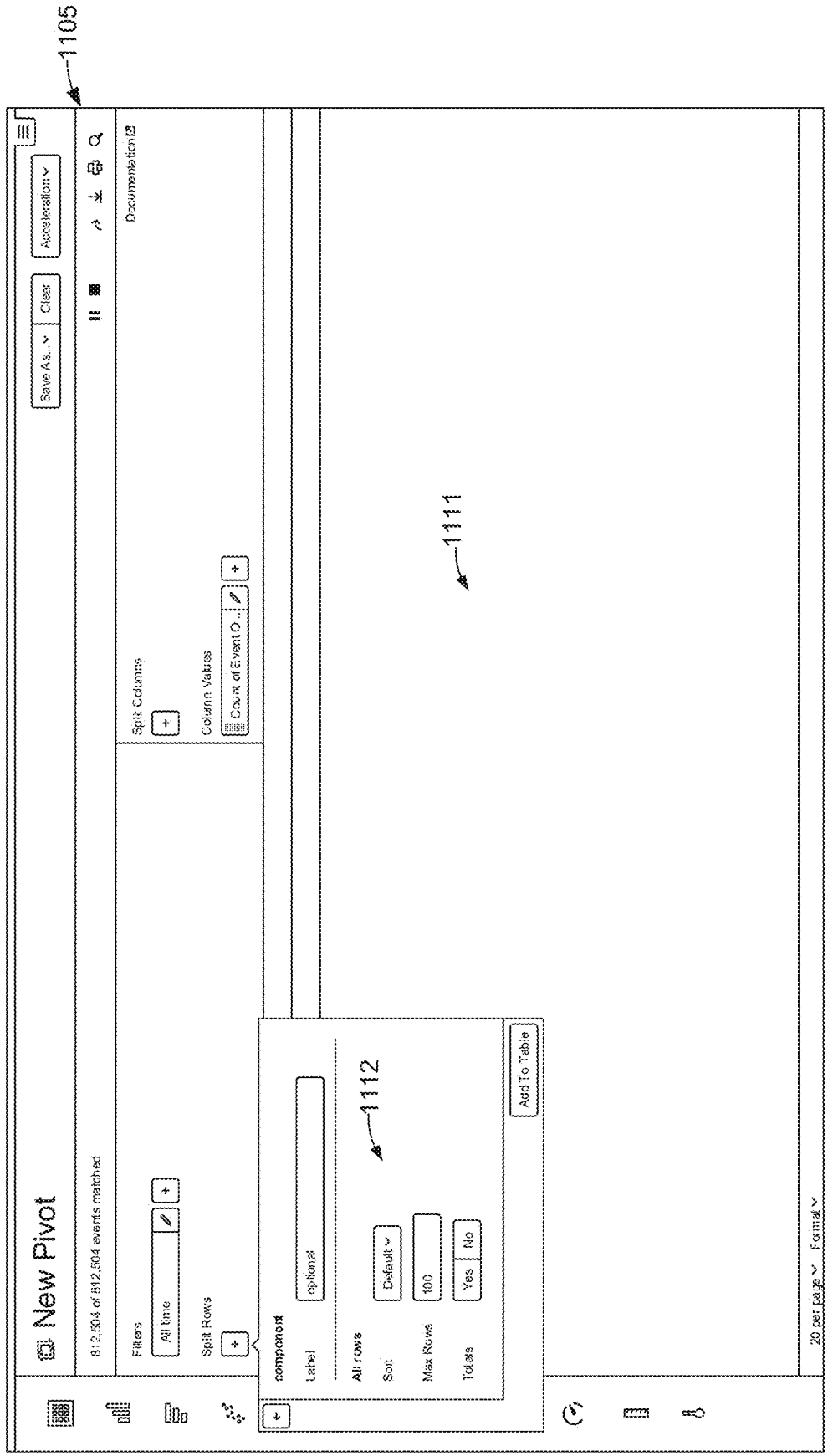

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
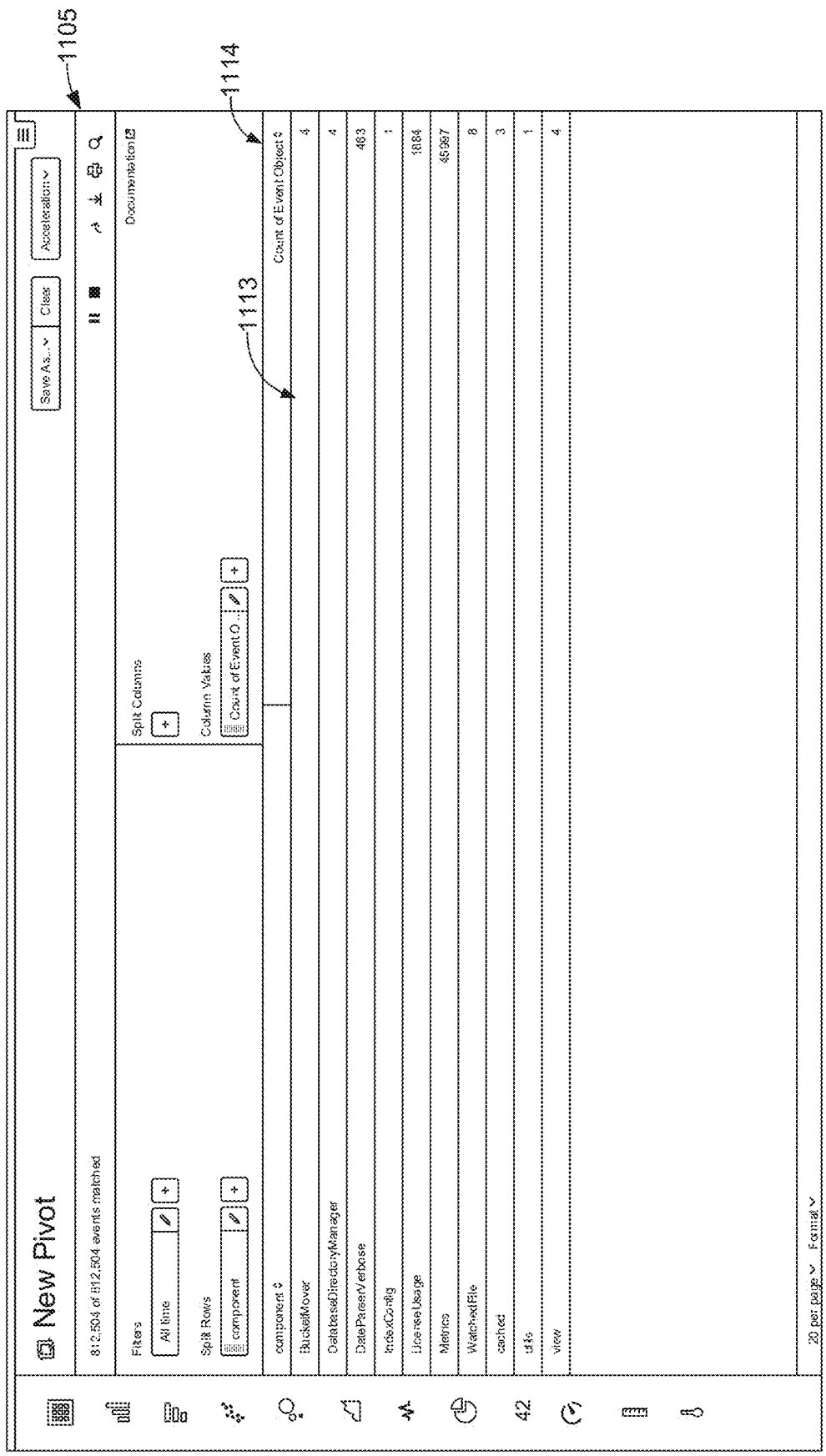

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
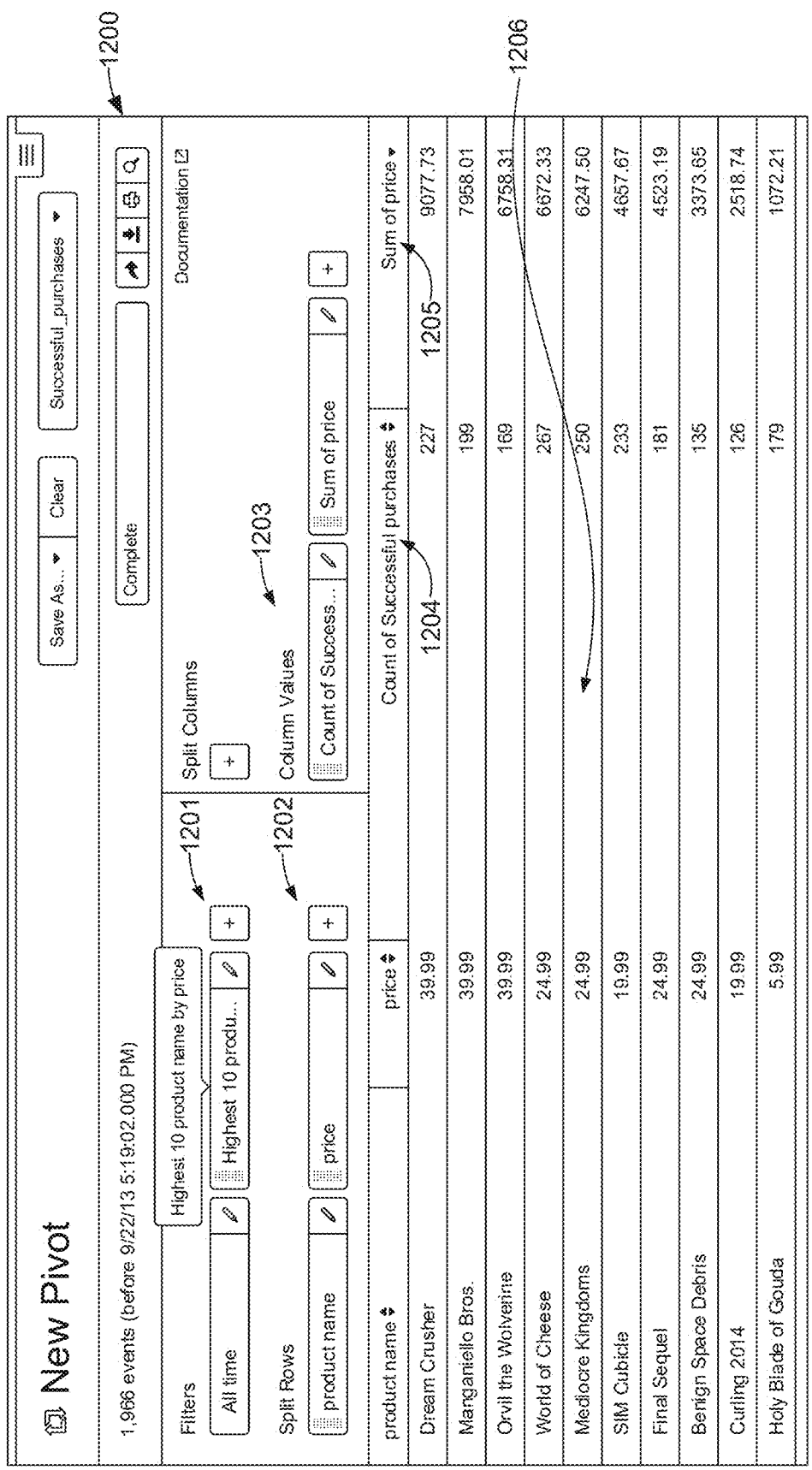

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
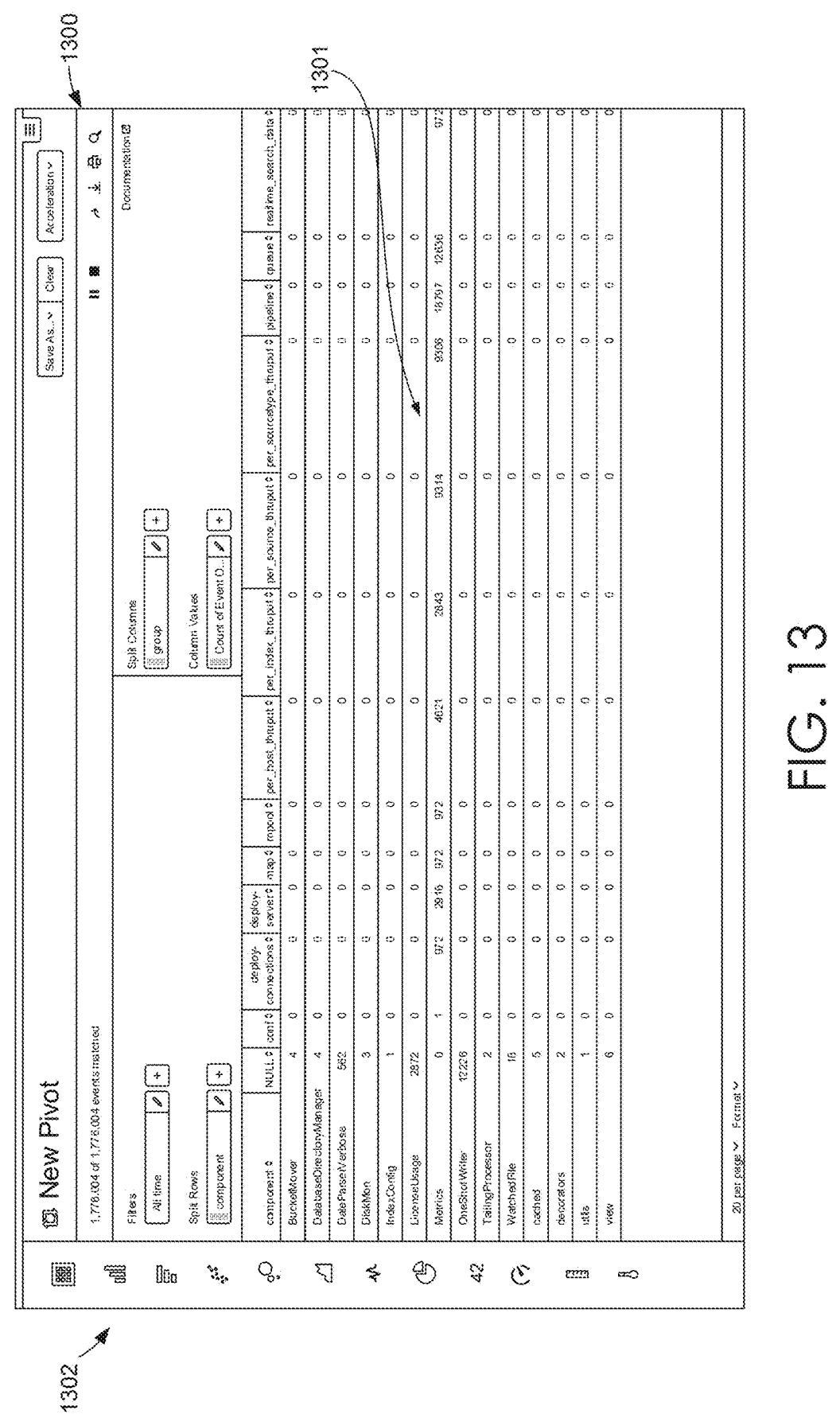
Figure 14:
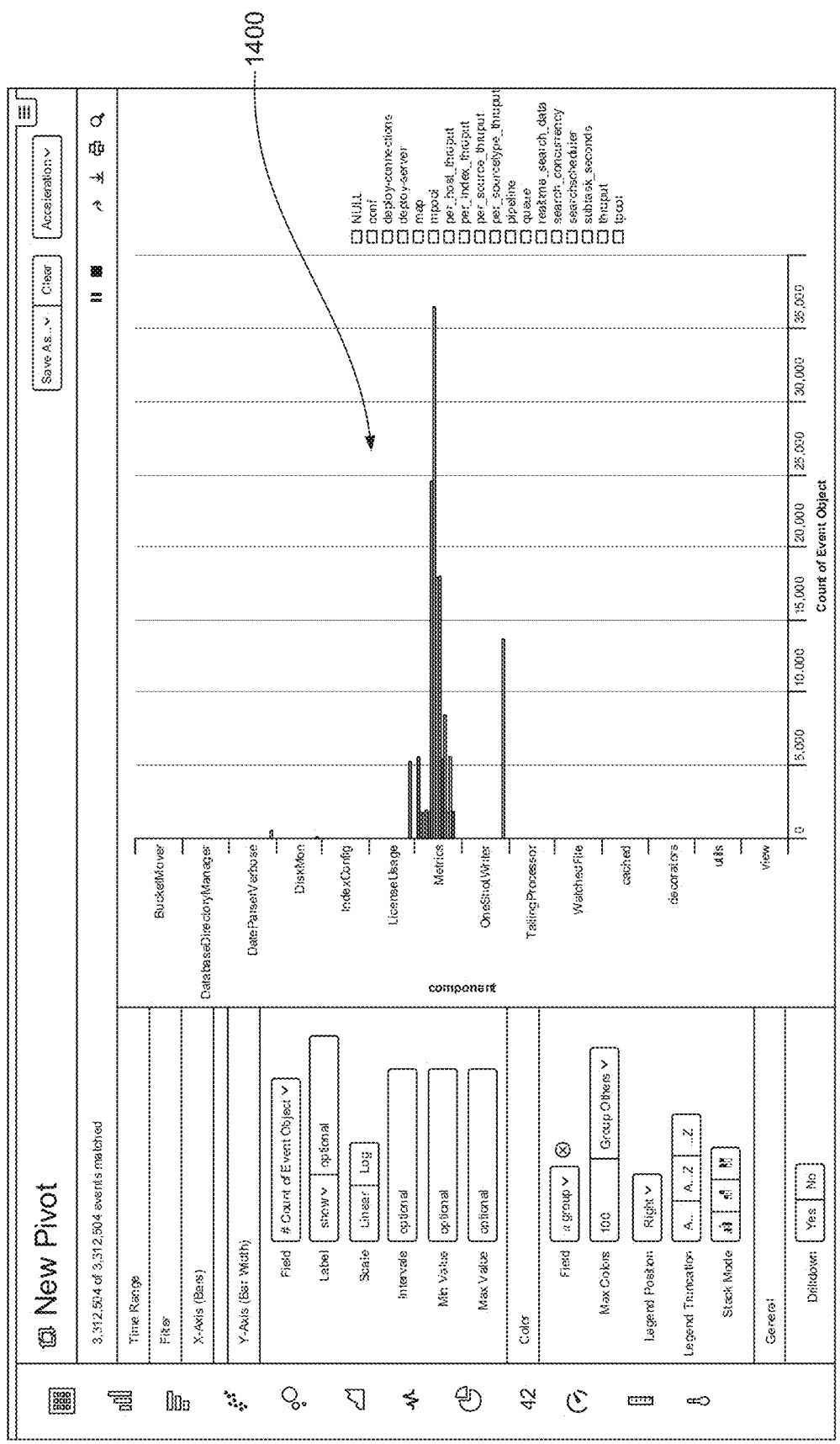
Figure 15:
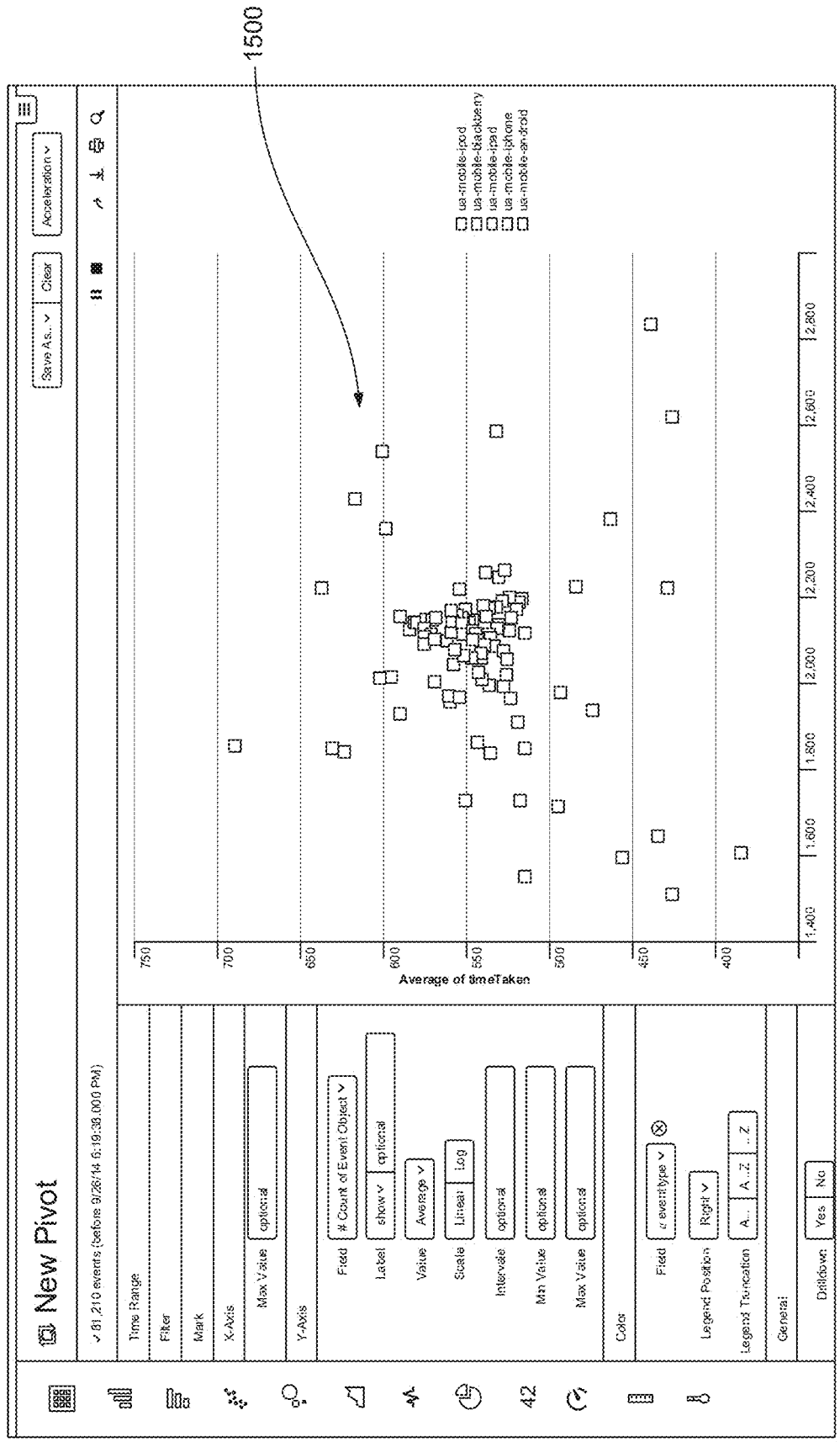

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.14. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.14.1. AGGREGATION TECHNIQUE

Figure 16:
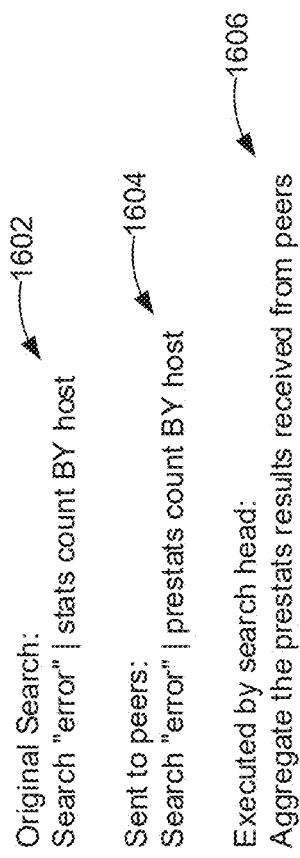
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks or subqueries 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce subquery 1604, and then distributes subquery 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.14.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.14.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiments, a query can comprise an initial step that calls up a pre-generated inverted index on which further filtering and processing can be performed. For example, referring back to FIG. 6B, a set of events can be generated at block 640 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access-_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within the inverted index 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may be generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.14.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 7C, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 722 to another filtering step requesting the user ids for the entries in inverted index 722 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "matt" would be returned to the user from the generated results table 725.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
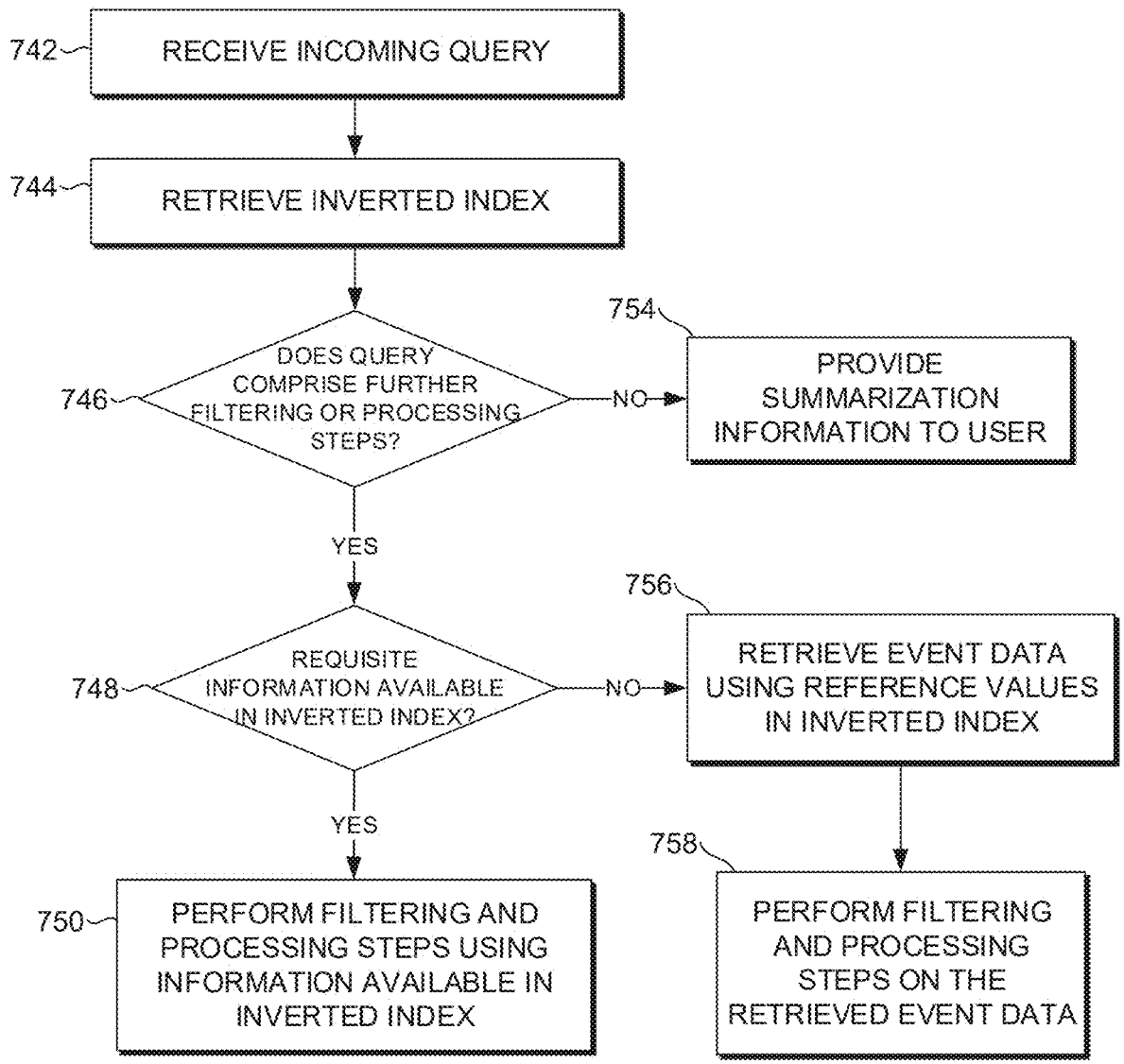
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.14.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.15. Security Features

The data intake and query system provides various schemas, dashboards, and visualizations that simplify developers' tasks to create applications with additional capabilities. One such application is an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat.

No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
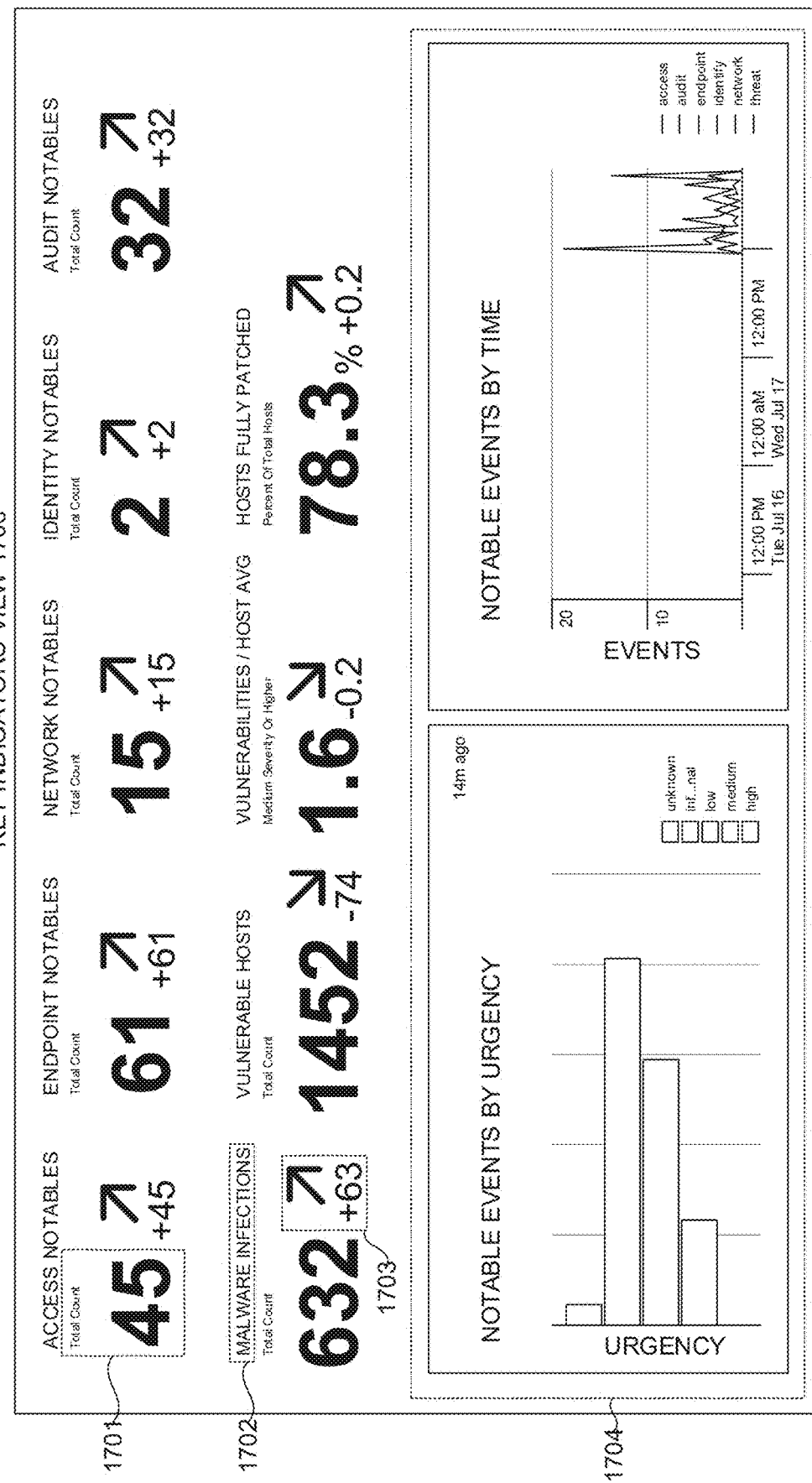
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
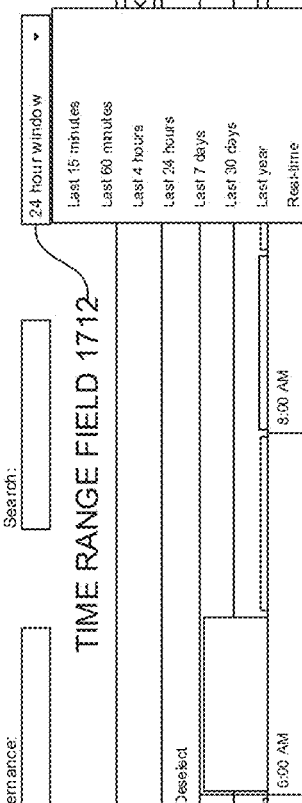
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.16. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,256, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
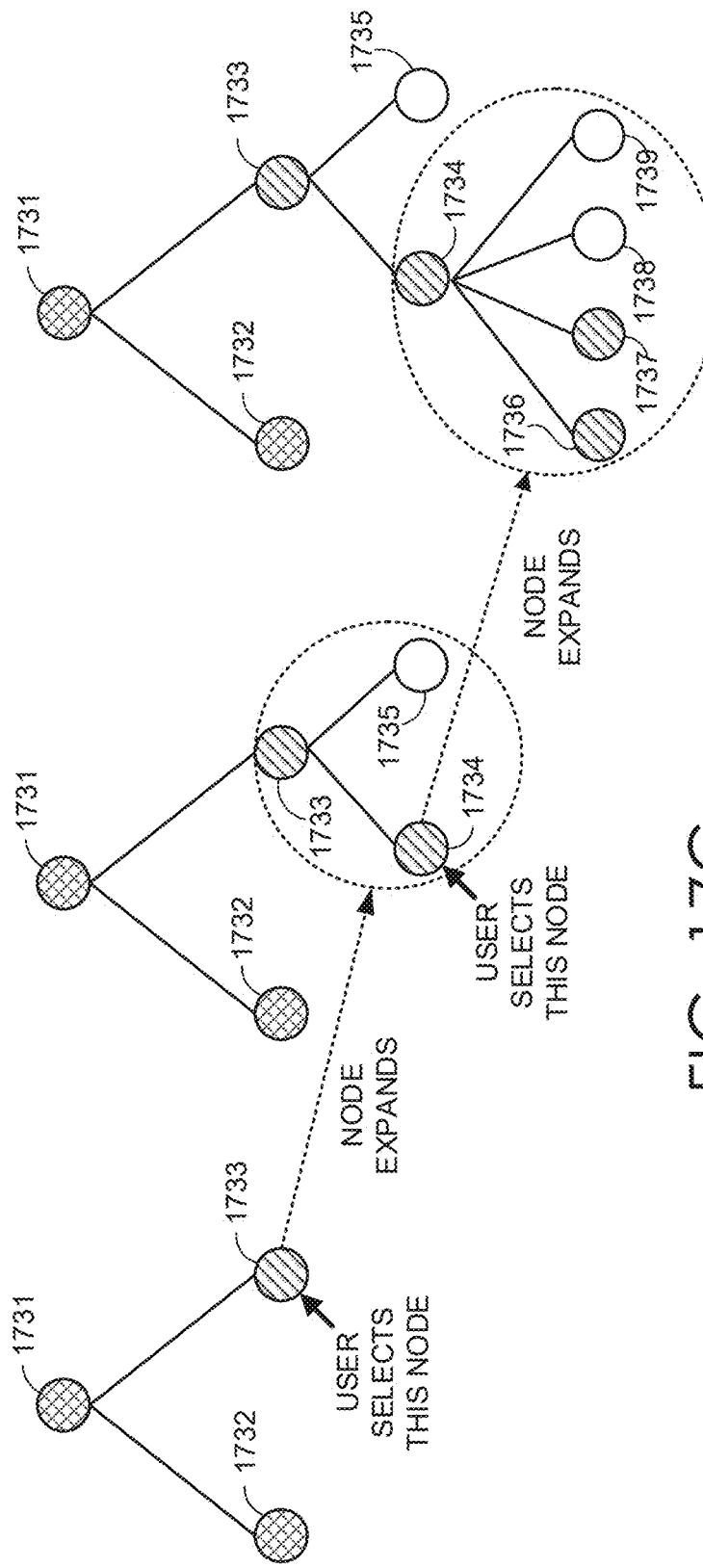
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
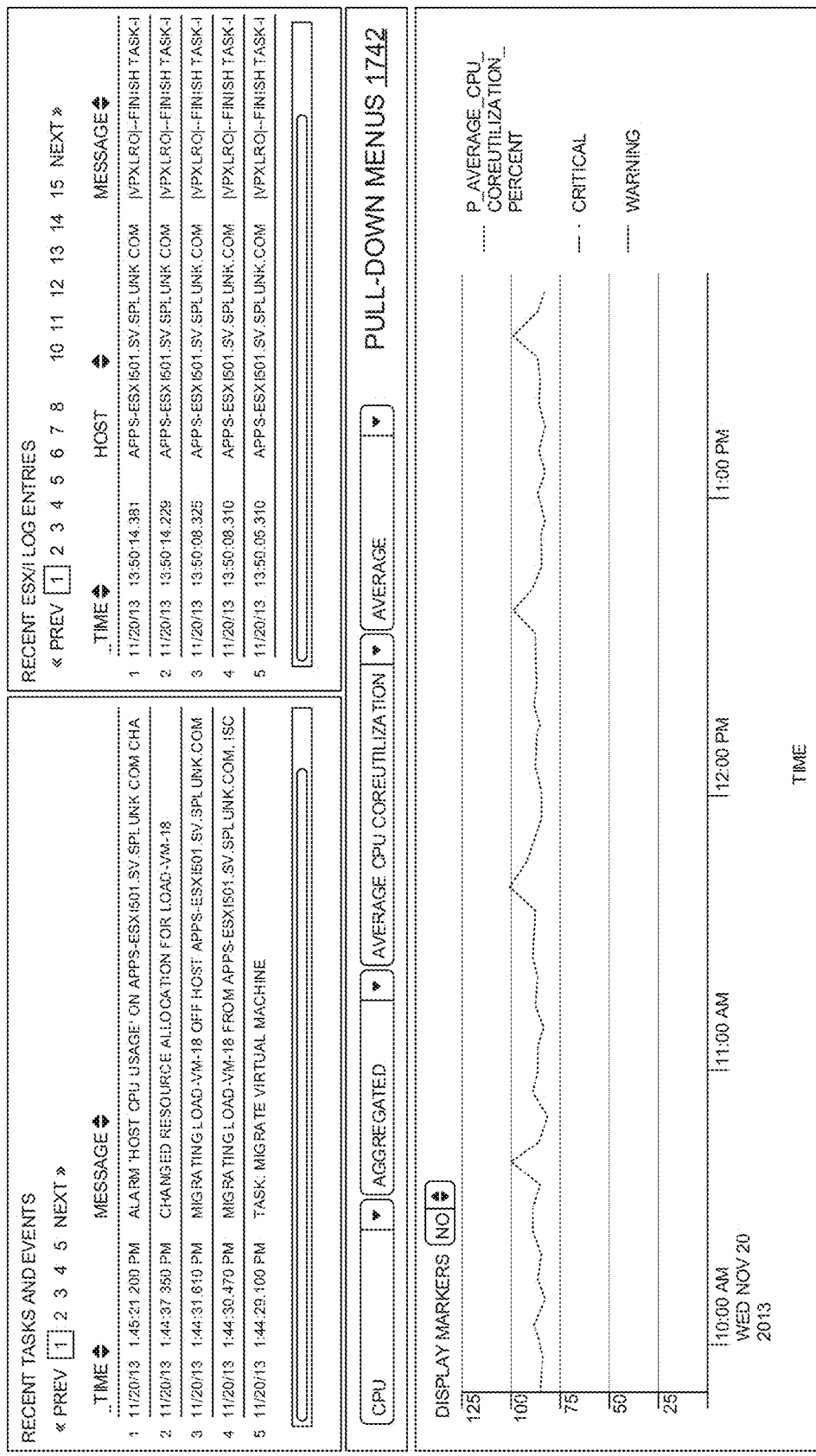
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,256, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.17. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

3.0. Processing Data Using Ingestors and a Message Bus

As described herein, the data intake and query system 108 can use ingestors 252 and a message bus 254 to process data.

3.1. Ingestor Data Flow Example

Figure 18:
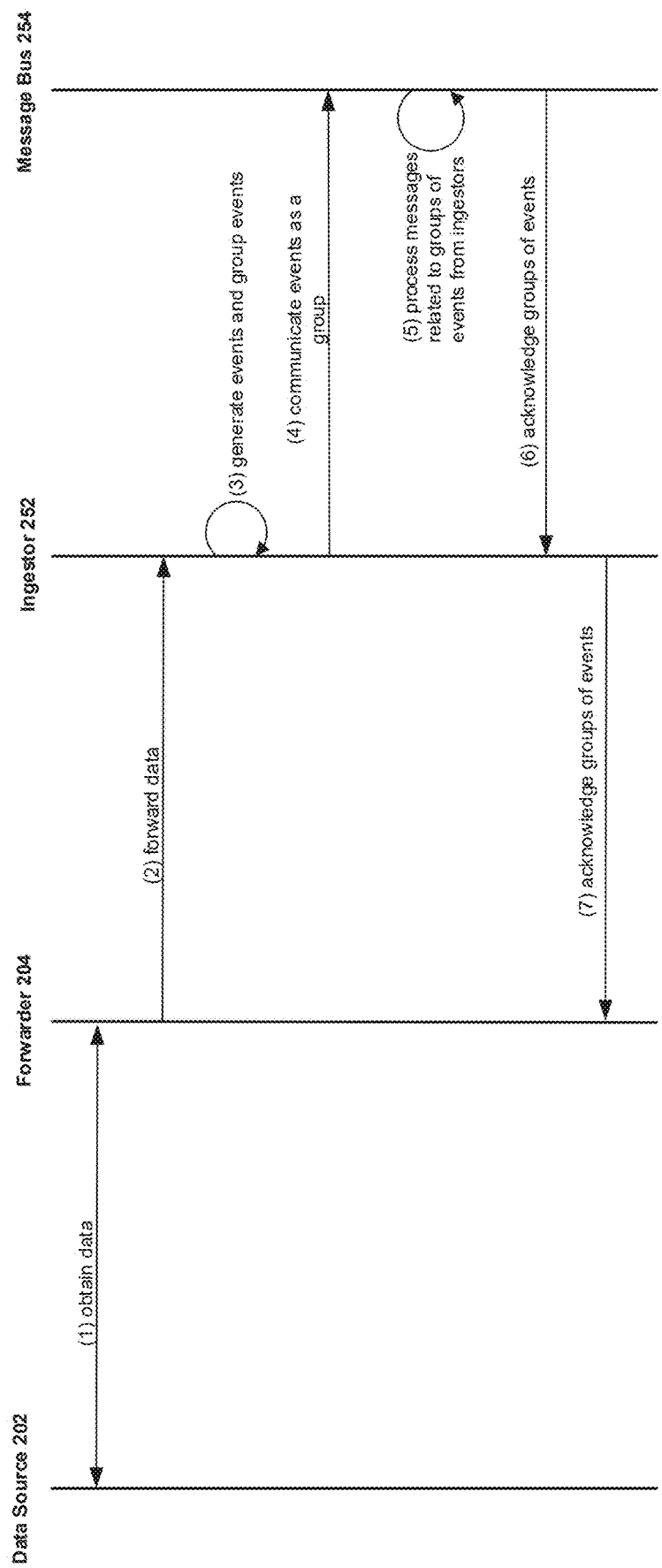
FIG. 18 is a data flow diagram illustrating an embodiment of the data flow and communications between a variety of the components of a distributed data processing system, such as the data intake and query system to generate and place events in a message bus.

FIG. 18 is a data flow diagram illustrating an embodiment of the data flow and communications between a variety of the components of a distributed data processing system, such as the data intake and query system 108 to generate and place events in a message bus 254. The data flow diagram of FIG. 18 illustrates an example of data flow and communications between a data source 202, forwarder 204, ingestor 252, and a message bus 254. However, it will be understood, that in some of embodiments, one or more of the functions described herein with respect to FIG. 18 can be omitted, performed concurrently or in a different order and/or performed by a different component of the data intake and query system 108. Further, a similar process can occur between different components. For example, rather than a forwarder 204 obtaining and forwarding data to the ingestor 252, a HEC or other component may obtain and forward data to the ingestor 252. Accordingly, the illustrated embodiment and description should not be construed as limiting.

At (1), a forwarder 204 obtains data from a data source 202. As described herein, the obtained data can be raw machine data, metrics or other data. The data can be obtained from one or more log files or other sources on the data source 202, etc.

At (2), the forwarder 204 forwards the data to an ingestor 252. In some cases, the forwarder 204 can perform some processing on the data before forwarding it to the ingestor 252. For example, the forwarder can append metadata to the data, such as, a host or source to the data. In certain cases, the forwarder 204 can perform additional processing on the data, such as generating events from the data.

At (3) the ingestor 252 generates events and groups events. In cases where the forwarder 204 has generated events or partially processed the data, the ingestor 252 can dynamically determine what processing is to be done and process the data or events depending on what processing has already been done and where the forwarder 204 has not generated events, the ingestor 252 can generate the events. As described herein, generating events can include, parsing the received data, applying line breaking to the data, merging lines to form multi-line events, determining host, source, and sourcetype of the data, applying regular expression rules to the data, extracting information from the data, such as punctuation, timestamps, etc. After generating an event, the ingestor 252 can add the event to a buffer or queue. Additional processes of the ingestor 252 can group events from the buffer or queue and prepare them for communication to the message bus 254. As part of this, the ingestor 252 can serialize or encode the group of events and determine the size of the group of events (or encoded group of events).

At (4), the ingestor 252 can send the group of events to the message bus 254. Depending on the size of the group of events, the ingestor 252 can send the group of events in different ways. If the size of the group of events satisfies or exceeds a message size threshold, the ingestor 252 can store the group of events in a data store 258 of the message bus 254, obtain a location reference to the storage location of the group of events in the data store 258, and communicate the location reference to a message queue 256 of the message bus 254. If the size of the events does not satisfy or is less than the message size threshold, the ingestor 252 can send the (encoded) group of events to the message queue 256 of the message bus 254.

At (5), the message bus 254 can process messages related to the groups of events. As described herein, the message bus 254 can include a message queue 256 and a data store 258. The message queue 256 can be implemented as a pub-sub and can make messages available to subscribers. The messages in the message queue 256 can include groups of events (encoded or decoded) or location references to groups of events (encoded or decoded) that are stored in the data store 258. The message queue 256 can track which messages have been sent to which indexers 206. In addition, the message queue 256 can track the messages as they are provided to indexers 206. Once a particular message has been acknowledged by an indexer 206 (e.g., after all of the events associated with the message have been stored in the shared storage system 260 as part of a slice or bucket), the message queue 256 can delete the particular message (and corresponding events). In cases where the grouped events are stored in the data store 258 and the message queue 256 includes a reference to the grouped events in the data store 258, the grouped events in the data store 258 can be deleted along with the corresponding message in the message queue 256.

At (6), the message bus 254 can acknowledge that the group of events have been stored in a recoverable manner such that if message bus 254 or other component of the data and intake query system 108 fails, the events can be recovered and will not be lost. In response, at (7), the ingestor 252 can acknowledge that the group of events have been stored. Based on the acknowledgement, the forwarder 204 can delete the data that corresponds to the group of events and/or communicate with the data source 202 to delete the data that corresponds to the group of events.

Fewer more or different functions can be performed by the different components of the data intake and query system 108. Further, it will be understood that the functions described herein can be performed concurrently for different data, multiple events, and/or messages. Accordingly, in some embodiments, an ingestor 252 can concurrently generate multiple events from different data, generate multiple groups of events, store multiple groups of events to the data store 258, communicate multiple references associated with different groups of events stored in the data store 258 to the message queue 256, and/or communicate multiple groups of events to the message queue 256. It will further be understood that multiple ingestors 252 can concurrently perform these functions for different data received from different sources.

3.2. Ingestor Flow Examples

Figure 19:
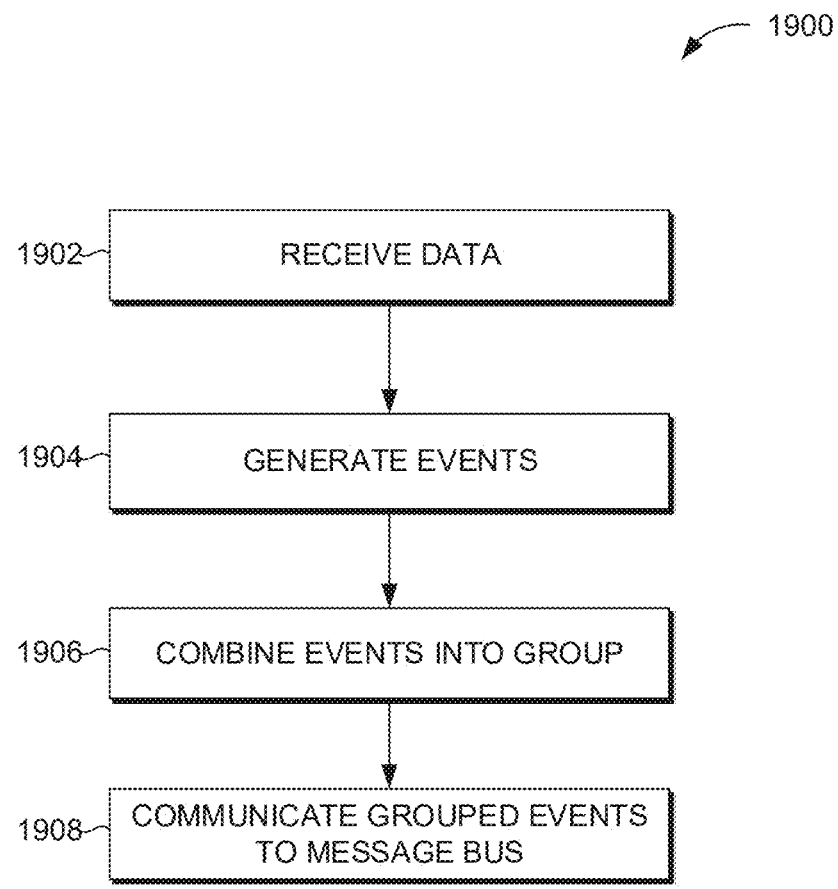
FIG. 19 is a flow diagram illustrative of an embodiment of a routine implemented by a computing device of a distributed data processing system, for communicating groups of events to a message bus.

FIG. 19 is a flow diagram illustrative of an embodiment of a routine 1900, implemented by a computing device of a distributed data processing system, for communicating groups of events to a message bus 254. Although described as being implemented by the ingestor 252 of the data intake and query system 108, it will be understood that the elements outlined for routine 1900 can be implemented by any one or a combination of computing devices/components that are associated with the data intake and query system 108. Thus, the following illustrative embodiment should not be construed as limiting.

At block 1902, the ingestor 252 receives data. The ingestor 252 can receive the data from one or more forwarders 204, HECs, or other component of the data intake and query system 108. The received data can include, but is not limited to, log data or raw machine data, events formed from log data, metrics, etc. In some cases, the ingestor 252 concurrently receives data from multiple components (e.g., multiple forwarders 204 and/or HECs). As described herein, the forwarders 204 and HECs can obtain the data from a data source 202.

At block 1904, the ingestor 252 generates events from the received data. As described herein, the ingestor 252 can perform a number of operations on the data to generate the events, including, but not limited to, parsing the received data, performing line breaking, merging lines, applying regex rules, extracting timestamps, and punctuation, associating metadata (e.g., host, source, and sourcetype), etc. In some cases, the ingestor 252 can use multiple pipelines of a pipeline set to generate the events. In certain cases, the ingestor 252 can add generated events to a buffer or queue for temporary storage until additional processing is to be performed on them.

At block 1906, the ingestor 252 combines multiple events into a group of events or grouped events to form a message payload. In some cases, the ingestor 252 pulls multiple events from a buffer or queue that temporarily stores the events to generate the group of events. The ingestor 252 can perform additional processing to prepare the multiple events for communication to a message bus. This can include encoding or serializing the grouped events and determining a size of the (encoded) grouped events.

In some embodiments, the ingestor 252 groups the events based on the constraints or capacity of the message bus 254 or message queue 256. For example, the message queue 256 may be a third-party provided message queue 256 and/or may have a maximum supported message size for messages or a configured maximum supported message size. Depending on the maximum supported message size, the ingestor 252 may form the grouped events differently. For example, with a larger maximum supported message size, the ingestor 252 may create larger groups with more events. For a smaller maximum supported message size, the ingestor 252 may create smaller groups with fewer events. In certain cases, each group of events may include whole events. In other words, if adding an event to a group would cause the group of events to exceed the maximum supported message size, the ingestor 252 may exclude the event from the group of events rather than attempting to include a portion of the event with the group of events.

In certain cases, the ingestor 252 may dynamically form grouped events depending on the constraints or capacity of the message queue 256. For example, in some cases, the message queue 256 may have a total capacity (e.g., memory capacity or processing capacity, etc.) that can be shared between different messages. Messages of different sizes may use different amounts of the message queue's 256 capacity. In some such cases, depending on the amount of available capacity (total capacity minus amount of capacity used by messages in the message bus), the ingestor 252 can dynamically prepare a group of events for inclusion as a message on the message queue 256. Accordingly, if the available capacity at a particular time is large than the group of events may be relatively large, whereas if the available capacity at a particular time is small, the group of events may be relatively small.

As described herein, the message queue 256 can form part of the message bus 254 and messages that exceeds the message queue's 256 maximum message size can be stored on the data store 258. In some such cases, the ingestor 252 may attempt to generate messages that are likely to satisfy the maximum message size or message size threshold of the message queue 256. For example, the ingestor 252 may use an average size of events to approximate the number of events that can be included in a group of events and then include that number of events in the group of events or message payload and/or track the actual size of each event as it is added to a group of events or message payload and stop adding events when it determines that adding one more event to the group of events will cause the group of events to satisfy or exceed the message size threshold. Similarly, the ingestor 252 may use an average size of encoded or serialized events to approximate and add events to a group of events or message payload and/or track the actual size of each event after it has been encoded to add events to a group of events or message payload.

In some cases, the ingestor 252 only includes complete events in a group of events or message payload. For example, if adding one additional event would cause the ingestor 252 to exceed the message size threshold, the ingestor 252 can omit the additional event from the group of events rather than attempting to include a portion of the event in the group of events.

At block 1908, the ingestor 252 communicates the grouped events as a message payload to a message bus 254. As described herein, as part of communicating the grouped events to the message bus 254, the ingestor 252 can determine the size of the grouped events or message payload. If the size of the grouped events or message payload satisfies or exceeds a size threshold or maximum message size of the message queue 256, the ingestor 252 can send the grouped events to the data store 258 for storage, obtain a location reference to the grouped events on the data store 258, and communicate the location reference to the message queue 256 for inclusion as a message on the message queue 256.

If the size of the grouped events or message payload does not satisfy the message size threshold or maximum message size of the message queue 256, the ingestor 252 can send the grouped events or message payload to the message queue 256 for inclusion as a message on the message queue 256.

Fewer, more, or different blocks can be used as part of the routine 1900. In some cases, one or more blocks can be omitted. In some embodiments, the blocks of routine 1900 can be combined with any one or any combination of blocks described herein with reference to at least FIGS. 19-23. For example, in some embodiments, the ingestors 252 can monitor their processing capacity and utilization. Based on a determination that their utilization satisfies a high utilization threshold, the ingestors 252 can request that additional ingestors 252 be added to process incoming data. In a similar fashion, if the capacity satisfies a low utilization threshold, one or more of the ingestors 252 can be shut down.

In some cases, rather than the ingestors 252 monitoring their capacity and utilization a separate monitoring component, such as the node coordinator 262, can monitor the capacity and/or utilization of the ingestors 252 and scale up or scale down the number of ingestors 252 based on the overall or individual capacity and/or utilization. Further, as the ingestors 252 are separate from the indexers 206, they can be scaled up or scaled down independent of the indexers 206. As such, the number of components generating events can be dynamically scaled depending on the demands of the system and can be different from and independent of the number of components generating buckets of events, etc.

In certain cases, the ingestor 252 or a monitoring component can track the relationship between a received data chunk, events generated from the received data, groups of events to which the generated events are added, and messages to which the generated events are added. As such, once a message is stored to the message bus 254, the ingestor 252 can determine which events have been stored to the message bus 254. Once all the events associated with the same data chunk are stored to the message bus, the ingestor 252 can acknowledge the data chunk to the forwarder 204. In response, the forwarder can delete the data chunk of forward the acknowledgement to the data source 202 for deletion, etc.

Figure 20:
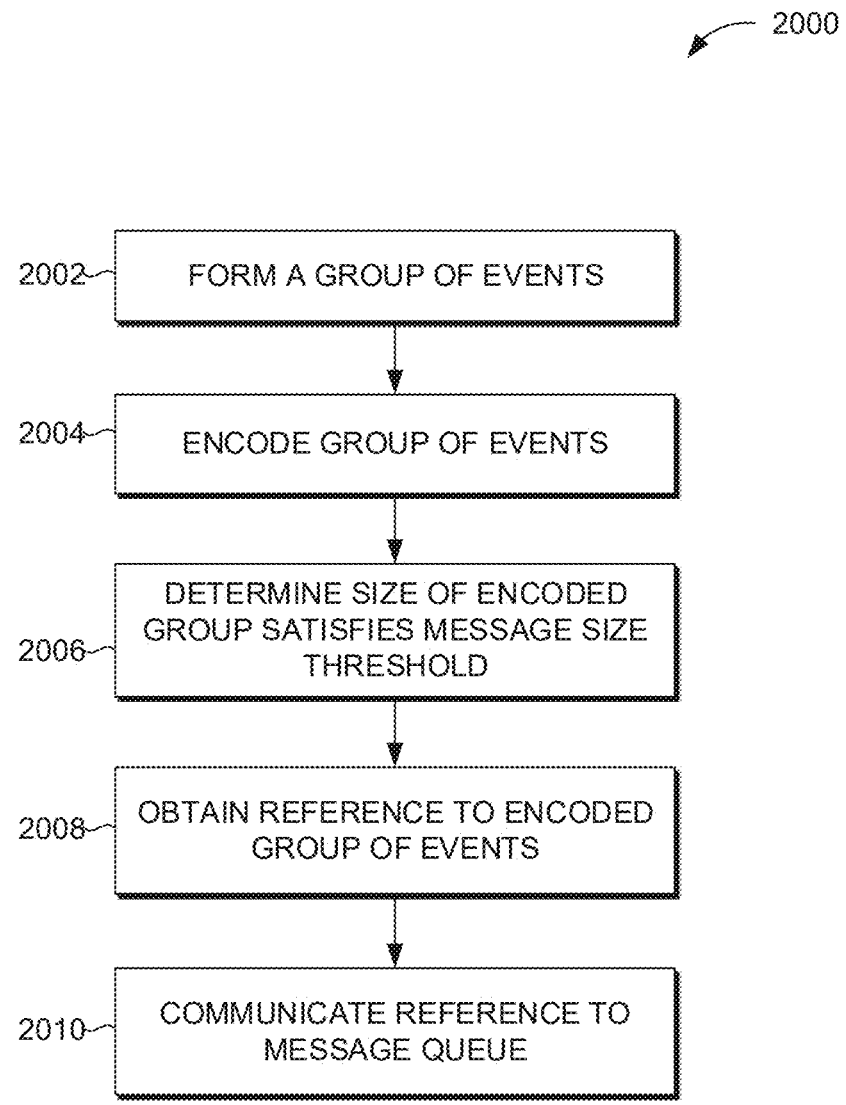
FIG. 20 is a flow diagram illustrative of an embodiment of a routine, implemented by a computing device of a distributed data processing system, for communicating groups of events to a message bus.

FIG. 20 is a flow diagram illustrative of an embodiment of a routine 2000, implemented by a computing device of a distributed data processing system, for communicating groups of events to a message bus 254. Although described as being implemented by the ingestor 252 of the data intake and query system 108, it will be understood that the elements outlined for routine 2000 can be implemented by any one or a combination of computing devices/components that are associated with the data intake and query system 108. Thus, the following illustrative embodiment should not be construed as limiting.

At block 2002, the ingestor forms a group of events. As described herein, the ingestor 252 can generate the events and place them in a buffer. The events can be generated from raw machine data, metrics, etc. and include raw machine data or metrics associated with a timestamp. The ingestor 252 can then group events from the buffer into groups of events. As mentioned, in some cases, the ingestor 252 can group events and/or form a message payload based on the constraints and/or capacity of the message queue 256, which may be implemented by a third party.

At block 2004, the ingestor 252 encodes the group of events. In certain cases, the encoding can reduce the size of the data and/or the ingestors 252 can compress the data to reduce its size. For example, the ingestor may use zstd or gzip to compress the data or compress the encoded data. In some cases the ingestor 252 uses a schema oriented protocol to encode the data, such as, but not limited to protobuf, thrift, avro, S2S, etc. In certain cases, the ingestor 252 uses a base64 encoding to encode the data and/or to encode the data that is to be sent to the message queue 256.

At block 2006, the ingestor 252 determines that the size of the encoded group satisfies a message size threshold. As described herein, the message size threshold can be based on the constraints or capacity of the message queue 256 and can vary depending on the message queue 256 used. For example, as described herein, the message queue 256 may have a maximum message size. In some such cases, the maximum message size (or some offset from the maximum message size to allow for header and other data in the message) can be used as the message size threshold. Accordingly, in determining that the size of the encoded group satisfies the size threshold, the ingestor 252 can determine that the size of the encoded group exceeds the maximum message size (or some offset of it).

At block 2008, the ingestor 252 stores the encoded group of events to a remote data store 258. In some cases, the ingestor 252 stores the encoded group of events to the remote data store 258 based on the determination that the group encoded group of messages satisfies the message size threshold. As described herein, the remote data store 258 can be a standalone data store and/or part of cloud storage or even the shared storage system 260.

At block 2010, the ingestor 252 obtains a reference to the encoded group. The reference can include information about the location of the encoded group of events in the remote data store. In some cases, the ingestor 252 can receive the reference to the encoded group from the remote data store 258 as part of storing the encoded group on the remote data store 258.

At block 2012, the ingestor communicates the reference to a message queue 256 as part of a message. As described herein, by communicating the reference to the message queue 256 instead of the encoded group, the size of the message for the message queue 256 can be smaller and stay under the maximum message size or message size threshold of the message queue 256. Further, as described herein, an indexer 206 can retrieve the message that include the reference from the message queue 256 and use the reference to obtain the encoded events from the remote data store 258. In this way, the ingestor 252 can send larger message to the indexers 206 while satisfying the constraints of the message queue 256.

Fewer, more, or different blocks can be used as part of the routine 2000. In some cases, one or more blocks can be omitted. In some embodiments, the blocks of routine 2000 can be combined with any one or any combination of blocks described herein with reference to at least FIGS. 19, and/or 21-23. For example, in some embodiments, the events may not be encoded before determining their size and/or storing them to the data store 258. In other cases, the ingestor 252 may determine that the encoded (or decoded) group of events do not satisfy the message size threshold. In some such cases, the ingestor 252 may communicate the group of events to the message queue 256 as part of a message and may exclude blocks 2006-2010.

In addition, as described herein at least with reference to FIG. 19, the ingestors can send an acknowledgement to a forwarder 204 or other source once events associated with a data chunk received from the source have been saved to the message bus. Further, as described herein at least with reference to FIG. 19, the ingestors 252 (or a monitoring component) can monitor the ingestors 252 and scale up or scale down the number of ingestors 252 independent of the number of indexer 206.

3.3. Indexer Data Flow Example

Figure 21:
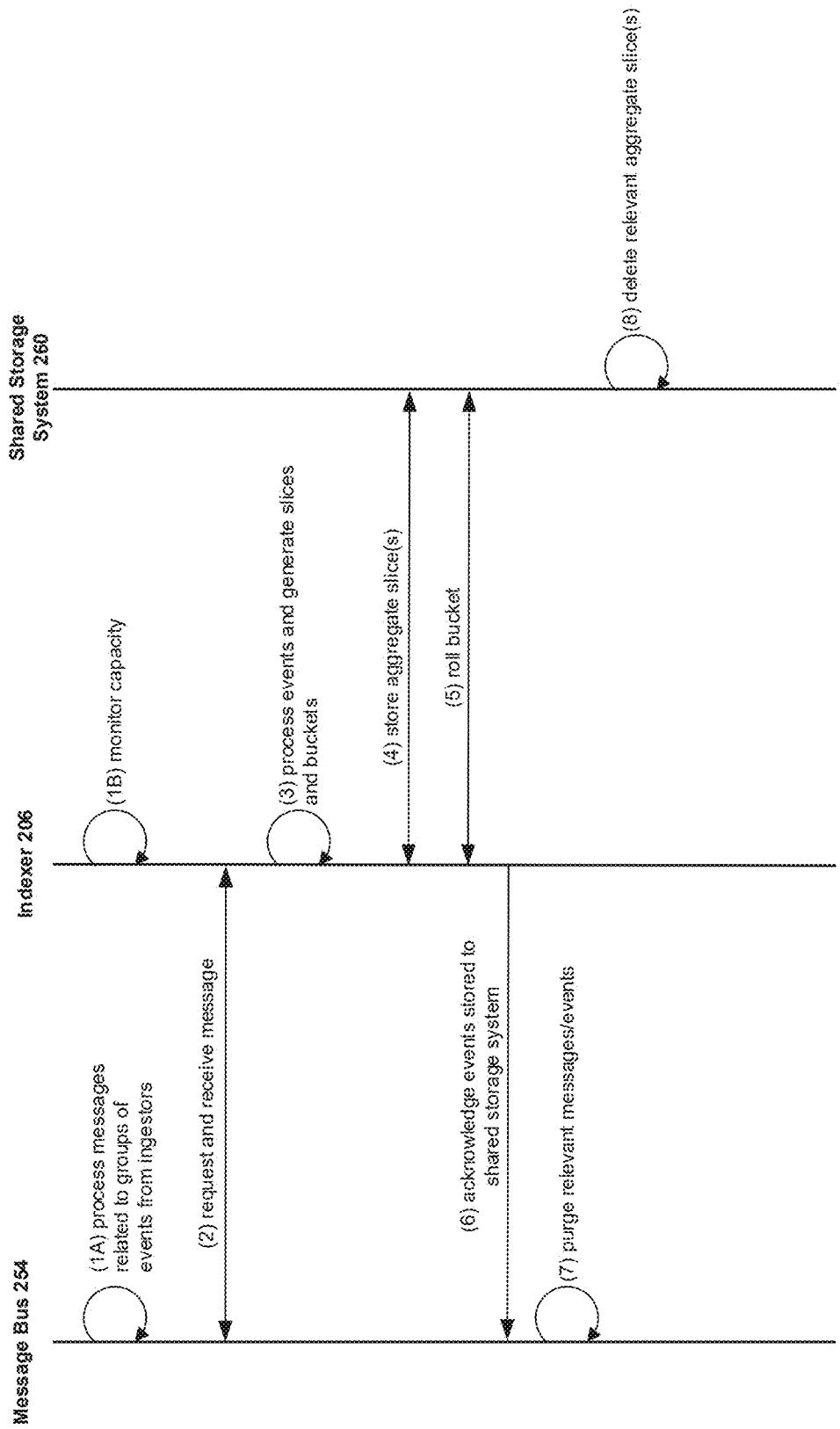
FIG. 21 is a data flow diagram illustrating an embodiment of the data flow and communications between a variety of the components of a distributed data processing system, such as the data intake and query system to store aggregate slices and buckets in a shared storage system.

FIG. 21 is a data flow diagram illustrating an embodiment of the data flow and communications between a variety of the components of a distributed data processing system, such as the data intake and query system 108 to store aggregate slices and buckets in the shared storage system 260. The data flow diagram of FIG. 21 illustrates an example of data flow and communications between a message bus 254, indexer 206, and shared storage system 260. However, it will be understood, that in some of embodiments, one or more of the functions described herein with respect to FIG. 21 can be omitted, performed concurrently or in a different order and/or performed by a different component of the data intake and query system 108. In addition, not all communications between components may be illustrated. For example, as part of communicating information about storing the aggregate slices to the shared storage system 260 and rolling the buckets to the shared storage system 260, the indexer 206 can notify a monitoring component, such as the node coordinator 262. In addition, the node coordinator 262 can coordinate or be involved in the deletion of relevant aggregate slices from the shared storage system 260.

At (1A), the message bus 254 processes messages related to groups of events from the ingestors 252, as described in greater detail with reference to (5) of FIG. 18.

At (1B), the indexer 206 monitors its capacity. As described herein the indexers 206 can monitor their own usage, including, but not limited to CPU usage, memory use, error rate, network bandwidth, network throughput, time taken to process the data, time taken to schedule and execute a job or pipeline, the number of events, slices, and buckets that it is currently processing, etc. In addition, the indexer 206 can determine the processing requirements for each new message or group of events. In some cases, the indexer 206 can provide metrics to another components, such as the node coordinator 262, or other component. The component that receives the metrics from the indexer 206 can determine the capacity of the indexer 206.

At (2), the indexer 206 requests and receives a message from the message bus 254. As described herein, the message (or message payload) can come from the message queue 256 in the form of a group of events or a reference to a group of events stored in the data store 258, or the message (or message payload) can come from the data store 258 as a group of events.

In some cases, the indexer 206 requests the message based on a determination that it has the capacity to process an additional message. In certain cases, the indexer 206 can request multiple messages concurrently. The frequency and number of messages requested can depend on the determined capacity of the indexer 206. For example, based on the current CPU and memory usage and an estimation of the amount of processing required to process a message, the indexer 206A may, on average, request one message every five seconds and the indexer 206B may, on average, request three messages every ten seconds. As the available capacity for a particular indexer 206 decreases it can request messages less frequently or wait until additional capacity becomes available. In this way, the indexers 206 can asynchronously request, download, and process messages and events from the message bus 254.

By relying on a pull-based system to process groups of events, the data intake and query system 108 can more effectively distribute the event processing to the indexers 206 that are best suited to handle it. Thus, heterogeneous indexers 206 (e.g., indexers 206 with different hardware capacity or assigned capacity) can process the data at different rates. For example, indexers 206 with more processing power (e.g., more processor cores, memory, etc.) can process more events than indexers 206 with less processing power because they are able to process more events concurrently or able to process the events faster. Similarly, if an indexer 206 gets stuck processing a large number of events from a given message, it will simply not ask for additional messages. As such, slower processing of the given message by the indexer 206 will not inhibit the processing of other messages by other indexers 206. In this way, the data intake and query system can improve the throughput of the indexers 206 as a whole.

At (3), the indexer 206 processes the events related to the message. As described herein, the events related to the message can come from the message queue 256 or from the data store 258. As part of processing the events, the indexer 206 can add the events to hot buckets and editable slices associated with hot buckets. In addition, the indexer 206 can, based on a slice rollover policy, convert an editable slice to a non-editable slice and add it to an aggregate slice that is associated with the same bucket as the editable slice. The indexer 206 can do this for each editable slice that it is processing based on the slice rollover policy. Upon converting an editable slice associated with a bucket to a non-editable slice, the indexer 206 can generate a new editable slice associated with the bucket.

At (4) the indexer 206 stores (or initiates storage of) an aggregate slice to the shared storage system 260. In certain cases, the aggregate slice is compressed before it is stored to the shared storage system 260. In some cases, the indexer 206 stores the aggregate slice to the shared storage system 260 based on an aggregate slice backup policy. As described herein, the aggregate slice backup policy can indicate when an aggregate slice is to be saved to the shared storage system 260 (e.g., based on the size of the aggregate slice satisfying or exceeding an aggregate slice size threshold and/or the amount of time since the aggregate slice was opened satisfying or exceeding an aggregate slice time threshold). Once the indexer 206 determines that the aggregate slice is to be stored to the shared storage system 260, it can begin the upload and/or flag or mark the aggregate slice for upload. In certain cases, before storing the aggregate slice the shared storage system 260, the indexer 206 can determine whether the bucket associated with the aggregate slice has been or is being uploaded to the shared storage system. If the indexer 206 determines that the associated bucket has been or is being uploaded to the share shared storage system 260, the indexer 206 can determine that it will not upload the aggregate slice to the shared storage system 260 and/or terminate any upload (e.g., unmark or unflag the aggregate slice, delete the aggregate slice, etc.). In some cases, the indexer 206 can determine that the associated bucket has been uploaded based on an absence of a bucket ID on the indexer 206. In certain cases, the indexer 206 can determine that the associated bucket is being upload based on a flag or marking of the bucket in the indexer 206. In certain cases, the indexer 206 can terminate an upload based on a determination that a particular indexer 206 is to be shut down or as part of a time out associated with the shutdown of the particular indexer.

In some cases, the indexer 206 can upload slices of the aggregate slice in a data offset or logical offset order. For example, if the aggregate slice includes a first slice from the logical offset 0-500, a second slice from logical offset 501-2000, and a third slice from logical offset 2001-3100, the indexer 206 upload and store the first slice (and receive an acknowledgement) before beginning the upload of the second slice, and so on. In this way, if there are any issues with uploading the slices, the indexer 206 can provide a guarantee that if the third slice was uploaded then the first and second slices should also exist in the shared storage system 260. As such, in the event a restore is started (e.g., because the indexer 206 failed), the system 108 can determine which slices are available to restore the lost data or bucket.

In certain cases, the indexer 206 can notify a monitoring component, such as the node coordinator 262 which aggregate slice has been uploaded to the shared storage system 260. If the indexer 206 fails, the node coordinator 262 can provide the information about the aggregate slice to a new indexer 206.

At (5), the indexer 206 converts a hot bucket to a warm bucket and stores a copy of the warm bucket to the shared storage system 260. As described herein, the indexer 206 can convert a hot bucket to a warm bucket based on a bucket rollover policy. As mentioned, the bucket rollover policy can indicate when a bucket (e.g., based on size of the bucket satisfying or exceeding a bucket size threshold, or the time since the bucket was created satisfying or exceeding a bucket timing threshold, etc.) is to be converted from a hot bucket to a warm bucket and stored in the shared storage system 260. In some cases as part of storing the copy of the warm bucket to the shared storage system 260, the indexer 206 can mark or flag the warm bucket for upload. In certain cases, the indexer 206 can use the flag or marking to identify associated aggregate slices and/or hot slices that are not to be upload or are to be deleted. By storing a copy of the warm bucket to the shared storage system 260, the indexer 206 can improve the resiliency of the data in the data intake and query system. For example, if the indexer 206 fails, then the node coordinator 262 can assign another indexer 206 to manage and/or search the bucket. In some cases, the entire warm bucket is stored to the shared storage system 260. In certain cases, a portion of the warm bucket is stored to the shared storage system 260. For example, metadata files or indexes may not be stored in the shared storage system 260 as part of the bucket. In some such cases, the aggregate slices may be stored with a bucket identifier indicating that they are part of the same bucket. In such cases, if the bucket is to be restored, an indexer 206 that restores the bucket can download the aggregate slices and recreate the bucket (e.g., recreate the indexes, metadata files, or other files that were not stored as part of the bucket).

At (6) the indexer 206 acknowledges to the message bus 254 events that have been stored to the shared storage system 260. As the indexer 206 stores aggregate slices and buckets in the shared storage system 260, it can track which events were stored in the shared storage system 260 and from which message bus 254 message the events originated. As such, the indexer 206 can determine when all of the events from a particular message have been stored to the shared storage system 260 as part of an aggregate slice or as part of a bucket. In some cases, once all of the events from a particular message have been stored to the shared storage system 260 (as part of an aggregate slice or a bucket), the indexer 206 can acknowledge the relevant message to the message bus 254.

At (7), the message bus 254 purges the acknowledged messages and corresponding events from the message bus. In some cases, this can include deleting the message that includes the events from the message queue 256, deleting the message that includes a reference to the events from the message queue 256, and/or deleting the relevant group of events from the data store 258.

At (8), the shared storage system 260 deletes the aggregate slices that correspond to the rolled bucket. In some cases, the indexer 206, node coordinator 262, or other component of the data intake and query system 108 can track the relationship between aggregate slices and buckets. When a bucket is stored to the shared storage system 260, the relevant component can have the shared storage system 260 delete the aggregate slices associated with the bucket. As described herein, the aggregate slices that are deleted can include the same events or a subset of the events in a bucket. Accordingly, once the bucket is uploaded to the shared storage system 260, the aggregate slices that were uploaded before the bucket can be deleted. As mentioned previously, the indexer 206 can monitor the storage of a bucket to the shared storage system 260. Any active or aggregate slices associated with the bucket being uploaded or uploaded bucket can be deleted, and any uploads of such slices can be terminated.

Fewer more or different functions can be performed by the different components of the data intake and query system 108. In some cases, an indexer 206 can inform the message bus 254, node coordinator 262, or other monitoring component of the data intake and query system 108, each time an event has been stored. In some such cases, the monitoring component can determine when all events from a message have been stored to the shared storage system 260 and initiate the acknowledgement to the message bus 254 and/or initiate the purging of the relevant message and events from the message bus 254.

In addition any one or any combination of the aforementioned processes can be performed concurrently. For example, the (1A) and (1B) may be performed concurrently. Similarly, (4), (5), or (6) may be performed concurrently, etc.

Further, it will be understood that the functions described herein can be performed concurrently for multiple events, messages, slices, aggregate slices, and buckets. Accordingly, in some embodiments, an indexer 206 can concurrently assign different events to different hot slices and buckets, convert multiple hot slices to non-editable slices and add them to different aggregate slices, store multiple aggregate slices to the shared storage system 260, roll multiple hot buckets to warm buckets, and store multiple warm buckets to the shared storage system. It will further be understood that multiple indexers 206 can be concurrently performing these functions for different data.

3.4. Indexer Flow Examples

Figure 22:
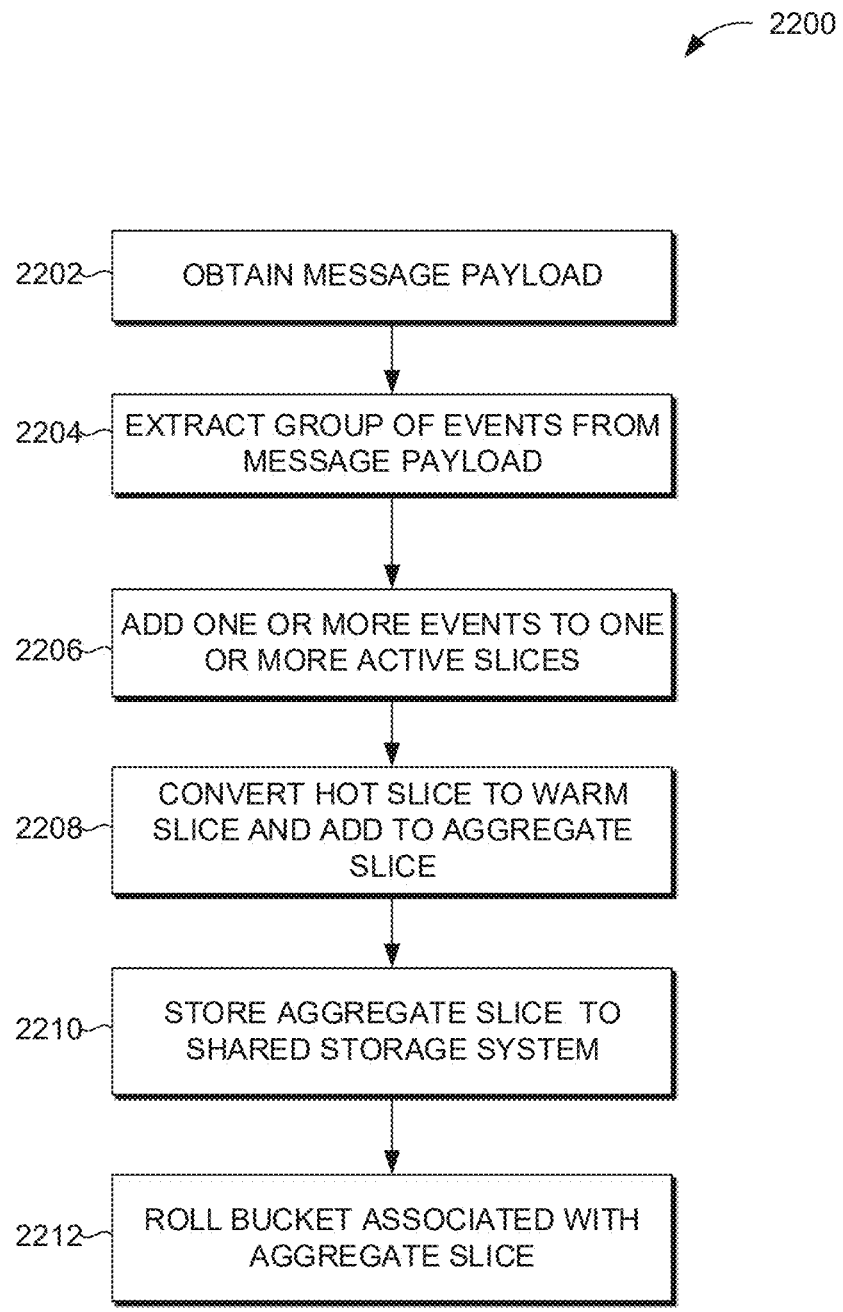
FIG. 22 is a flow diagram illustrative of an embodiment of a routine, implemented by a computing device of a distributed data processing system, for storing aggregate data slices to a shared storage system.

FIG. 22 is a flow diagram illustrative of an embodiment of a routine 2200, implemented by a computing device of a distributed data processing system, for storing aggregate data slices to a shared storage system. Although described as being implemented by the indexer 206 of the data intake and query system 108, it will be understood that the elements outlined for routine 2200 can be implemented by any one or a combination of computing devices/components that are associated with the data intake and query system 108. Thus, the following illustrative embodiment should not be construed as limiting.

At block 2202, the indexer 206 obtains a message payload from a message bus 254. As described herein, the message bus can include a message queue 256 and a data store 258. In some cases, the message queue 256 can be a third-party provided message queue 256 and the data store can be part of cloud storage. As described herein, the indexer 206 can obtain the message payload from the message queue 256 or the data store 258. The message payload can include a group of events, where each event includes raw machine data or metrics associated with a timestamp.

In certain cases, the indexer 206 can obtain two message payload from the message bus 254 for the same transaction or group of events. In some such cases, the indexer 206 can obtain a first message payload from the message queue 256 and a second message payload from the data store 258. The first message payload can include a reference to the second message payload and the second message payload can include the group of events.

At block 2204, the indexer 206 extracts the group of events from the message payload. In some cases, as part of extracting the group of events from the message payload, the indexer 206 can decode the group of events.

At block 2206, the indexer 206 adds events to one or more data slices. As described herein, the indexer 206 can add events to hot or editable data slices. In some cases, the events can be added to hot data slices associated with different buckets and/or indexes such that events that are associated with the same bucket or index are assigned to the same hot slice. In some cases, if there is no hot slice for a particular index or bucket with which an event is associated, the indexer 206 can generate a hot slice. In addition to adding the events to one or more data slices, the indexer 206 can add the events to buckets. Similar to the data slices, the indexer 206 can add the events to buckets based on an index associated with the event and bucket such that events associated with the same index are assigned to the same bucket.

At block 2208, the indexer 206 converts the hot slice to a warm or non-editable slice and adds the slice to an aggregate slice based on a hot slice rollover policy. As described herein, the hot slice rollover policy can indicate that a particular hot slice is to be converted to a non-editable slice based on one or more hot slice size thresholds and/or hot slice timing thresholds. For example, once the hot slice reaches a particular size (satisfies the hot slice size threshold) or after a set amount of time since the hot slice was created (satisfies the host slice timing threshold), it can be converted to a non-editable slice and added to an aggregate slice. When a hot slice is converted to a non-editable slice, the indexer 206 can create a new hot slice for the next event (or wait until another relevant is received). In some cases, if no aggregate slice is available for a particular bucket, the indexer 206 can create an aggregate slice and add the non-editable slice to the newly created aggregate slice. In certain cases, the indexer 206 can create an aggregate slice at the same time that it creates a hot slice for a particular bucket (if an aggregate slice does not already exist). In some cases, as part of adding the non-editable slice to the aggregate slice, the indexer 206 can compress the slice, thereby reducing the amount of memory used to store the data of the slice.

At block 2210, based on an aggregate slice backup policy, the indexer 206 initiates storage of (or stores) a copy of the aggregate slice to the shared storage system 260. As described herein, the aggregate slice backup policy can indicate that a particular aggregate slice is to be stored in the shared storage system 260 based on one or more size thresholds and/or timing thresholds. For example, once an aggregate slice reaches a particular size, has a particular number of warm/non-editable slices added to it, or after a particular amount of time, it can be stored in the shared storage system 260. In some cases as part of initiating storage of the aggregate slice, the indexer 206 flags or marks the aggregate slice for upload. In certain cases, upon initiating storage of the aggregate slice, the indexer 206 determines whether a bucket associated with the aggregate slice has been uploaded, is being uploaded, or has been flagged or marked for upload. In the event, the indexer 206 determines that the bucket has been uploaded, is being uploaded, or has been flagged or marked for upload, the indexer can terminate the storage of the aggregate slice to the shared storage system 260.

Fewer, more, different blocks can be added to the routine 2200. For example, the indexer 206 can continuously request messages from the message bus 254, concurrently request multiple message associated with different events, etc. In some embodiments, the blocks of routine 2200 can be combined with any one or any combination of blocks described herein with reference to at least FIGS. 19-21, and/or 23. As described herein, in certain cases, the indexer 206 can track the relationship between messages, aggregate slice and/or buckets. Once all of the events associated with a particular message have been stored to the shared storage system 260, the indexer 206 can communicate an acknowledgement to the message bus 254. In turn, the message bus can purge the message.

In some cases, based on a bucket rollover policy, the indexer 206 rolls a bucket to the shared storage system 260 that corresponds to the aggregate slice. As described herein, each aggregate slice can be associated with a particular bucket and a bucket may be associated with multiple aggregate slices. As further described herein, the bucket rollover policy can indicate that a hot bucket is to be converted to a warm bucket and stored in the shared storage system 260 based on one or more size thresholds and/or timing thresholds. For example, once a hot bucket reaches a particular size, includes a particular number of aggregate slices or events, or after a particular amount of time, it can be converted to a warm bucket and stored in the shared storage system 260.

In addition, as part of the bucket rollover policy when a warm bucket is stored to the shared storage system 260, the aggregate slices associated with the warm bucket that were stored previously can be deleted from the shared storage system 260. In some embodiments, the indexer 206, node coordinator 262, or other monitoring component can track which slices are associated with which buckets and communicate with the shared storage system 260 to delete the relevant aggregate slices once the corresponding bucket is stored in the shared storage system 260.

In certain cases, as part of storing the warm bucket to the shared storage system 260, hot slices and aggregate slices on the indexer 206 that are associated with the warm bucket can be deleted and/or removed.

Figure 23:
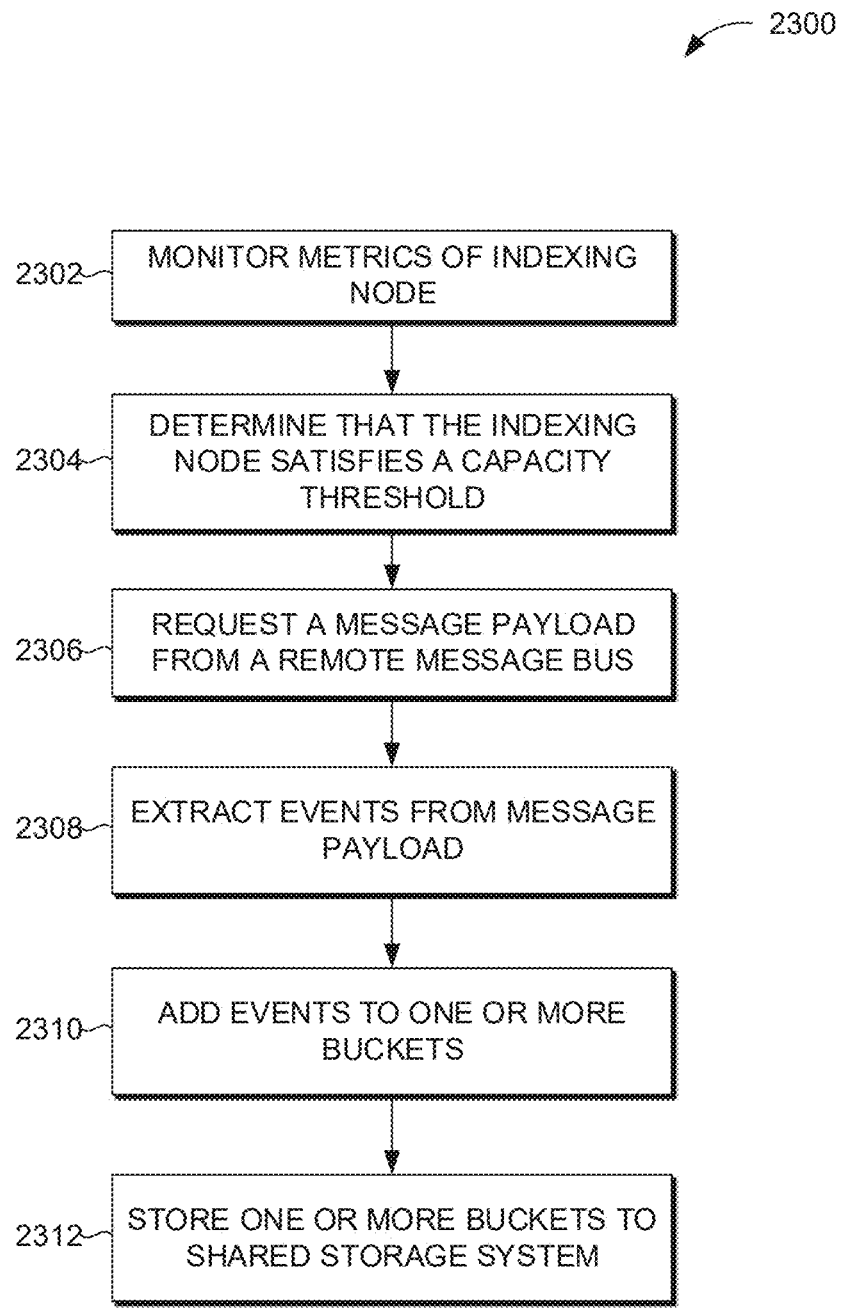
FIG. 23 is a flow diagram illustrative of an embodiment of a routine, implemented by a computing device of a distributed data processing system, for asynchronously obtaining and processing a message payload from a message bus.

FIG. 23 is a flow diagram illustrative of an embodiment of a routine 2300, implemented by a computing device of a distributed data processing system, for asynchronously obtaining and processing a message payload from a message bus 254. Although described as being implemented by the indexer 206 of the data intake and query system 108, it will be understood that the elements outlined for routine 2300 can be implemented by any one or a combination of computing devices/components that are associated with the data intake and query system 108. Thus, the following illustrative embodiment should not be construed as limiting.

At block 2302, the indexer 206 monitors metrics of the indexer 206. As described herein, the indexer 206, node coordinator 262, and/or other monitoring component can monitor one or more metrics of the indexer 206, such as, but not limited to, CPU usage, memory use, error rate, network bandwidth, network throughput, time taken to process the data, time taken to schedule and execute a job or pipeline, the number of events, slices, and buckets that it is currently processing, time to download a message, time to decode a message, time to purge a message or send an acknowledgement, and/or time to renew messages if used or needed, etc.

At block 2304, the indexer 206 determines that the indexer 206 satisfies a capacity threshold. As described herein, determining that the indexer 206 satisfies a capacity threshold can be based on the metrics that are being monitored. For example, the indexer 206 can compare the CPU usage, available memory, or other computer resources with an estimate of the amount of CPU and/or memory used to process a new message. Similarly, any one or any combination of the aforementioned metrics can be compared with a threshold and/or combined and compared with a respective threshold or threshold to determine if the indexer satisfies the capacity threshold. Based on a determination that the indexer 206 includes sufficient CPU and memory to process at least one additional message, the indexer 206 can determine that the indexer 206 satisfies the capacity threshold.

At block 2306, the indexer 206 requests (and receives) a message payload from the message bus 254 based on the determination that it has sufficient capacity. As described herein, a message payload can include a group of events or a reference to a location in a data store 258 from which the group of events can be retrieved. In some cases, depending on the amount of computer resources available, the indexer 206 can request multiple payloads messages simultaneously or concurrently. For example, if the indexer 206 has capacity to process three messages, it can request three messages at the same time.

At block 2308, the indexer 206 extracts events from the message payload, similar to block 2204 of FIG. 22.

At block 2310, the indexer 206 adds the events to one or more buckets. As described herein, each event can be added to a particular bucket. In some cases, events associated with the same index can be assigned to the same bucket.

At block 2312, the indexer 206, stores the one or more buckets to a shared storage system. As described herein, at least with reference to FIG. 22, based on a bucket rollover policy, buckets can be converted from editable buckets to warm buckets and stored in a shared storage system 260. In addition, as part of the bucket rollover policy, aggregate slices associated with the stored bucket can be deleted from the shared storage system 260 and/or the indexer 206. Hot slices associated with the bucket can also be deleted from the indexer 206. In addition, when a bucket is converted to a non-editable bucket, the indexer 206 can generate a new bucket. The new bucket can be associated with the same index as the rolled bucket.

Fewer, more, different blocks can be added to the routine 2300. For example, multiple indexers 206 can concurrently request messages from the message bus 254. By having indexers 206 monitor their availability and request messages based on their availability, the messages can be downloaded and processed asynchronously. Further, by using a pull-based scheme to retrieve and process messages and events, data intake query system can improve load balancing between indexers 206. In some embodiments, the blocks of routine 2300 can be combined with any one or any combination of blocks described herein with reference to at least FIGS. 19-22.

As described herein, in some cases, a monitoring component or the indexers 206 can monitor the indexers' 206 utilization. Based on the utilization, one or more indexers 206 can be shut down to improve efficiency and utilization or instantiated to improve throughput. As described herein, the increasing or decreasing of the indexers 206 can be done independent of the number of ingestors 252. Further, there may be a different number of indexers 206 than ingestors 252.

4.0. Using a Node Coordinator and/or Processing Node Map Identifiers to Manage Data As described herein, the data intake and query system 108 can use a node coordinator 262 and/or processing node map identifiers to store and recover data.

4.1. Recovering Pre-Indexed Data Following a Failed Indexer

As described herein, the data intake and query system 108 can index large amounts of data using one or more indexers 206. In some cases, when an indexer 206 receives data for processing, it can create a bucket and notify the node coordinator 262 that the bucket was created. Further, the indexer 206 can store a copy of the data in shared storage system according to a data storage policy. When the indexer 206 finishes processing or editing the bucket, it can store the bucket locally and/or to the shared storage system 260 according to the data storage policy, and notify the node coordinator 262 that the bucket is now a warm bucket. By storing the data in shared storage system according to the data storage policy, the indexers 206 can improve data availability and resiliency. For example, in the event an indexer 206 fails or is otherwise unable to index data that it has been assigned to index, the node coordinator 262 can assign another indexer 206 to process the data. In some such cases, the second indexer 206 can determine where to download the data from the shared storage system 260 based on the data storage policy. In this way, the data intake and query system 108 can decrease the likelihood that data will be lost as it is processed by the indexers 206.

Figure 24:
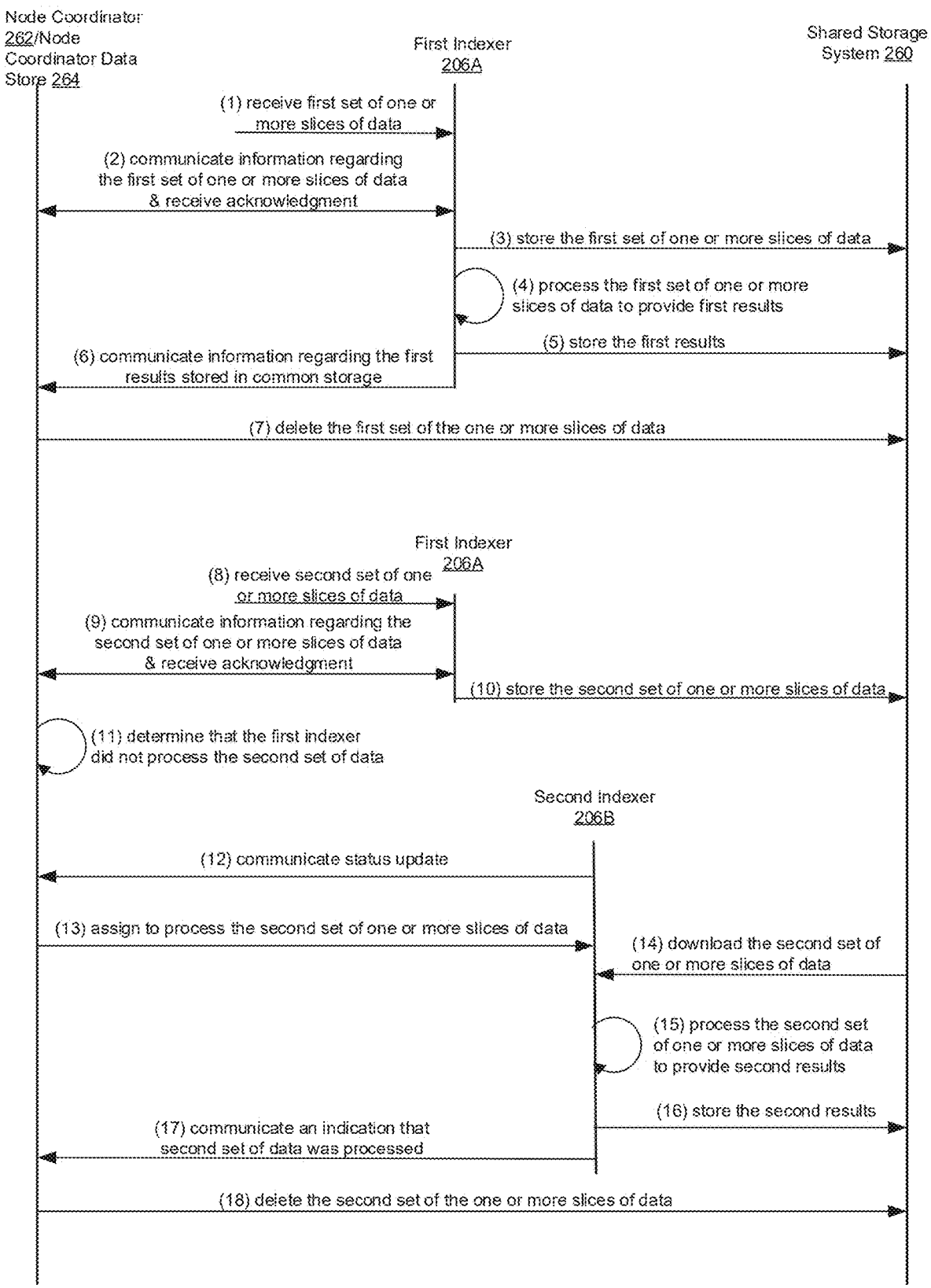
FIG. 24 is a data flow diagram illustrating an embodiment of data flow and communications illustrating an example method for recovering pre-indexed data from a shared storage system following a failed indexer.

FIG. 24 is a data flow diagram illustrating an embodiment of the data flow and communications between a variety of the components of a distributed data processing system, such as the data intake and query system 108 to recover pre-indexed data from a shared storage system following a failed indexer 206. The data flow diagram of FIG. 24 illustrates an example of data flow and communications between a first indexer 206A, a second indexer 206B, a node coordinator 262, and a shared storage system 260. However, it will be understood, that in some of embodiments, one or more of the functions described herein with respect to FIG. 24 can be omitted, performed concurrently or in a different order and/or performed by a different component of the data intake and query system 108. Accordingly, the illustrated embodiment and description should not be construed as limiting.

At (1), the first indexer 206A receives a first set of one or more groups of data for processing. In the illustrated embodiment, the groups of data can correspond to slices of data to be processed by the indexer 206A. A group of data can include one or more data records. A data record can include data or a reference to a location at which the data is located. Data in a data record (or in a location referenced by the data record) can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

In some embodiments, the first indexer 206A creates a first bucket for storing the first set of one or more groups of data and/or results of processing the first set of one or more groups of data. For example, the first indexer 206A can create the first bucket in response to receiving the first set of one or more groups of data. The bucket can be associated with a data identifier (or bucket identifier), which can uniquely identify the bucket.

At (2), the first indexer 206A communicates information regarding the first set of one or more groups of data to the node coordinator 262 and/or the node coordinator data store 264. For example, the first indexer 206A can communicate a data identifier that is associated with the first set of one or more groups of data, such as the bucket identifier. In this way, the node coordinator 262 and/or the node coordinator data store 264 can be kept up-to-date with an indication of the indexer 206A that is responsible for processing the first set of one or more groups of data.

As described herein, in some cases, data is stored in the shared storage according to a data storage policy. In some cases, the data storage policy can indicate a particular directory in which to create and store a sub-directory, and can further indicate a naming convention for the sub-directory. For example, the data storage policy can indicate that indexers create a sub-directory in the "main" directory and name the sub-directory to match a data identifier (or some function of the data identifier) associated with the data to be stored. In some such cases, if the data identifier is "B206," the data storage policy can indicate that data relating to data identifier B206 is to be stored in "main\B206\." By requiring that sub-directories be created and named consistently and in a predictable way, the data storage policy facilitates the storage and retrieval of data. For example, in some cases, any indexer 206 with access to the data identifier knows (or can easily determine based on the data storage policy) where, in shared storage, to find the data relating to the data identifier. Thus, the data storage policy can facilitate assignments (e.g., search assignments, backup assignments) and/or reassignments of data groups, as described further herein.

In some cases, the first indexer 206A can also provide status information about the first set of one or more groups of data. For example, in instances in which the first indexer 206A communicates a bucket identifier, the first indexer 206A can also communicate a status of the bucket associated with the bucket identifier. For example, the first indexer 206A can convey whether the bucket is a hot bucket or a warm bucket. In this way, the node coordinator 262 and/or the node coordinator data store 264 can be kept up-to-date not only with an indication of which buckets have been created, but also an indication of which buckets are editable and which buckets are not editable. For example, an indication that a bucket is a hot bucket can indicate that data has been sent to the first indexer 206A for processing, but has not yet been processed and/or that not all of the data associated with the bucket has been generated or stored to the shared storage system. As a corollary, an indication that a bucket is a warm bucket can indicate that data has been processed and/or the bucket has been stored to shared storage. In some cases, the node coordinator 262 and/or the node coordinator data store 264 can determine the status of a bucket without a direct communication from the first indexer 206A regarding the status. For example, in some cases, the node coordinator 262 can determine that all buckets are hot buckets (or all are warm buckets), unless informed otherwise. As another example, the node coordinator 262 can determine that any new buckets are hot buckets. In certain cases, the node coordinator 262 can treat a bucket as a hot bucket until it receives certain metadata associated with the bucket, such as an end time, etc.

In some cases, the first indexer 206A can also provide information about the first set of one or more groups of data. As described herein, the first set of one or more groups of data can include one or more groups of data, and a group of data can include one or more data records. A group of data, or a data record, can include data from, or otherwise be associated with, indexes, sources, sourcetypes, hosts, users, etc. In some such cases, the information provided by the first indexer 206A to the node coordinator 312 can include, but is not limited to, a combination of any one or more of an index identifier identifying an index associated with one or more groups of data, a source identifier identifying a source associated with one or more groups of data, a sourcetype identifier identifying a sourcetype associated with one or more groups of data, a host identifier identifying a host associated with one or more groups of data, a user identifier identifying a user associated with one or more groups of data, an indexer identifier identifying the indexer 206 assigned to process one or more groups of data, etc. In addition or alternatively, the first set of one or more data identifiers can include a timestamp or time range associated with the first set of one or more groups of data, such as a timestamp or time range associated with a data record, group of data, set of one or more groups of data, or bucket. For example, the first set of one or more data identifiers can include an indication of an earliest or latest time associated with a data record, group of data, set of one or more groups of data, or bucket.

In response to receiving the communication from the first indexer 206A, the node coordinator 262 can communicate an acknowledgement. Furthermore, the node coordinator 262 can update the node coordinator data store 264. For example, in some cases, the node coordinator 262 can update a processing node map or data interrelationship map, as described herein. For example, the node coordinator 262 can update a processing node map and/or data interrelationship map to assign responsibility of the first set of one or more groups of data to the first indexer 206A or to otherwise identify that the first set of one or more groups of data has been sent to the first indexer 206A for processing, but has not yet been processed.

At (3), the first indexer 206A stores the first set of one or more groups of data. In some cases, the first indexer 206A stores the first set of one or more groups of data based on receiving the acknowledgement from the node coordinator 262. In some cases, the first indexer 206A can store the first set of one or more groups of data prior to processing it. The first indexer 206A can store the first set of one or more groups of data in local storage (for example, in the data store 208A). In addition or alternatively, the first indexer 206A can store the first set of one or more groups of data in shared storage system 260. As described, the first indexer 206A can store the first set of one or more groups of data according to a data storage policy, which can indicate where, in the shared storage system 260, to store the first set of one or more groups of data. In some cases, the first indexer 206A stores the first set of one or more groups of data both locally and in shared storage system 260. In this way, the first indexer 206A can locally process the first set of one or more groups of data. However, should the first indexer 206A fail or otherwise become unavailable prior to processing the first set of one or more groups of data, an available indexer 206 can be assigned to process at least a portion of the first set of one or more groups of data in place of the first indexer 206A, and the reassigned available indexer can retrieve the first set of one or more groups of data from its location in shared storage system 260.

In some cases, as part of storing the first set of one or more groups of data to shared storage system 216, the first indexer 206A can verify or obtain acknowledgements that the first set of one or more groups of data was stored successfully. In some embodiments, the first indexer 206A can determine information regarding the first set of one or more groups of data stored in the shared storage system 216. For example, the information can include location information regarding the first set of one or more groups of data that was stored to the shared storage system 216 or one or more data identifiers related to the first set of one or more groups of data that was copied to shared storage system 216.

At (4), the first indexer 206A processes the first set of one or more groups of data. In some embodiments, the first indexer 206A processes the first set of one or more groups of data (or the data obtained using the first set of one or more groups of data) and stores it in the bucket(s) created at (1). As part of the processing, the first indexer 206A can determine information about the first set of one or more groups of data (for example, host, source, sourcetype), extract or identify timestamps, associate metadata fields with the first set of one or more groups of data, extract keywords, transform the first set of one or more groups of data, identify and organize the first set of one or more groups of data into events having raw machine data associated with a timestamp, etc. In some embodiments, the first indexer 206A uses one or more configuration files and/or extraction rules to extract information from the events or the first set of one or more groups of data. In some cases, as part of the processing, the first indexer 206A can generate one or more indexes associated with the buckets, such as, but not limited to, one or more inverted indexes, TSIDXs, keyword indexes, etc. The first set of one or more groups of data and the indexes can be stored in one or more files of the buckets. In addition, first indexer 206A can generate additional files for the buckets, such as, but not limited to, one or more filter files, a bucket summary, or manifest, etc. As a non-limiting example, if the groups of data received by the indexer 206 are slices of data, the indexer 206 can generate multipole files from the slices of data. One file (or more files) may include all of the data from the various slices, another file may include filters, another file may include an inverted index, etc. Meanwhile, the slices stored to the shared storage system as part of (3) can remain unchanged. Accordingly, it will be understood that while a bucket is hot, the data on the indexer 206 can be different from the data stored in the shared storage system.

At (5), the first indexer 206A stores results of the processing at (4). Similar to storing the first set of one or more groups of data at (3), the first indexer 206A can store the results in local storage (for example, in the data store 208A) and/or in shared storage system 260. Furthermore, similar to storing the first set of one or more groups of data at (3), the first indexer 206A can store the results in shared storage system 260 according to a data storage policy. In some cases, the first indexer 206A stores the results both locally and in shared storage system 260. In this way, should the first indexer 206A remain available, it can be utilized to execute at least a portion of one or more queries on the results. However, should the first indexer 206A fail or otherwise become unavailable, an available indexer 206 can be assigned to execute the at least a portion of the one or more queries, and the reassigned available indexer 206 can retrieve the results from its location in shared storage system 260.

In some cases, as part of storing the results to shared storage system 216, the first indexer 206A can verify or obtain acknowledgements that the results were stored successfully. In some embodiments, the first indexer 206A can determine information regarding the results stored in the shared storage system 216. For example, the information can include location information regarding the results that were stored to the shared storage system 216 or one or more data identifiers related to the results that were copied to shared storage system 216.

In some cases, the results are stored in or as one or more buckets, and the one or more buckets are copied to the shared storage system 216. As described herein, the buckets in the data store 208 that are no longer edited by first indexer 206A (e.g., bucket that include data that has been processed) can be referred to as warm buckets or non-editable buckets. In some embodiments, once first indexer 206A determines that a hot bucket is to be copied to storage system 260, it can convert the hot (editable) bucket to a warm (non-editable) bucket, and then move or copy the warm bucket to the shared storage system 260.

At (6), the first indexer 206A communicates information regarding the results stored in shared storage system 216 to the node coordinator 262 and/or the node coordinator data store 264. For example, the first indexer 206A can communicate an indication that the status of the bucket(s) have changed from hot to warm.

In response to receiving the communication from the first indexer 206A, the node coordinator 262 can update the node coordinator data store 264 to identify that the first set of one or more groups of data has been processed. For example, the node coordinator 262 can update a processing node map and/or data interrelationship map to indicate that the bucket was converted from hot to warm.

At (7), the node coordinator 262 deletes the first set of one or more groups of data from the shared storage system 260. For example, once the first results have been stored in shared storage system 260, the node coordinator 262 can delete the corresponding first set of the one or more groups of data that it stored in the shared storage system 260. As a non-limiting example, the first set of one or more groups of data can include slices of a hot bucket and the first results include a warm bucket that corresponds to the hot bucket, the node coordinator 262 can delete the slices of the hot bucket from the shared storage system 260 based on an indication that the corresponding warm bucket has been stored in the shared storage system 260. By removing the first set of the one or more groups of data from the shared storage system 260, the node coordinator 262 can free up additional space in the shared storage system 260. In some cases, the node coordinator 262 can update the node coordinator data store 264 to reflect that the first set of one or more groups of data has been deleted or removed from the shared storage system 260. Although illustrated as being performed by the node coordinator 262, it will be understood that the indexer 206A can delete the first set of one or more groups of data from the shared storage system. In some cases, it may do this as it stores the results of processing the groups of data to the shared storage system.

At (8), the first indexer 206A receives a second set of one or more groups of data. At (9), the first indexer 206A stores the second set of one or more groups of data. And at (10), the first indexer 206A communicates information regarding the second set of one or more groups of data stored in the shared storage system 260. The interactions, (8), (9), and (10), are similar to interactions (1), (2), and (3), discussed above, and therefore will not be re-described.

At (11), the node coordinator 262 determines that the first indexer 206A did not process the second set of one or more groups of data. As described herein, the node coordinator 262 monitors the indexers 206 (including the first indexer 206A) of the data intake and query system 108. Monitoring the indexers 206 can include requesting and/or receiving status information from the indexers 206. In some embodiments, the node coordinator 262 passively receives status information from the indexers 206 without explicitly requesting the information. For example, the indexers 206 can be configured to periodically send status updates to the node coordinator 262. In certain embodiments, the node coordinator 262 receives status information in response to requests made by the node coordinator 262. In some cases, the node coordinator 262 can determine that the first indexer 206A did not process the second set of one or more groups of data based on the status information communications or absence of communications or "heartbeats" from the first indexer 206A.

In some cases, the node coordinator 262 can determine that the first indexer 206A did not process the second set of one or more groups of data based on a determination that the first indexer 206A is unavailable or failing. For example, in some cases, the node coordinator 262 can determine that the first indexer 206A is unavailable if one or more metrics associated with the first indexer 206A satisfies a metrics threshold. For example, the node coordinator 262 can determine that the first indexer 206A is unavailable if a utilization rate of the first indexer 206A satisfies a utilization rate threshold and/or if an amount of available memory available to the first indexer 206A satisfies a memory threshold. As another example, the node coordinator 262 can determine that the first indexer 206A is unavailable if an amount of available processing resources of the first indexer 206A satisfies a processing resources threshold. As a corollary, in some cases, the node coordinator 262 can determine that the first indexer 206A is available based on a determination that one or more metrics associated with the first indexer 206A does not satisfy a metrics threshold.

In the event an assigned indexer (in this example, the first indexer 206A) becomes unresponsive or unavailable during the processing of the data to which it is assigned, the node coordinator 262 can re-assign data of the unavailable indexer to one or more available indexers. Accordingly, the data intake and query system 108 can quickly recover from an unavailable or unresponsive component without data loss and while reducing or minimizing delay. In this example, the first indexer 206A is determined to have become unresponsive or unavailable.

At (12), the node coordinator 262 receives a status update communication from a second indexer 206B, thereby indicating that the second indexer 206B is available for processing. Based at least in part on a determination that the second indexer 206B is available for processing, at (13), the node coordinator 262 assigns the second indexer 206B to process the second set of one or more groups of data. For example, the node coordinator 262 can generate a new processing node map and/or update at least one of a processing node map or a data interrelationship map to indicate that the second set of one or more groups of data is assigned to the second indexer 206B. In some cases, the second indexer 206B is assigned to process only a portion of the second set of one or more groups of data. For example, the node coordinator 262 may distribute the processing of the second set of one or more groups of data among multiple available indexers 206 and/or the node coordinator 262 may determine that the first indexer 206A processed some portion of the second set of one or more groups of data.

At (14), the second indexer 206B obtains the second set of one or more groups of data from the shared storage system 260. For example, in some cases, as part of the assigning the second indexer 206 to processing the second set of one or more groups of data at (13), the node coordinator 262 can communicate a data identifier to the second indexer 206B. As described herein, in some cases, the second indexer 206B can use the data identifier to determine at what location in the shared storage system 260 the second set of one or more groups of data is stored. The second indexer 206B can download the second set of one or more groups of data from this location in the shared storage system 260.

At (15), the second indexer 206B processes the second set of one or more groups of data to provide second results. At (16), the second indexer 206B stores the second results. At (17), the second indexer 206B communicates information regarding the second results stored in the shared storage system 260. And at (18), the node coordinator 262 deletes the second set of the one or more groups of data from shared storage system 260. The interactions (15), (16), (17), and (18) are similar to interactions (4), (5), (6), and (7) discussed above, and therefore will not be re-described.

Fewer, more or different steps can be included, or the steps can be performed concurrently. In certain embodiments, (1)-(7) may be omitted. For example, in some such embodiments, the data flow diagram of FIG. 24 can include only those steps relating to the failure of the first indexer 206A and the recovery of the second set of one or more groups of data from the shared storage system 260. For example, in some cases, the first indexer 206A is not assigned/does not receive the first set of one or more groups of data to process.

Figure 25:
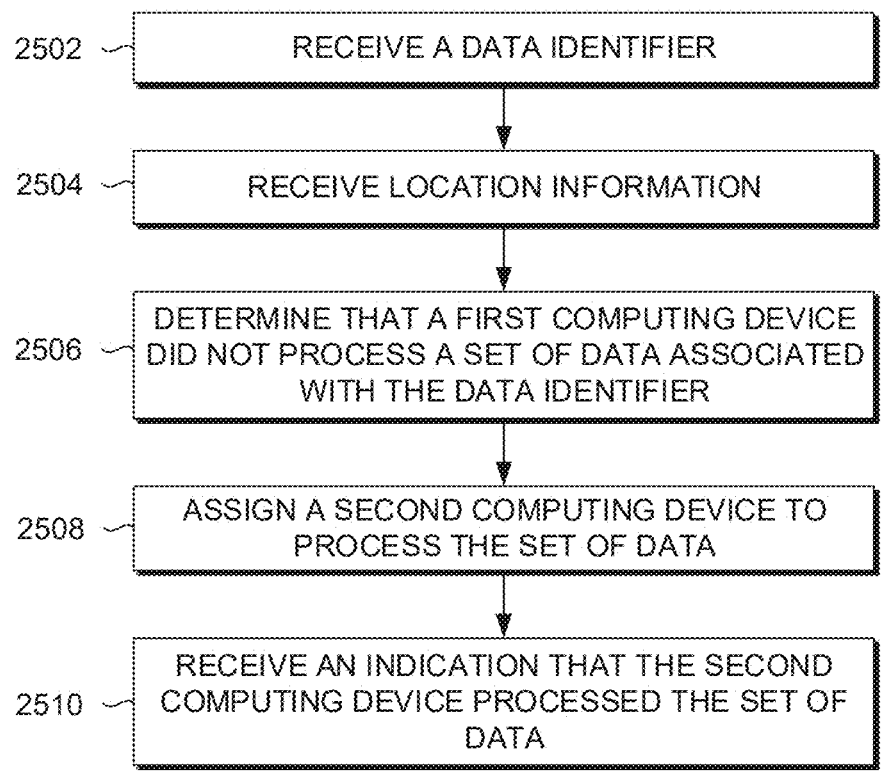
FIG. 25 is a flow diagram illustrative of an embodiment of a routine, implemented by a computing device of a distributed data processing system, recovering pre-indexed data from a shared storage system following a failed indexer.

FIG. 25 is a flow diagram illustrative of an embodiment of a routine 2400, implemented by a computing device of a distributed data processing system, recovering pre-indexed data from a shared storage system following a failed indexer. Although described as being implemented by the node coordinator 262 of the data intake and query system 108, it will be understood that the elements outlined for routine 2400 can be implemented by one or more computing devices/components that are associated with the data intake and query system 108, such as, but not limited to, the node coordinator data store 264, the search head 210, the shared storage system 260, the indexer 206, etc. Thus, the following illustrative embodiment should not be construed as limiting.

At block 2502, the node coordinator 262 receives a data identifier from a first indexer 206A. As described, the data identifier can identify, or be associated with, a set of one or more groups of data that the first indexer 206A is assigned to process. In some cases, the one or more groups of data can correspond to one or more slices of data of a hot bucket being processed by the first indexer 206A.

In some cases, the set of one or more groups of data includes a single group of data. In some cases, the set of one or more groups of data includes more than one group of data. As described, a group of data can include one or more data records. A data record can include data or a reference location at which the data is located. Data in a data record (or in a location referenced by the data record) can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

At block 2504, the node coordinator 262 receives location information from the first indexer 206A. As described herein, the location information can include a reference to a first location in shared storage system 260. The first location can be the first location in shared storage system 260 at which the set of one or more groups of data was stored.

At block 2506, the node coordinator 262 determines that the first indexer 206A did not process the set of one or more groups of data. The node coordinator 262 can determine whether the first indexer 206A processed the set of one or more groups of data using any combination of various techniques described herein. For example, the node coordinator 262 can determine that the first indexer 206A did not process the set of one or more groups of data based on status update communications or absence thereof.

At block 2508, the node coordinator 262 assigns a second indexer 206B to process the set of one or more groups of data. In some cases, assigning the second indexer 206B to process the set of one or more groups of data includes communicating an indication of at least one of the first location or the data identifier to the second indexer 206B. In some embodiments, the node coordinator 262 assigns the second indexer 206B based on a determination that the second indexer 206B is available. In certain embodiments, the node coordinator 262 assigns the second indexer 206B to process a portion of the set of one or more groups of data and assigns other indexers 206 to process other portions. As described herein, in some cases, the node coordinator 262 can designate the second indexer 206B to process the set of one or more groups of data using a consistent hashing algorithm to generate a new processing node map that excludes the first indexer 206A and assigns some of the partitions that were assigned to the first indexer 206A to the second indexer 206B. Based on the reassignment of the partition, the buckets (e.g., warm buckets and hot buckets-inclusive of any slices) corresponding to that partitions (as identified by the interrelationship map) can be reassigned to the second indexer 206B.

At block 2510, the node coordinator 262 receives an indication that the second indexer 206B has successfully processed the set of one or more groups of data. In some cases, to successfully process the set of one or more groups of data, the second indexer 206B obtains or downloads the set of one or more groups of data from the first location, processes the set of one or more groups of data to provide results, and uploads the results to a second location in the shared storage system 260.

As part of the successfully processing the set of one or more groups of data, the second indexer 206B can obtain or download the set of one or more groups of data from the first location in shared storage system 260. Further, as part of the successfully processing the set of one or more groups of data, the second indexer 206B can determine information about the set of one or more groups of data (for example, host, source, sourcetype), extract or identify timestamps, associated metadata fields with the set of one or more groups of data, extract keywords, transform the set of one or more groups of data, identify and organize the set of one or more groups of data into events having raw machine data associated with a timestamp, etc. In certain cases, the second indexer 206B organizes the events into buckets and stores the buckets. In some embodiments, the second indexer 206B uses one or more configuration files and/or extraction rules to extract information from the events or the set of one or more groups of data. In some cases, as part of successfully processing the set of one or more groups of data, the second indexer 206B can generate one or more indexes associated with the buckets, such as, but not limited to, one or more inverted indexes, TSIDXs, keyword indexes, etc.

In some cases, as part of the successfully processing the set of one or more groups of data, the second indexer 206B can store the set of one or more groups of data and the indexes in one or more files of the buckets. In addition, the second indexer 206B can generate additional files for the buckets, such as, but not limited to, one or more filter files, a bucket summary, or manifest, etc.

Fewer, more, or different blocks can be used as part of the routine 2400. In some cases, one or more blocks can be omitted. In some embodiments, the blocks of routine 2400 can be combined with any one or any combination of blocks described herein with reference to at least FIGS. 24 and/or 26-29.

In certain embodiments, the node coordinator 262 and/or the second indexer 206B can delete the set of one or more groups of data (or the one or more buckets that include the set of one or more groups of data) from shared storage system 260. For example, once the second indexer 206B successfully processes the set of one or more groups of data, the node coordinator 262 and/or the second indexer 206B can delete the set of one or more groups of data (that was stored by the first indexer 206A) from shared storage system. In this way, the node coordinator 262 and/or the second indexer 206B can reduce the amount of data stored in shared storage system 260. In some cases, the node coordinator 262 and/or the second indexer 206B delete the set of one or more groups of data based on the location information received from the first indexer 206A at block 2504. For example, the node coordinator 262 and/or the second indexer 206B can determine the location, in shared storage system 260, of the set of one or more groups of data based on the location information.

Furthermore, it will be understood that the various blocks described herein with reference to FIG. 25 can be implemented in a variety of orders, or can be performed concurrently. For example, the node coordinator 262 can concurrently receive the data identifier and the location information, etc.

4.2. Mapping Groups of Data and Indexers to a Processing Node Map Identifier for Searching As described herein, the data intake and query system 108 can index and search large amounts of data in a distributed fashion using one or more indexers 206. In some cases, each indexer 206 can concurrently index, store, and search data. Due to a lag between the time at which data is received and the time at which the data is available for searching, the data intake and query system 108 may receive a query indicating that received (but unavailable for search) data is to be included as part of the query. For example, the received data may satisfy the filter criteria of the query even though it was not in a state to be searched. In some cases, to provide the indexers 206 (also referred to herein as search peers or processing nodes) additional time to index the data and make it available for search, a node coordinator 262 can dynamically track what data is available for searching by different indexers and map the data to an indexer 206 using a processing node map identifier and/or or a data interrelationship map. When a search head receives a query, it can request a processing node map identifier from the node coordinator 262 and send the processing node map identifier to the search peers that will be executing the query. The search peers can use the processing node map identifier to request the individual buckets that they are assigned to search. By passing a processing node map identifier between the node coordinator 262 (instead of data identifiers), search head 210, and search peers, the data intake and query system 108 can provide the indexers 206 more time to make data available for searching. In some such cases, if the data is made available between the time that the search head 210 requests a processing node map identifier and the time that individual search peers request individual buckets for searching (or any time before the node coordinator 262 tells the search peer what buckets it is to search), then the data can be included in the search.

Figure 26:
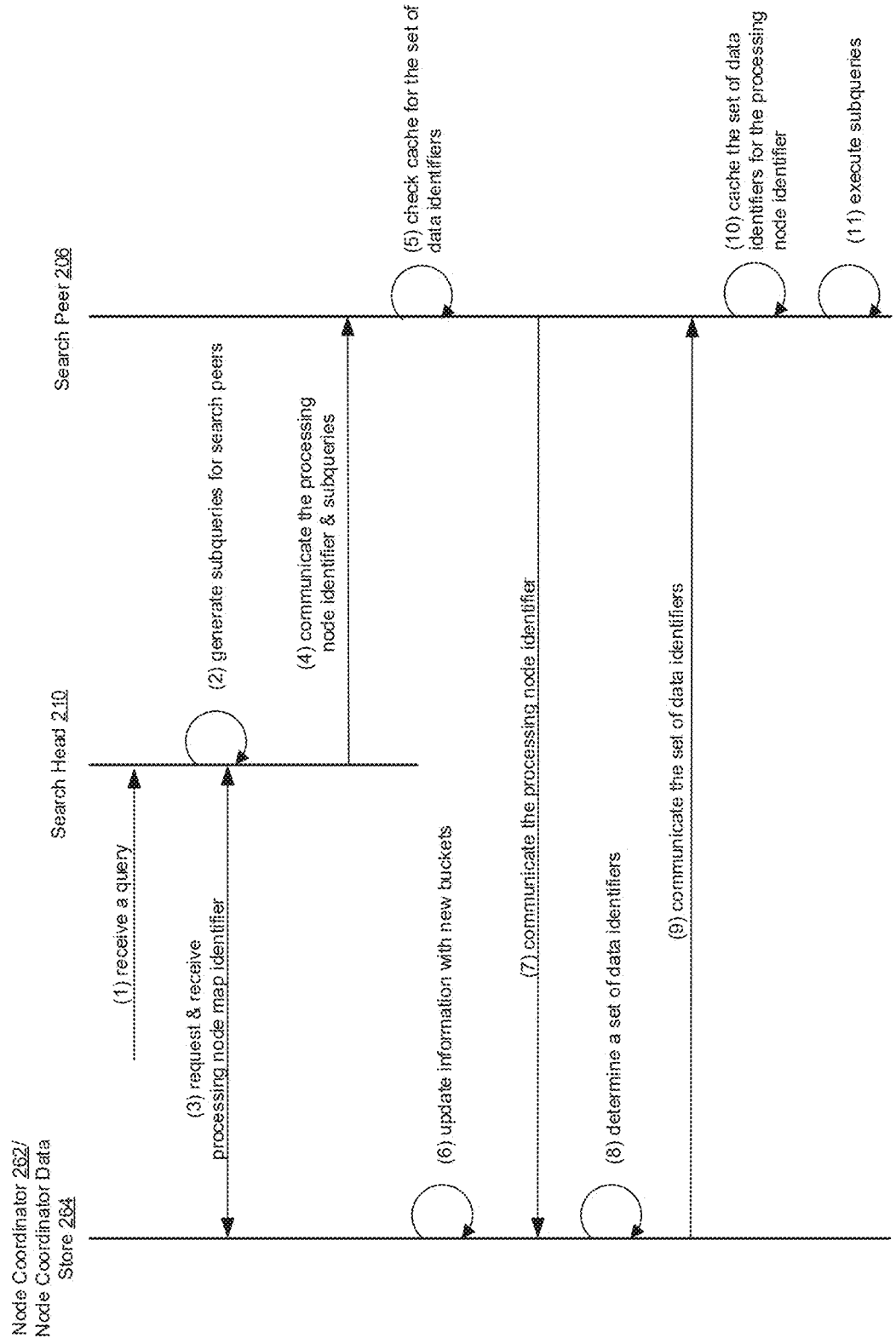
FIG. 26 is a data flow diagram illustrating an embodiment of data flow and communications illustrating an example method for identifying data to be searched using a processing node map identifier.

FIG. 26 is a data flow diagram illustrating an embodiment of data flow and communications between a variety of the components of a distributed data processing system, such as the data intake and query system 108, for identifying one or more groups of data to be searched by a search peer. The data flow diagram of FIG. 26 illustrates an example of data flow and communications between the node coordinator 262, the search head 210, and an indexer 206 (also referred to herein as search peer 206). However, it will be understood, that in some of embodiments, one or more of the functions described herein with respect to FIG. 26 can be omitted, performed concurrently, or in a different order and/or performed by a different component of the data intake and query system 108. Accordingly, the illustrated embodiment and description should not be construed as limiting.

At (1), the search head 210 receives a query, as described herein. In some cases, the search head 210 can receive the query from a client device 102. The query can be in a query language as described in greater detail herein.

At (2), the search head 210 uses the query to generate subqueries to distribute to the search peers 206 of the data intake and query system 108. As described herein, the search head 210 can determine that a portion of the operations involved with the query may be performed locally by the search head 210. Further, the search head 210 can modify the query by substituting "stats" (create aggregate statistics over results sets received from the indexers at the search head) with "prestats" (create statistics by the indexer from local results set) to produce one or more subqueries. As described herein, in some cases, each search peer 206 may only execute a portion of a query. For example, a query can include a search across multiple search peers 206 and the results obtained from each search peer can be further processed by the search head 210. Accordingly, a particular search peer may only search a portion of the set of data of a search and may only execute a portion of the query.

At (3), the search head 210 requests and receives a processing node map identifier from the node coordinator 262. As described herein, the node coordinator 262 can manage a processing node map that is associated with the particular processing node map identifier. The particular processing node map can be based on which indexers are available for search and the particular processing node map can indicate various assignments of data groups to the available indexers. Furthermore, in some cases, the node coordinator 262 can manage a data interrelationship map, which can indicate various assignments or associations between data groups. Upon receipt of the request for the processing node map identifier, the node coordinator 262 can consult the node coordinator data store 264 to determine the processing node map identifier of the latest processing node map and can communicate the processing node map identifier to the search head 210.

At (4), the search head 210 communicates the processing node map identifier and the subqueries to each of the search peers 206.

At (5), the search peer 206 consults its cache to identify whether the processing node map identifier received from the search head 210 matches a stored processing node map identifier. This may be the case if, for example, the search peer previously executed a subquery associated with that processing node map identifier. If a match is not found, the search peer can use the processing node map identifier to request the individual buckets that they are assigned to search. However, if a match is found, the search peer 206 can use the cache to identify the individual buckets that it is to search. Caching processing node map identifiers and data identifiers is further discussed herein, for example with respect to FIG. 27.

At (6), the node coordinator 262 updates the node coordinator data store 264 to associate the processing node map and/or a data interrelationship map with an additional group of data. As described herein, the processing node map can indicate various assignments of data groups to available search peers. The contents of the data groups can vary across embodiments. For example, in some cases, the data groups include partitions such that the processing node map indicates assignments of partitions to available search peers. In some such cases, the node coordinator 262 can also manage a data interrelationship map that indicates mappings of partitions to other data groups (e.g., buckets, data slices). By utilizing the data interrelationship map to associated partitions with other data groups and the processing node map to assign indexers to partitions, the combination of the data interrelationship map and the processing node map works to associate the indexers with the data groups. Accordingly, at (6), the node coordinator 262 can update the data interrelationship map to associate a particular partition with an additional group of data, which results in an additional search assignment to the indexer assigned to the particular partition (based on the processing node map). In some cases, when utilizing a data interrelationship map, the node coordinator 262 does not need to modify or create a new processing node map unless or until an indexer is added or lost, or a partition is added or lost.

As another example, in some cases, the data groups include buckets such that the processing node map indicates assignments of buckets to available search peers. Accordingly, at (6), the node coordinator 262 can update the processing node map to associate a particular indexer with an additional group of data (e.g., a bucket). In instances such as these, the node coordinator 262 may not need to manage a data interrelationship map in addition to the processing node map, since the processing node map directly associated the search peers to the buckets.

In some cases (for example, similar to interactions (1) and (2) of FIG. 24), the data intake and query system 108 can receive one or more new groups of data, such as data that has not been indexed and/or stored in a warm bucket. In some such cases, the node coordinator 262 can update the node coordinator data store 264 to associate the new group of data with the associate the processing node map and/or the data interrelationship map. As another example, in some cases, the node coordinator 262 also updates the node coordinator data store 264 to disassociate one or more groups of data from the processing node map and/or the data interrelationship map.

It will be understood that the node coordinator 262 can update the associations (e.g., data identifiers, partition identifiers, etc.) of a processing node map and/or data interrelationship map at any time, and that the placement of interaction (6) is for illustrative purposes only. For example, the node coordinator 262 can update the processing node map and/or data interrelationship map associations whenever an indexer 206 fails or is added, new slices of data are received, hot buckets are converted to warm buckets, warm buckets are stored to shared storage system 260, warm bucket are deleted from an indexer 206, and/or slices are deleted from the shared storage system 260, etc.

At (7), the search peer 206 communicates the processing node map identifier to the node coordinator 262. As described, the processing node map identifier can be associated with a processing node map.

At (8), the node coordinator 262 consults the node coordinator data store 264 to identify the particular groups of data with which the processing node map identifier and the search peer 206 are associated. The node coordinator 262 can identify a particular processing node map using the processing node map identifier. As described herein, in some cases, the node coordinator 262 can identify the groups of data based on the particular processing node map, and in some cases, the node coordinator 262 can identify the groups of data based on the particular processing node map and a data interrelationship map.

As described herein, in some embodiments, a processing node map identifier may not be associated with data that has not been indexed/processed (e.g., slices of data or hot buckets). This may be due to the transient nature of the unprocessed/unindexed data (including partially indexed/processed data). For example, the unprocessed/unindexed data remains so for a relatively short period of time, such as one second, etc. In some such embodiments, the node coordinator 262 can use the processing node map identifier to obtain a list of data identifiers corresponding to indexed/processed groups of data (e.g., warm buckets) that are to be searched by the search peer 206, and use an indexer assignment listing to identify data identifiers corresponding to unprocessed/unindexed groups of data (e.g., slices of data or hot buckets) associated with the search peer 206 that are to be searched. In some cases, the node coordinator 262 can identify all of the unprocessed/unindexed groups of data associated with the search peer for searching. In certain cases, such as when the node coordinator 262 includes information about the unprocessed/unindexed data (e.g., time range, index, or other information that can compared with filter criteria of a query), the node coordinator 262 can identify a subset of the unprocessed/unindexed groups data associated with the search peer for searching (e.g., those portions that satisfy the filter criteria of the query).

At (9), the node coordinator 262 communicates a set of data identifiers to the search peer 206 to execute at least a portion of the query. The set of data identifiers can include one or more data identifiers, and can identify the particular groups of data with which the processing node map identifier and the search peer 206 are associated. For example, the data identifiers sent to a particular search peer 206 can identify one or more buckets or slices of data that are to be searched by the particular search peer 206. After receiving the set of data identifiers, the search peer 206 can execute at least a portion of a query on the groups of data corresponding to the set of data identifiers. In some cases, executing the portion of the query on the groups of data can include applying filter criteria to one or more events of buckets or slices of data to generate partial query results, and communicating the partial query results to the search head 210. As described herein, the search head 210 can combine the partial query results from the different search peers 206 to generate query results and return the query results to a user.

At (10), the search peer 206 caches the set of data identifiers. For example, in some cases, the search peer 206 may store an indication of an association between the processing node map identifier received from the search head 210 and the set of data identifiers received from the node coordinator 262. In this way, should the search peer 206 receive the same processing node map identifier, it can consult its cache and determine the set of data identifiers without needing to communicate with the node coordinator 262.

At (11), the search peer 206 executes the query on the data groups associated with the set of identifiers.

4.3. Searching Buckets Identified by the Node Coordinator and Buckets Generated by the Search Node As described herein, the data intake and query system 108 can index and search large amounts of data in a distributed fashion using one or more indexers 206. In some cases, a node coordinator 262 manages the data of the data intake and query system 108 using a processing node map and a data interrelationship map. As described, the processing node map can include assignments of partitions to indexers, and the data interrelationship map can include associations between partitions and data groups (e.g., buckets, data slices). When a search head 210 receives a query, it can request a processing node map identifier from the node coordinator 262 and send the processing node map identifier to the search peers that will be executing the query. The search peers 206 can consult their cache to identify whether the processing node map identifier matches a stored processing node map identifier. This may be the case if, for example, the search peer 206 previously executed a subquery associated with that processing node map identifier. If a match is not found, the search peer can use the processing node map identifier to request the individual buckets that they are assigned to search, similar to interaction (6) of FIG. 26. However, if a match is found, a search peer 206 can use the cache to identify the individual buckets that it is to search. Due to a potential time gap since the search peer 206 received the data identifiers from the node coordinator 262, the search peer 206 may have processed additional buckets that were not identified by the node coordinator 262 but are relevant for the search. Accordingly, to ensure the additional buckets are also searched, when identifying the individual buckets from its cache, the search peer 206 can identify the data identifiers that were received from the node coordinator 262, as well as data identifiers of buckets that the search peer 206 has processed since receiving the plurality of data identifiers from the node coordinator 262.

Figure 27:
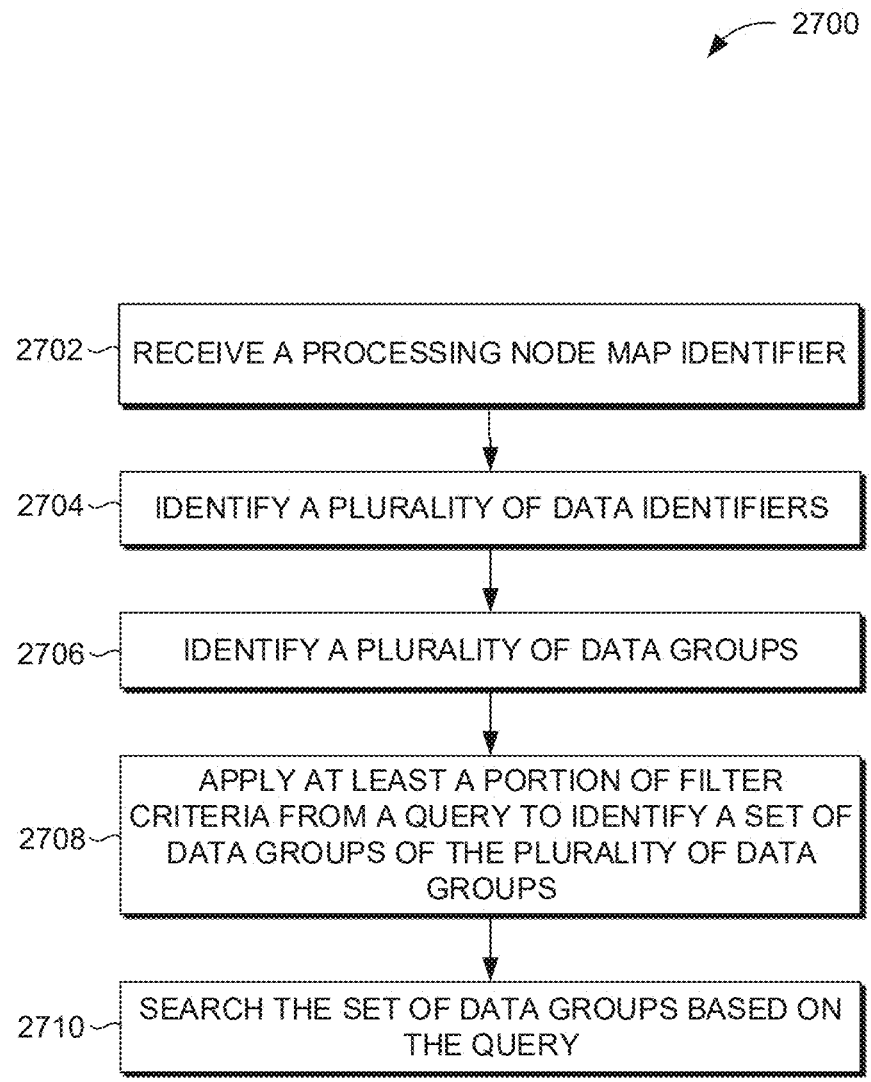
FIG. 27 is a flow diagram illustrative of an embodiment of a routine, implemented by a computing device of a distributed data processing system for identifying data to be searched using a processing node map identifier.

FIG. 27 is a flow diagram illustrative of an embodiment of a routine 2700, implemented by a computing device of a distributed data processing system, for identifying a group of data for searching. Although described as being implemented by the search peer 206 of the data intake and query system 108, it will be understood that the elements outlined for routine 2700 can be implemented by one or more computing devices/components that are associated with the data intake and query system 108, such as, but not limited to, the search head 210, the node coordinator 262, the shared storage system 260, etc. Thus, the following illustrative embodiment should not be construed as limiting.

At block 2702, the search peer 206 receives a processing node map identifier from the search head 210. As described herein, the processing node map identifier can be received in response to a query received by the search head 210. For example, similar to interactions (1) and (3) of FIG. 26, the search head 210 can receive a query and, in response to receiving the query, can request and receive the processing node map identifier from the node coordinator 262. Similar to interaction (4) of FIG. 26, the search peer 206 communicates the processing node map identifier to the search peer 206 upon receipt of the processing node map identifier from the node coordinator 262.

In some cases, the search peer 206 also receives one or more subqueries from the search head 210. For example, similar to interaction (2) of FIG. 26, the search head 210 can generate the one or more subqueries from the query. In some cases, the query can include filter criteria to identify a set of data and/or processing criteria that indicates how to process the set of data. In some cases, the one or more subqueries can includes search parameters, such as the filter criteria. Example filter criteria can include, but is not limited to, indexes, hosts, sources, sourcetypes, time ranges, field identifier, field-value pairs, and/or user identifiers, keywords, etc. In some cases, the one or more subqueries can include at least a portion of the processing criteria.

At block 2704, the search peer 206 identifies a plurality of data identifiers corresponding to the data groups that it is to search. As described, the plurality of data identifiers can correspond to any one of bucket identifiers or data slice identifiers.

In some cases, similar to interactions (7), (8), and (9) of FIG. 26, the search peer 206 can communicate the processing node map identifier to the node coordinator 262 to request the individual data groups to which it is assigned, the node coordinator 262 can consult its processing node map and/or data interrelationship map to identify the data identifiers corresponding to the data groups to which the indexer 206 is assigned, and the node coordinator 262 can communicate those identifiers to the search peer 206.

In some cases, the search peer 206 can consult its own cache to determine whether the cache includes an indication of the processing node map identifier of interest. For example, similar to interaction (9) of FIG. 26, the search peer 206 may have previously (e.g., one or more times) received data identifiers from the node coordinator 262 that correspond to a processing node map identifier. Furthermore, the similar to interaction (10) of FIG. 26, the search peer 206 may have previously cached information identifying an association between the data identifiers received from the node coordinator 262 and the corresponding processing node map identifier. For example, the interactions (1)-(9) of FIG. 26 may have occurred one or more times such that the cache of the search peer 206 identifies various sets of assignments between processing node map identifiers and data identifiers.

If a match is found between the processing node map identifier received from the search head 210 and a processing node map identifier from the cache, the search peer 206 can use the cache to identify a plurality of data identifiers. For example, the search peer 206 can compare the processing node map identifier received from the search head 210 with the assignments of processing node map identifiers to data identifiers stored in the cache. In some cases, if the search peer 206 determines that the processing node map identifier from the search head 210 matches a processing node map identifier from the cache, then the search peer 206 identifies the plurality of data identifiers associated with the processing node map identifier stored in the cache for searching.

If a match is found, it can indicate that the search peer 206 previously received a plurality of data identifiers from the node coordinator 262. However, due to a potential time gap since the search peer 206 received the data identifiers from the node coordinator 262, the search peer 206 may have since processed additional buckets that were not originally identified by the node coordinator 262 and included as part of the (earlier) communication from the search peer 206. As such, in some cases, the search peer 206 can track data identifiers corresponding to data groups that it has processed (or is processing) since requesting the data identifiers from the node coordinator 262. That way, if the search peer 206 happens to have processed one or more data groups since requesting the data identifiers from the node coordinator 262, it can maintain a record of those processed one or more data groups. Furthermore, when identifying the plurality of data identifiers corresponding to the data groups that it is to search, the search peer 206 can identify data identifiers corresponding to these as well.

In some cases, the data identifiers received from the node coordinator 262 can be referred to as a first set of data identifiers and the data identifiers corresponding to subsequently processed data groups can be referred to as a second set of data identifiers. In some cases, the search peer 206 may store the second set of data identifiers along with the first set of data identifiers, such as at the same location and/or part of the same data structure. For example, the search peer 206 may initially store an indication of the assignment of the data identifiers to the processing node map identifier (i.e., the identifiers received from the node coordinator 262) and can progressively add to the assignment of data identifiers as the search peer 206 processes data groups.

In some cases, the search peer 206 may store the second set of data identifiers separate from the first set of data identifiers. For example, the search peer 206 may need to perform separate lookups to identify the first set of data identifiers and the second set of data identifiers.

If no match is found between the processing node map identifier received from the search head 210 and a processing node map identifier from the cache, the search peer 206 can communicate a request to the node coordinator 262, similar to interactions (7), (8), and (9) of FIG. 26. In some cases, the search peer 206 consults its cache prior to communicating a request to the node coordinator 262. That way, if the search peer 206 finds a match in the cache, it can avoid an unnecessary communication with the node coordinator 262. In some cases, if no match is found, the search peer 206 caches an association between the processing node map identifier and the data identifiers received from the node coordinator 262, similar to interaction (10) of FIG. 26

In some cases, the search peer 206 communicates a request to the node coordinator 262 regardless of whether the search peer 206 finds a match in the cache. In some such cases, the search peer 206 can begin searching based on the information that it has cached or stored locally, and use the information received from the node coordinator 262 to update its cache for future queries and/or for verification purposes. In this way, the search peer 206 can reduce the differences between the cached data identifiers received from the node coordinator 262 and the list of data identifiers that the search peer has generated since receiving the list of data identifiers from the node coordinator 262.

At block 2706, the search peer 206 identifies a plurality of data groups assigned to the search peer 206 based on the plurality of data identifiers identified at block 2708. For example, the search peer 206 can utilize the plurality of data groups identify a plurality of buckets or data slices that it is to search. The search peer 206 may find that one or more of the plurality of data groups are stored locally. In some cases, the search peer 206 may find that one or more of the plurality of data groups are stored in the shared storage system. As such, in some cases, the search peer 206 can download or obtain a copy of at least one data group from the shared storage system 260.

At block 2706, the search peer 206 can apply at least a portion of the filter criteria from a query to identifier a set a data groups of the plurality of data groups, and at block 2710, the search peer 206 searches the set of data groups based on the query.

Fewer, more, or different blocks can be used as part of the routine 2700. In some cases, one or more blocks can be omitted. In some embodiments, the blocks of routine 2700 can be combined with any one or any combination of blocks described herein with reference to at least FIGS. 24, 25, 26, 28, 29, 30, and/or 31.

4.4. Search Recovery Using a Shared Storage System Following a Failed Search Peer As described herein, the data intake and query system 108 can index and search large amounts of data using one or more indexers 206 (or search peers 206). In some cases, each indexer 206 can store a copy of the data it is processing, the results of processing the data, or a copy of the data that the indexer 206 is assigned to search, in the shared storage system 260. By storing the data in the shared storage system 260, the indexers 206 can improve data availability and resiliency. In the event an indexer 206 fails or is otherwise unable to search data that it has been assigned to search, a node coordinator 262 can assign one or more second indexers 206 to search the data. In some such cases, the one or more second indexers 206 can download the data from the shared storage system 260. In this way, the data intake and query system 108 can decrease the likelihood that data that is to be searched data will not be searched due to a failed or unavailable indexer 206.

Figure 28:
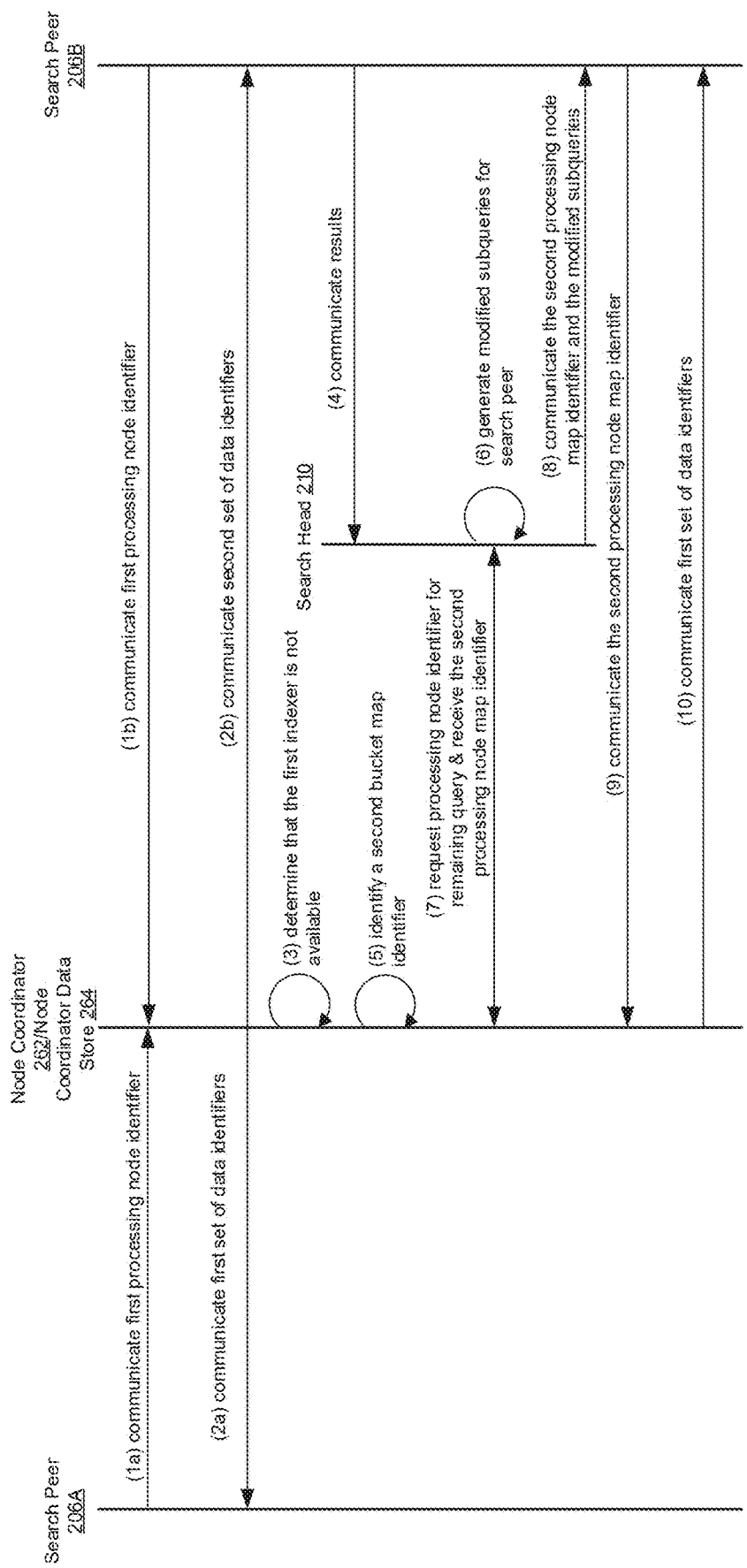
FIG. 28 is a data flow diagram illustrating an embodiment of data flow and communications illustrating an example method for search recovery using a shared storage system following a failed search peer.

FIG. 28 is a data flow diagram illustrating an embodiment of data flow and communications between a variety of the components of a distributed data processing system, such as the data intake and query system 108, for searching data following a failed search peer. The data flow diagram of FIG. 28 illustrates an example of data flow and communications between the node coordinator 262, the search head 210, and two search peers 206A, 206B. However, it will be understood, that in some of embodiments, one or more of the functions described herein with respect to FIG. 28 can be omitted, performed concurrently or in a different order and/or performed by a different component of the data intake and query system 108. Accordingly, the illustrated embodiment and description should not be construed as limiting.

At (1a) and (1b), the first search peer 206A and the second search peer 206B, respectively, communicate a first processing node map identifier to the node coordinator 262. At (2a), the node coordinator 262 communicates a first set of data identifiers that identifies one or more groups of data that are assigned to the first search peer 206A and, at (2b), the node coordinator 262 communicates a second set of data identifiers that identifies one or more groups of data that are assigned to the second search peer 206A. The interactions (1a) and (1b) are similar to interactions (8) of FIG. 26 and the interactions (2a) and (2b) are similar to interactions (9) of FIG. 26, and therefore will not be re-described.

At (3), the node coordinator 262 determines that the first search peer 206A is not available. As described herein, the node coordinator 262 monitors the search peers 206 (including the first search peer 206A) of the data intake and query system 108. Monitoring the search peers 206 can include requesting and/or receiving status information from the search peers 206. In some embodiments, the node coordinator 262 passively receives status information from the search peers 206 without explicitly requesting the information. For example, the search peers 206 can be configured to periodically send status information updates to the node coordinator 262. In certain embodiments, the node coordinator 262 receives status information updates in response to requests made by the node coordinator 262.

In some cases, the node coordinator 262 can determine that the first search peer 206A is not available based on a determination that the first search peer 206A is busy or failing. For example, in some cases, the node coordinator 262 can determine that the first search peer 206A is unavailable if one or more metrics associated with the first search peer 206A satisfies a metrics threshold. For example, the node coordinator 262 can determine that the first search peer 206A is unavailable if a utilization rate of the first search peer 206A satisfies a utilization rate threshold and/or if an amount of available memory available to the first search peer 206A satisfies a memory threshold. As another example, the node coordinator 262 can determine that the first search peer 206A is unavailable if an amount of available processing resources of the first search peer 206A satisfies a processing resources threshold. As a corollary, in some cases, the node coordinator 262 can determine that the first search peer 206A is available based on a determination that one or more metrics associated with the first search peer 206A does not satisfy a metrics threshold.

In the event an assigned search peer 206 (in this example, the first search peer 206A) becomes unresponsive or unavailable (in some cases, this may happen after that search peer has been assigned to execute a query on the group of data), the node coordinator 262 can re-assign the groups of data of the unavailable search peer 206 to one or more available search peers 206, so that the one or more available search peers 206 can execute the query on the group of data. Accordingly, the data intake and query system 108 can quickly recover from an unavailable or unresponsive component without data loss and while reducing or minimizing delay.

In some cases, the data assigned to the unavailable search peer 206A can be re-assigned to a single search peer 206 (e.g., search peer 206B), and that single search peer 206 can execute queries on the all of the data that was previously assigned to the unavailable search peer 206A. In some cases, the portion of the group of data assigned to the unavailable search peer 206A can be re-assigned to multiple search peers 206, such that multiple peers 206 are used to search the data that was previously assigned to the unavailable search peer 206A.

When updating the processing node map identifiers, any one of the other search peers 206 can be assigned. For example, a search peer 206 that was already going to be part of the query execution can be assigned, or another search peer 206 that was not going to be part of the original query. In certain embodiments, the node coordinator 262 assigns a new search peer irrespective of the search peers 206 used in the search. In some cases, the node coordinator 262 assigns the other search peer 206 based on the status updates that the node coordinator 262 receives. In some cases, the node coordinator 262 can prioritize search peers 206 based on their utilization rate (assign search peers with a lower utilization rate to the data identifiers of the unavailable search peer), involvement in the query (assign search peers that are already part of the query or search peers that are not part of the query), or whether the search peer 206 processes other data (e.g., assign a search peer 206 that is set up to only execute queries), etc. Regardless, because the search peers 206 are able to download the relevant data from the shared storage system 260, the node coordinator 262 can, in some embodiments, assign any one or any combination of available search peers 206 to search the groups of data that were previously assigned to the now-unavailable search peer 206A.

Although not illustrated in FIG. 28, while the node coordinator 262 determines that the first search peer 206A is not available, the search head 210 can determine that the query has not been completed. For example, the search head 210 may have not received any search results from the first search peer 206A. In contrast, however, at (4), the search head 210 receives results from the second search peer 206B. In some cases, the search peers 206 can intermittently provide partial results for the data they are tasked with searching. Along with the partial results, the search peers 206 can identify which groups of data were searched or what portions of the query have been completed. Accordingly, in the event the first search peer 206A stops sending partial results the search head 210 can determine which portion of the query was not completed by the first search peer 206A.

In certain embodiments, the first search peer 206A may have completed searching at least a portion of the group of data. In such embodiments, the search head 210 can request the first search peer 206A to complete the rest of the search. In the event, the search head 210 determines that the search peer 206A is no longer available (e.g., by itself or after consulting the node coordinator 262), the search head 210 can construct a new query.

In certain embodiments, the new query can be a modified query. In the case that the new query is a modified query, the search head 210 can generate the modified query based on the portion of the initial search that was completed. Thus, the modified query may include a subset of groups of data compared to the initial query and/or it may include altered filter criteria. For example, if the initial search had a time range of 0-10 and results from time 1-6 were received, the modified query can include a time range of 7-10 (with other filter criteria remaining the same). As another example, if the search head 210 determines that ten groups of data were assigned to be searched by the first search peer 206A but the search peer 206A returned results for four of the ten groups of data (in a time ordered or non-time ordered fashion), the modified query can indicate that the query is to be run on the remaining six groups of data (with other filter criteria remaining the same). By running a modified query, the data intake and query system 108 can reduce time to obtain results. In embodiments where a modified query is to be run, the search head 210 can combine the results of the modified query with the results of the initial query to provide final results to a user.

In some embodiments, the new query can be same as the initial query (e.g., the search head 210 re-runs the same query). For example, rather than attempting to identify what portions of the initial query were completed successfully, and re-running only those failed portions, the system can re-run the entire query. For example, once the node coordinator 262 has been updated to disassociate the unavailable search peer 206A with the relevant groups of data, the search head 210 can re-submit the filter criteria of the initial query to the node coordinator 262 and request a processing node map identifier.

At (5), the node coordinator 262 identifies a second processing node map identifier. For example, as described herein, the node coordinator 262 can update or create a new processing node map in response to a change in the number of available indexers. In certain cases, the node coordinator 262 can discard any/all processing node maps and/or processing node map identifiers that include reference to the now-unavailable search peer 206A. For instance, in this case, since the first search peer 206A has become unavailable, the node coordinator 262 can generate a new processing node map that includes assignments for the currently available indexers. Furthermore, the node coordinator 262 can associate a second processing node map identifier with the new processing node map. In some cases, the node coordinator 262 can use a consistent hashing algorithm to generate the new processing node map(s).

At (6), the search head 210 generates a modified subquery based at least in part on not receiving results from the first search peer 206A. At (7), the search head 210 requests and receives a second processing node map identifier from the node coordinator 262. At (8), the search head 210 communicates the second processing node map identifier ton the second search per 206B. At (9), the second search peer 206B communicates the second processing node map identifier to the node coordinator 262. At (10), the node coordinator 262 communicates the first set of data identifiers that identifies at least a portion of one or more groups of data. The interactions (6)-(10), are similar to interactions (2), (3), (4), (7), and (9), respectively, of FIG. 26, and therefore will not be re-described.

As described herein, in some embodiments, in order for the second search peer 206B to search the relevant portion of the group of data, it may have to download the portion of the one or more groups of data from the shared storage system 260. For example, in cases where the second search peer 206B has not already searched the data, it may have to download it from the shared storage system 260. In some such embodiments, the node coordinator 262 can provide the second search peer 206B with location information of the data to be searched in the shared storage system 260. In addition or alternatively, as discussed herein, in some cases, the second search peer 206B can obtain location information from the data identifier, for example when the data groups are stored in the shared storage system 260 according to a data storage policy. In embodiments where a modified query is executed, the search head 210 can be used to combine the partial results corresponding to the initial query with the results from the modified query.

In certain embodiments, if the available search peer 206A becomes available again, the node coordinator 262 can re-associate the groups of data that were previously associated with it. Accordingly, in some embodiments, the second search peer 206B can be temporarily assigned to one or more groups of data associated with the first search peer 206A.

Figure 29:
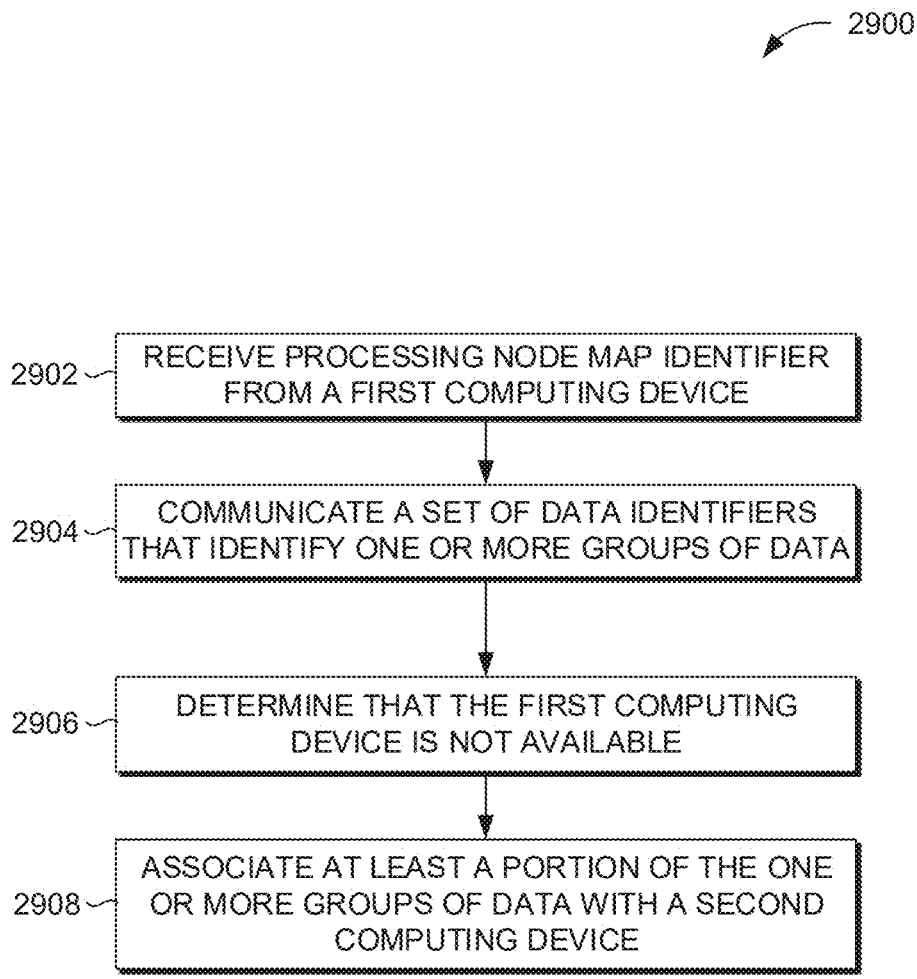
FIG. 29 is a flow diagram illustrative of an embodiment of a routine, implemented by a computing device of a distributed data processing system, for search recovery using a shared storage system following a failed search peer.

FIG. 29 is a flow diagram illustrative of an embodiment of a routine 2900 implemented by a computing device of a distributed data processing system. Although described as being implemented by the node coordinator 262 of the data intake and query system 108, it will be understood that the elements outlined for routine 2900 can be implemented by one or more computing devices/components that are associated with the data intake and query system 108, such as, but not limited to, the node coordinator data store 264, the search head 210, the shared storage system 260, the search peer 206, etc. Thus, the following illustrative embodiment should not be construed as limiting.

At block 2902, the node coordinator 262 receives a processing node map identifier from a first search peer 206A. As described herein, in some embodiments, the node coordinator 262 can receive the processing node map identifier in relation to a query received by the data intake and query system 108, which is processed by a search head 210. In turn the search head 210 can obtain the processing node map identifier from the node coordinator 262 and distribute it and a portion of the query to search peers (including the first search peer 206A) for execution.

As described herein, the processing node map identifier received from the first search peer can be used to identify a set of data identifiers corresponding to one or more groups of data (e.g., one or more buckets of data, slices of data or other types of data) that are to be searched by the first search peer 206A. At block 2904, the node coordinator 262 communicates a set of data identifiers to the first search peer 206A.

At block 2906, the node coordinator 262 determines that the first search peer 206A is not available. As described herein, the node coordinator 262 can determine that the first search is not available based on a missed status update from the search peer. Separately, the search head 210 can determine that the first search peer did not execute the at least a portion of the query. For example, the search head 210 may not have received any results of the query from the search peer 206B and/or the search head 210 may have only received a portion of the results that it was expecting from the search peer 206B. In some cases, as the search peer 206A searches the group of data assigned to it, it provides results to the search head 210 along with an identification of which portion of the group of data has been searched (e.g., an identification of the bucket that was searched to provide relevant results). Based on the results received, the search head 210 can determine what portions of the group of data was searched by the search peer 206A. In certain embodiments, the node coordinator 262 can perform the functions described herein with respect to the search head 210.

At block 2908, the node coordinator 262 assigns at least a portion of the one or more groups of data to a second search peer 206B. In some cases, the portion of the one or more groups of data can correspond to the groups of data that were not searched. As described herein, when the node coordinator 262 determines that the first search peer 206A is not available, it can assign a different search peer 206B to be responsible for searching the data that was previously assigned to the now-unavailable first search peer 206A. In certain embodiments, the node coordinator 262 can assign all groups of data associated with the first search peer 206A with the second search peer 206B or with multiple search peers. In making new assignments, the node coordinator 262 may retain the same processing node map identifier for a particular filter criteria and/or it may generate a new processing node map identifier.

Concurrently, the search head 210 may determine that the search was not completed by the search peer 206A. In some cases, the search head 210 may provide multiple requests to the search peer 206A for the missing search results. Based on the determination that the search was not completed, the search head 210 can run a new query. The new query can be the same as the initial query or a modified version of the initial query (a modified query). In embodiments, where the search head 210 runs a modified query that corresponds to a portion of the initial query, the search head 210 can determine which portions to of the initial query to run based on the portions that were not completed. For some types of searches, the search head 210 may track specific time ranges that have/have not been searched. For other types of searches, the search head 210 may track which results it has received for the buckets that were searched. In either case, the search head 210 can determine what portions of the query are to be re-run and generate the modified query to obtain results for the portions of the query that were not completed.

The search head 210 can send the filter criteria for the new query to the node coordinator 262 and the node coordinator 262 can return a processing node map identifier for the new query. In certain cases, if the new query is the same as the original query, then the node coordinator 262 may return the same processing node map identifier as it had returned for the initial query (albeit with different search peers assigned to search the data). If the new query had different filter criteria (e.g., uses a different time range or identifies different buckets, etc.) or if the processing node map identifier was canceled (e.g., because it was associated with a now-unavailable search peer), the node coordinator 262 can return a different processing node map identifier.

As described herein, the node coordinator 262 can also provide the search head 210 with a list of the search peers 206 that are to be used in the query. Similar to the description of (6), (8), and (9), above with reference to FIG. 26, the search head 210 can distribute portions of the new query to the identified search peers 206 along with the processing node map identifiers, the search peers 206 can communicate the processing node map identifier to the node coordinator 262, and the node coordinator 262 can communicate a set of data identifiers to each search peer 206. However, as described herein, the group of search peers 206 used to execute the new query can exclude the now-unavailable first search peer 206A.

Fewer, more, or different blocks can be used as part of the routine 2900. In some cases, one or more blocks can be omitted. In some embodiments, the blocks of routine 2900 can be combined with any one or any combination of blocks described herein with reference to at least FIGS. 24-27 and/or 30-31.

4.5. Using Processing Node Maps to Incrementally Assign Additional Data Groups to a Processing Node The data intake and query system 108 can manage the search of large amounts of data using one or more processing node maps. As described herein, a processing node map can indicate which processing nodes are responsible for each group of data. In particular, the processing node map can indicate one search assignment (e.g., assigning a responsibility to search) and/or at least one backup assignment (e.g., assigning a responsibility to locally store data) for each group of data.

In some cases, a new processing node may be activated into the data intake and query system 108. As a result, the node coordinator 262 can reassign search or backup duties from one or more processing nodes to the new processing node. In certain cases, the node coordinator 262 can generate the assignments for the new processing node by generating one or more processing node maps.

While the new processing node may receive assignments to search certain data, it may not have that data stored locally. During the execution of a query, if the new processing node determines that it does not have a particular group of data (also referred to herein as a cache miss), the new processing node can download the group of data (e.g., buckets to be searched) from the shared storage system 260. As the new processing node may have a relatively small amount of data stored locally relative to what it is assigned to search, it may download significantly more data compared to legacy processing nodes (processing nodes that were instantiated before the new processing node). Downloading significant amounts data from the shared storage system 260 can degrade performance of the data intake and query system 108 and increase search times.

In some cases, given that the new processing node has little to no locally stored data, the node coordinator 262 can incrementally assign responsibilities to the new processing node over time. By incrementally assigning responsibilities (e.g., adding backup assignments, adding search assignments, converting backup assignments to search assignments, etc.), the node coordinator 262 can provide the new processing node with time to download data, which can reduce the likelihood that searches will result in cache misses.

To implement this incremental increase in responsibilities, the node coordinator 262 can generate and implement one or more interim processing node maps that incrementally increase responsibilities for the new processing node. For example, an interim processing node map may indicate an assignment of fewer data groups to the new processing node than to other processing nodes. As another example, an interim processing node map may indicate an assignment of more backup assignments and/or fewer search assignments to the new processing node than to other processing nodes. In some cases, the first interim processing node map may assign only one searching assignment (or one partition) to the new search peer. The node coordinator 262 can transition from a first interim processing node map to a second interim processing node map, from an interim processing node map to a non-interim processing node map, and/or from a non-interim processing node map to an interim processing node map based on a map transition policy.

4.5.1. Iterative Processing Node Maps

As described herein at least with reference to Table 1, a processing node map can indicate assignments of data groups to a group of processing nodes (sometimes referred to as processing node-data group assignments). For example, in some cases, the data groups can include groups of buckets and/or data slices. In some such cases, the assignments can be referred to as processing node-bucket assignments or processing node-data slice assignments. As another example, in some cases, the data groups can include groups of partition. In some such cases, the assignments can be referred to as processing node-partition assignments.

In general, a processing node-data group assignment assigns some responsibility (e.g., search responsibility and/or backup responsibility) to a processing node. For example, in the cases where the data groups include groups of buckets and/or data slices, a processing node-data group assignment can assign the processing node some responsibility to the data slices and/or the data of the buckets. As another example, in the cases where the data groups include groups of partitions, a processing node-data group assignment can assign the processing node some responsibility to the data associated with the partitions. For example, as described herein, a data interrelationship map can associate partitions with other data groups (e.g., buckets, data slices). In some such cases, a processing node-data group assignment can assign the processing node some responsibility to the data associated with the partitions via the data interrelationship map.

As described herein, the assigned responsibilities can vary over time. For example, in some cases, the processing node map can indicate a search assignment (sometimes referred to as a primary assignment or an assignment for search purposes). In some cases, a search assignment assigns search responsibilities and local storage responsibilities. For example, a processing node assigned to a first group of data for search purposes can be responsible for executing searches on data corresponding to the first group of data. Furthermore, in some cases, a processing node assigned to a first group of data for search purposes can also be responsible for storing at least a portion of the group of data locally. In the event the assigned processing node does not include a copy of the data locally, it can download it from a shared storage system 260. Accordingly, in some cases, a processing node can download data from the shared storage system 260 as part of its search responsibilities.

As another example, in some cases, a processing node map can include a backup assignment (sometimes referred to as a secondary assignment or an assignment for backup purposes) for a processing node, as described herein at least with reference to Table 2. In some cases, a backup assignment assigns backup responsibilities (sometimes referred to as local storage responsibilities) to one or more processing nodes. For example, a processing node assigned to a first group of data for backup purposes can be responsible for locally storing at least a portion of the data associated with the first group of data.

In some cases, as part of the backup responsibilities, the assigned processing node can download groups of data as they are generated by the processing node with searching responsibilities for the groups of data. In some such cases, the processing node with backup responsibilities may not download legacy groups of data (groups of data generated before the processing node received its backup assignment). In certain cases, the processing node downloads legacy groups of data from the shared storage system 260. Accordingly, in some cases, a processing node with backup responsibilities may download data from the shared storage system 260.

As a non-limiting example, processing node 1 may generate buckets assigned to partition 1 and be assigned to search buckets assigned to partition 1 (as a searching assignment) and processing node 2 may be assigned to backup buckets assigned to partition 1 (as a backup assignment). Accordingly, as processing node 1 generates and stores the buckets to the shared storage system 260, processing node 2 can download those buckets. In some cases, the processing node 2 downloads only those buckets generated after it received its backup assignment (e.g., non-legacy buckets). In other cases, the processing node 2 can download additional buckets from partition 1, such as one or more legacy buckets.

The processing node 2, can download the legacy buckets based on one or more thresholds. For example, the processing node 2 can download legacy buckets from partition 1 that were generated in the past five, ten, thirty, or sixty minutes, etc. In some cases, the processing node downloads only warm legacy buckets. In certain cases, the processing node downloads warm and hot legacy buckets (or slices corresponding to hot buckets), etc.

In some cases, the processing node map can indicate a search assignment and at least one backup assignment for each data group. Furthermore, in some cases, no processing node is concurrently assigned for both search and backup purposes for a particular data group. In some such cases, for each data group, one processing node can be assigned for search purposes and at least one different processing node can be assigned for backup purposes. In this way, in certain cases, if a processing node corresponding to a search assignment fails, then a processing node corresponding to the backup assignment can be reassigned to that data group for search purposes. By giving a particular processing node a backup assignment for one or more groups of data (and having the processing node download data associated with the group of data), the data intake and query system 108 can reduce the likelihood of cache misses in the event the particular processing node receives a search assignment to search the one or more groups of data.

In some cases, a processing node map can be classified as either "interim" processing node map or a "non-interim" processing node map. In some cases, interim processing node maps are generated similar to a non-interim processing map, but include deviations from the non-interim processing map. In particular, an interim processing node map may assign fewer responsibilities to a particular processing node (e.g., a newly added processing node) than does a non-interim processing node map. In some cases, the interim processing map(s) can be used as part of a "ramp up" period during which a particular processing node can be incrementally assigned responsibilities until the processing nodes of the system generally include a similar amount of responsibilities. In some cases, the non-interim processing map(s) can correspond to a processing/search distribution at a steady-state.

In some cases, the difference between the interim and non-interim processing node maps can include how the maps were generated. For example, in some cases, the non-interim processing node maps are generated according to a processing node map generation policy (e.g., to achieve load balancing or an approximately equal distribution of groups of data, etc.). In some cases, the processing node map generation policy indicates that data groups are to be assigned to processing nodes according to a hashing algorithm, such as a consistent hashing algorithm. For example, the processing node map generation policy can indicate to perform a hash on the identifiers for the data groups and assign the data groups to the processing based on the hash. As a non-limiting example, in certain cases, the processing node map generation policy can include instructions for the node coordinator 262 to use a modulo operand on the data groups to be assigned to determine to which processing node that data is to be assigned. However, it will be understood that the processing node map generation policy can indicate a variety of mechanisms to assign data groups to processing nodes.

In some cases, the interim processing node maps can be generated by first creating a tentative processing node map that is generated the same way in which an interim processing node map is generated and then removing or reassigning at least one of the assignments to a particular processing node. For example, the interim processing node maps can be generated by generating a tentative processing node map according to a processing node map generation policy (in this cases, the tentative processing node map indicates an assignment of a set of data groups to a first processing node), and then reassigning a subset of the data groups of the set of data groups to one or more other processing nodes.

Consider the example in which a newly available processing node is to be grouped with a set of three legacy processing nodes (for a total of four processing nodes) to process buckets from twelve partitions. Prior to the addition of the new processing node, the legacy processing nodes can process the buckets based on a legacy processing node map, an example of which is illustrated in Table 5.

TABLE 5

| Processing Node Map ID | Processing Node ID | Searching Partition ID |
| --- | --- | --- |
| 64 | A | P1, P4, P7, P10 |
|  | B | P2, P5, P8, P11 |
|  | C | P3, P6, P9, P12 |

In response to the addition of the new processing node, the node coordinator 262 can generate an interim processing node map to transition a new processing node into use. As part of generating the interim processing node map, the node coordinator 262 can generate a tentative processing node assignment for the four processing nodes according to a processing node map generation policy. An example tentative processing node assignment is illustrated in Table 6.

TABLE 6

| Processing Node ID | Searching Partition ID |
| --- | --- |
| A | P1, P5, P9 |
| B | P2, P6, P10 |
| C | P3, P7, P11 |
| D (new) | P4, P8, P12 |

However, given that the processing node D is new (or recently made available), the node coordinator 262 can reassign one or more partitions to a different processing node to generate the interim processing node map. In this example, the node coordinator 262 reassigns partitions P8 and P12 to processing node A. An example tentative processing node map is illustrated in Table 7.

TABLE 7

| Processing Node Map ID | Processing Node ID | Searching Partition ID |
| --- | --- | --- |
| 65 (interim) | A | P1, P5, P9, P8, P12 |
|  | B | P2, P6, P10 |
|  | C | P3, P7, P11 |
|  | D (new) | P4 |

Under the interim process node map, the new processing node D generates and searches buckets assigned to one partition (P4) compared to the other partitions that search at least three partitions. Although partitions P8 and P12 were both assigned to processing node A, it will be understood that the reassigned partitions can be distributed in variety of ways. In some cases, the reassigned partitions can be assigned to the processing node that searched them under a previous processing node map.

With continued reference to the example the node coordinator 262 can generate a second processing node map according to the processing node map generation policy that distributes the partitions in a more equitable way. An example processing node map is shown in Table 8.

TABLE 8

| Processing Node Map ID | Processing Node ID | Searching Partition ID |
| --- | --- | --- |
| 66 | A | P1, P5, P9 |
|  | B | P2, P6, P10 |
|  | C | P3, P7, P11 |
|  | D (new) | P4, P8, P12 |

As shown, in the second processing node map, the partitions P8 and P12 have been reassigned from processing node A to processing node D for searching purposes. By assigning a smaller set of partitions to the processing node D for search purposes using a first processing node map and later assigning more partitions, the node coordinator 262 can reduce the number of caches misses experienced by the system overall. By reducing the number of cache misses, the node coordinator 262 can decrease the amount of network traffic and decrease search times thereby increasing the efficiency of the distributed data intake and processing system as a whole.

In some cases, the node coordinator 262 can transition from the first processing node map to the second processing node map according to a map transition policy. The map transition policy can indicate that the node coordinator 262 transition from the interim processing node map to the non-interim processing node map based on a threshold amount of time, cache misses, amount of data downloaded, etc. For example, in some cases, the map transition policy indicates that the group of distributed processing nodes are to transition from the first processing node map to the second processing node map based on a determination that a timing threshold is satisfied. The thresholds can be user specified or based on processing characteristics of the processing node or other component of the data intake and query system 108. In some cases, the map transition policy indicates that the group of distributed processing nodes are to transition from the first processing node map to the second processing node map based on a determination that a quantity of cache misses by the first processing node with respect to the data group satisfies a cache-miss threshold. In some cases, the map transition policy indicates that the group of distributed processing nodes are to transition from the first processing node map to the second processing node map based on a determination that a quantity of searches executed by the first processing node satisfies a search quantity threshold. In some cases, the map transition policy indicates that the group of distributed processing nodes are to transition from the first processing node map to the second processing node map based on a determination that a quantity of times the first processing node has searched a data group from the fewer data groups satisfies a search quantity threshold. In certain cases, the map transition policy indicates that the group of distributed processing nodes are to transition from the first processing node map to the second processing node map based on an amount of data (or number of buckets) downloaded or stored on the first processing node. It will be understood that any one or any combination of the aforementioned options can be included as part of the map transition policy.

Although the example only includes one interim processing node map, it will be understood that multiple interim processing node maps can be used. In cases where the node coordinator 262 uses multiple interim processing node maps, each subsequent processing node map can include additional search assignments for the processing node. In some cases, however, the node coordinator 262 can reduce search assignments to the processing node in subsequent processing node maps. For example, if the node coordinator 262 assigns five partitions to a new processing node in a processing node map, and determines that the search time has increased by a threshold amount or that the new processing node has more than a threshold number of cache misses (within a time period), the node coordinator 262 can generate a new processing node map that assigns less than five partitions to the new processing node. In addition, the node coordinator 262 can transition between processing node maps based on the map transition policy.

4.5.2. Iterative Processing Node Map Flow

Figure 30:
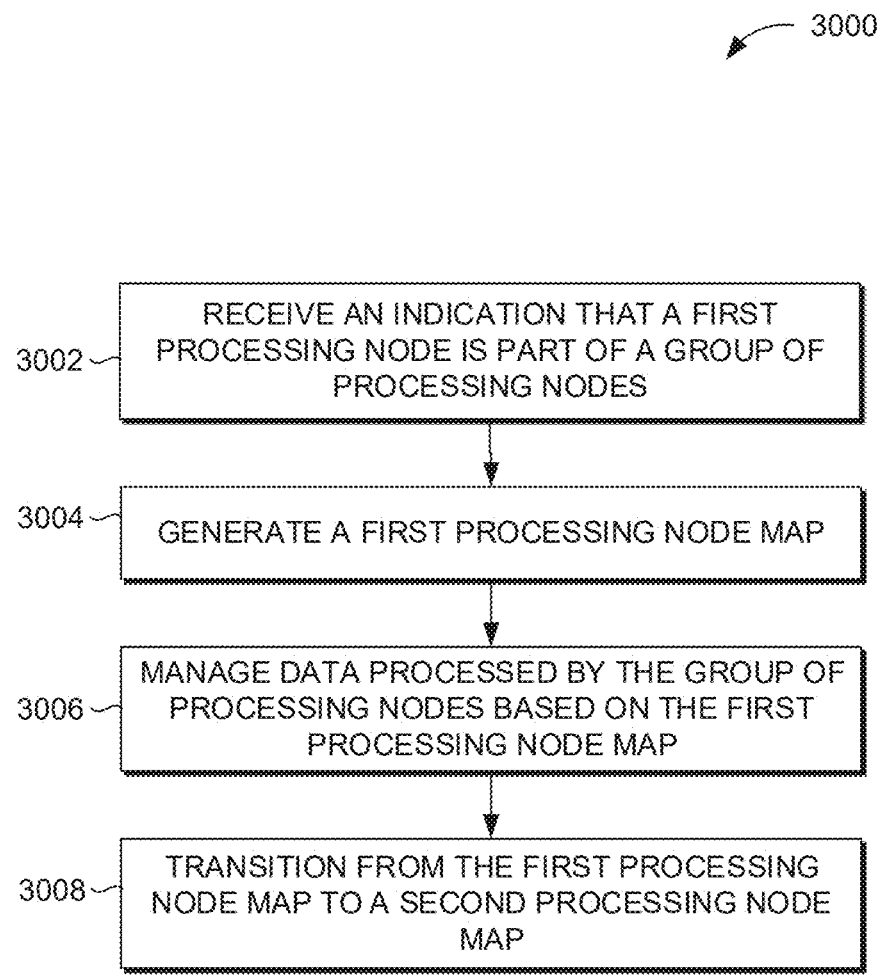
FIG. 30 is a flow diagram illustrative of an embodiment of a routine, implemented by a computing device of a distributed data processing system, for using processing node maps to incrementally assign additional data groups to a processing node.

FIG. 30 is a flow diagram illustrative of an embodiment of a routine 3000 implemented by a computing device of a distributed data processing system. Although described as being implemented by the node coordinator 262 of the data intake and query system 108, it will be understood that the elements outlined for routine 3000 can be implemented by one or more computing devices/components that are associated with the data intake and query system 108, such as, but not limited to, the node coordinator data store 264, the search head 210, the shared storage system 260, the search peer 206, etc. Thus, the following illustrative embodiment should not be construed as limiting.

At block 3002, the node coordinator 262 receives an indication that a first processing node in combination with a set of one or more distributed processing nodes forms a group of distributed processing nodes. In some cases, the indication can correspond to the first processing node being activated in the data intake and query system 108 and available to execute queries. In some cases, the indication can correspond to the first processing node transitioning from unavailable to available.

The set of one or more distributed processing nodes can correspond to the processing nodes that are activated in the data intake and query system 108 and available to execute queries at the moment prior to when the first processing node becomes activated and available to execute queries (also referred to herein as legacy processing nodes). Thus, in some cases, the group of distributed processing nodes can correspond to the processing nodes of the data intake and query system 108 that are available to execute queries, including the legacy processing nodes and the new processing node. Alternatively, in some cases, the group of distributed processing nodes can correspond to a subset of the available processing nodes of the data intake and query system 108.

As described herein, in some cases, the node coordinator 262 can receive or maintain status identifiers of the processing nodes. For example, the node coordinator 262 may receive updates regarding processing node availability or unavailability via status update communications or "heartbeats" from the processing nodes. In some cases, the indication that the first processing node, in combination with the set of one or more distributed processing nodes, forms a group of distributed processing nodes can correspond to a status update communication from the first processing nodes. For example, the indication can include a status update that the first processing node is available to execute queries.

Prior to the node coordinator 262 receiving the indication, and at least for a first time period, the node coordinator 262 manages the processing of data by the data intake and query system 108 according to a legacy processing node map (processing node map used prior to the addition of the new processing node). For example, as the first processing node was unavailable during the first time period, the legacy processing node map does not include any assignments to the first processing node.

At block 3004, the node coordinator 262 generates a first processing node map. In some cases, the first processing node map can be an interim processing node map, as described herein. In some cases, to generate the first processing node map, the node coordinator 262 generates a tentative processing node assignment according to a map generation policy and then modifies the assignments related to the processing node map to generate the first processing node map. For example, the tentative processing node assignment can identify the first processing node as the search processing node for a set of data groups. The node coordinator 262 can reassign a subset of data groups of the set of data groups to one or more other processing nodes to generate the first processing node map. Furthermore, in some cases, the node coordinator 262 can reassign the subset of data groups to the first processing node for backup purposes. For example, in some cases, the tentative processing node assignment can associate a set of data groups with the first processing node for backup purposes. In some such cases, the node coordinator 262 can reassign a subset of data groups of the set of data groups to one or more other processing nodes.

In some cases, the first processing node map can indicate an assignment of at least one data group of a plurality of data groups to each processing node of the group of distributed processing nodes. Furthermore, the first processing node map can indicate an assignment of fewer data groups of the plurality of data groups to the first processing node than data groups of the plurality of data groups to other processing nodes of the group of distributed processing nodes. For example, the first processing node map can include fewer search assignments for the first processing node or fewer backup assignments for the first processing node than for other processing nodes. As another example, the first processing node map can include fewer search assignments to the first processing node and more backup assignments to the first processing node than to other processing nodes.

At block 3006, the node coordinator 262 manages data processed by the group of processing nodes based on the first processing node map. The node coordinator 262 can use the first processing node map for a second time period that follows the first time period. In some cases, the first time period may overlap with the second time period (e.g., some searches may still be executed using the legacy processing node map and newer searches can be executed using the first processing node map). In certain cases, over time, the node coordinator 262 can transition away from using the legacy processing node map and discontinue its use. In certain cases, the node coordinator 262 can transition from the legacy processing node map to the first processing node map according to a map transition policy. The map transition policy can indicate the transition time, etc. to transition from the legacy processing node map to the first processing node map.

As part of managing data based on the first processing node map, the node coordinator 262 can assign buckets to partitions based on the first processing node map, determine which buckets are to be assigned to which processing nodes for search queries, etc.

At block 3008, the node coordinator 262 transitions from the first processing node map to a second processing node map based on a map transition policy. In some cases, the second processing node map can be another interim processing node map, such as an interim processing node map that assigns more responsibilities to the first processing node than the first processing node map (but fewer responsibilities than a non-interim map). If the second processing node map is an interim processing node map, it can be generated in a manner similar to that described herein with reference to block 3008. In some cases, the second processing node map is a non-interim processing node map. In either case, the second processing node map can indicate an assignment of more data groups of the plurality of data groups to the first processing node than the second processing node map. In some cases, the node coordinator 262 transitions from the first processing node map to the second processing node map based on a map transition policy.

Fewer, more, or different blocks can be used as part of the routine 3000. In some cases, one or more blocks can be omitted. In some embodiments, the blocks of routine 3000 can be combined with any one or any combination of blocks described herein with reference to at least FIGS. 24-27, 29 and/or 31.

4.6. Reassigning Data Group from Backups to Searching for a Processing Node

As described herein, the data intake and query system 108 can manage the search of large amounts of data using one or more processing nodes. In some cases, a new processing node may be added to the data intake and query system 108.

When a processing node is added or becomes available, it may not have copies of the data that is to be searched stored locally. As such, the new processing node may spend excessive time downloading copies of the data from a shared storage system 260 in order to execute a search. This can increase search time and decrease the effectiveness of the data intake and query system 108.

In some cases, to efficiently add a new processing node to the data intake and query system 108, the node coordinator 262 can initially assign the new processing node one or more groups of data for backup purposes. As part of the backup assignment, the new processing node can serve as a secondary node to search the assigned groups of data in the event the primary processing node becomes unavailable. In addition, the new processing node can download the assigned groups of data or portions of the assigned groups of data from the shared storage system 260. In certain cases, the new processing node can download portions of the groups of data as they are generated by the primary processing node (e.g., the processing node assigned to search the groups of data). In some cases, the new processing node can download portions of the groups of data that were generated prior to its backup assignment.

At a later time, the node coordinator 262 can reassign the new processing node to the one or more groups of data for searching (or primary) purposes. In some cases, the node coordinator 262 can make the reassignment based on a threshold time being satisfied, based on the new processing node downloading or storing a threshold number of portions of the groups of data, or performing a threshold number of searches, etc.

In certain cases, the node coordinator 262 can incrementally reassign groups of data to the new processing node for searching purposes. For example, if one group of data is initially assigned to the new processing node for searching purposes and a set of groups of data is assigned to the new processing node for backup purposes, at a later time, the node coordinator 262 can reassign one or more groups of data from the set of groups of data to the new processing node for search purposes. Following some additional time, the node coordinator 262 can (incrementally) assign additional groups of data (from backup to searching assignments) until the node coordinator 262 has assigned groups of data to the new processing node to achieve load balancing between processing nodes. In some cases, the node coordinator 262 can reassign all of the groups of data to the new processing node in order to load balance the assignment of groups of data between the processing nodes.

For illustrative purposes, consider the example in which a newly available processing node is to be grouped with a set of three legacy processing nodes (for a total of four processing nodes) to process buckets from twelve partitions. Prior to the addition of the new processing node, the legacy processing nodes can process the buckets based on the following assignment.

TABLE 9

| Processing Node ID | Searching Partition ID | Backup Partition ID |
|---|---|---|
| A | P1, P4, P7, P10 | P2, P5, P8, P11 |
| B | P2, P5, P8, P11 | P3, P6, P9, P12 |
| C | P3, P6, P9, P12 | P1, P4, P7, P10 |

Based on the above assignment, processing node A generates and searches buckets assigned to partitions P1, P4, P7, P10, processing node B generates and searches buckets assigned to partitions P2, P5, P8, P11, and processing node C generates and searches buckets assigned to P3, P6, P9, P12. In addition, processing node A is assigned to partitions P2, P5, P8, P11 for backup purposes, processing node B is assigned to partitions P3, P6, P9, P12 for backup purposes, and processing node C is assigned to partitions P1, P4, P7, P10 for backup purposes.

In response to the addition of the new processing node, the node coordinator 262 can generate an interim processing node assignment to transition a new processing node (processing node D) into use, as illustrated in Table 10.

TABLE 10

| Processing Node ID | Searching Partition ID | Backup Partition ID |
|---|---|---|
| A | P1, P4, P7, P10 | P2, P8, P12 |
| B | P2, P5, P8, P11 | P3, P6, P9 |
| C | P3, P6, P9, P12 | P1, P7, P10 |
| D | | P4, P8, P12, P2, P5, P11 |

Under the interim assignment, the new processing node D is assigned to partitions P4, P8, P12, P2, P5, P11 for backup purposes. As part of this assignment processing node D can download buckets assigned to partitions P4, P8, P12, P2, P5, P11 from the shared storage system 260. As described herein, the processing node D can generate buckets as they are generated by the processing nodes assigned to generate and search buckets assigned to partitions P4, P8, P12, P2, P5, P11 and/or download legacy buckets assigned to partitions P4, P8, P12, P2, P5, P11. In addition to the backup assignment for processing node D, the backup assignments for processing nodes A, B, and C are reduced or changed. Specifically, processing node A, B, and C are no longer assigned to partitions P8, P12, and P4, respectively, for backup purposes, and processing node is reassigned partitions P4, P8, and P12 for backup purposes. Accordingly, under the example interim assignment, partitions P2, P8, and P12 are assigned to more processing nodes for backup purposes than other partitions.

The node coordinator 262 can generate an additional processing node assignment as part of transitioning the processing node into use. An example processing node assignment is illustrated in Table 11.

TABLE 11

| Processing Node ID | Searching Partition ID | Backup Partition ID |
|---|---|---|
| A | P1, P7, P10 | P4, P8, P12 |
| B | P2, P5, P11 | P3, P6, P9 |
| C | P3, P6, P9 | P1, P7, P10 |
| D | P4, P8, P12 | P2, P5, P11 |

Under the additional processing node assignment, processing node D is assigned partitions P4, P8, and P12 for searching purposes and remains assigned to partitions P2, P5, and P11 for backup partitions. The other assignments remain the same. By first assigning partitions P4, P8, and P12 to processing node D for backup purposes (during which processing node D downloads buckets assigned to partitions P4, P8, and P12) and then reassigning partitions P4, P8, and P12 to processing node D for searching processes, the node coordinator 262 can reduce cache misses by the processing node D during searches, thereby increasing the efficiency of the distributed data intake and processing system as a whole.

In some cases, the node coordinator 262 can transition from the interim processing node assignment to the additional processing node assignment according to an assignment transition policy. The assignment transition policy can be implemented similar to the map transition policy described herein. For example, the assignment transition policy can indicate that the node coordinator 262 is to transition from the interim processing node assignment to the additional processing node assignment based on any one or any combination of threshold times, cache misses, amount of data downloaded, etc.

Although the example only includes one interim processing node assignment, it will be understood that multiple interim processing node assignments can be used. In cases where the node coordinator 262 uses multiple interim processing node assignments, each subsequent processing node map can include additional reassignments (from backup to search) for the processing node. In some cases, however, the node coordinator 262 can reduce search assignments to the processing node in subsequent processing node assignments. For example, if the node coordinator 262 assigns five partitions to a new processing node in a processing node map and determines that the search time has increased by a threshold amount or that the new processing node has more than a threshold number of cache misses (within a time period), the node coordinator 262 can reassign some of the partitions to the new processing node for backup purposes. In addition, the node coordinator 262 can transition between processing node maps based on the assignment transition policy.

4.6.1. Data Group Reassignment Flow

Figure 31:
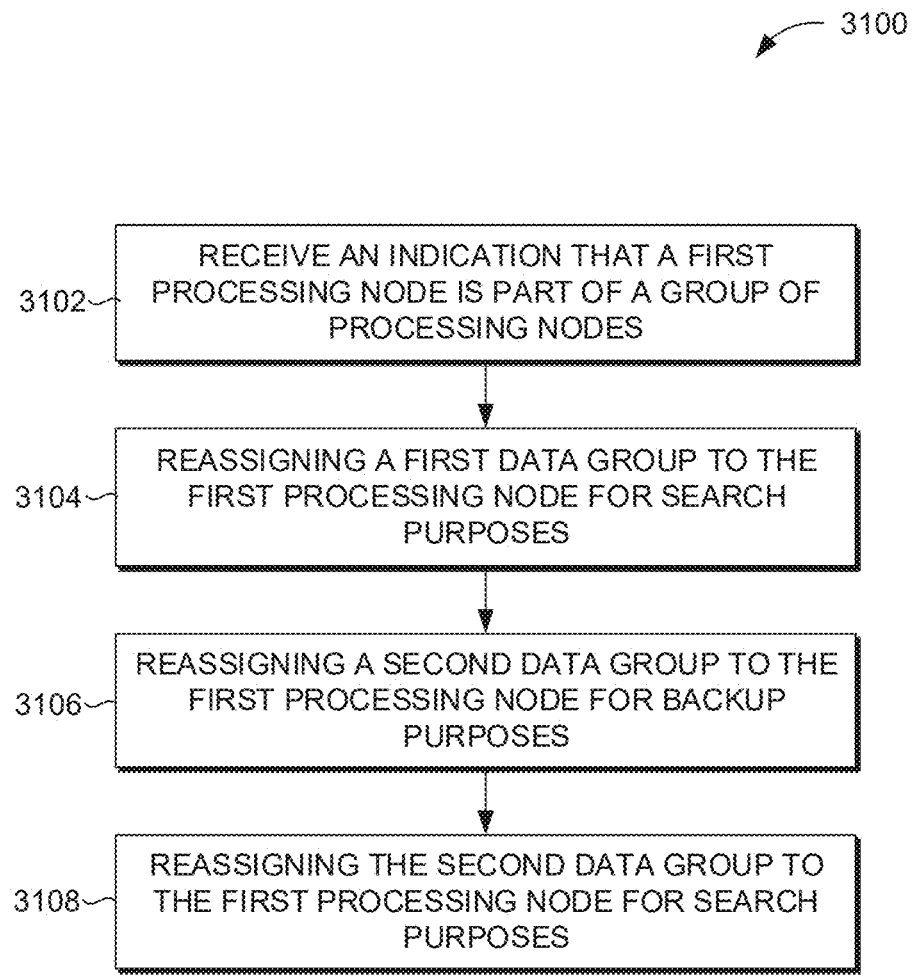
FIG. 31 is a flow diagram illustrative of an embodiment of a routine, implemented by a computing device of a distributed data processing system, for reassigning data group from backups to searching for a processing node.

FIG. 31 is a flow diagram illustrative of an embodiment of a routine 3100 implemented by a computing device of a distributed data processing system. Although described as being implemented by the node coordinator 262 of the data intake and query system 108, it will be understood that the elements outlined for routine 3100 can be implemented by one or more computing devices/components that are associated with the data intake and query system 108, such as, but not limited to, the node coordinator data store 264, the search head 210, the shared storage system 260, the search peer 206, etc. Thus, the following illustrative embodiment should not be construed as limiting.

At block 3102, the node coordinator 262 receives an indication that a first processing node in combination with a set of one or more distributed processing nodes forms a group of distributed processing node, similar to block 3002 of FIG. 30.

At block 3104, the node coordinator 262 assigns a first data group to the first processing node for search purposes. As described herein, assigning the first data group to the first processing node for search purposes configures the first processing node to execute searches on at least a portion of the first data group. In some cases, the first processing node may include a copy of at least a portion of the first data group in its local storage. For example, in some cases, the at least a portion of the first data group may have been generated by the first processing node and/or stored to the shared storage system 260 by the first processing node.

In some cases, assigning the first data group to the first processing node for search purposes configures the first processing node to copy at least a portion of the first data group from a shared storage system 260. For example, in some cases, the at least a portion of the first data group may have been generated by a different processing node and stored to the shared storage system 260 by that processing node.

As described herein, in some cases, the node coordinator 262 assigns the first data group to the first processing node based on an interim processing node assignment. In some cases, the node coordinator 262 generates the interim processing node assignment and/or assigns a first data group to the first processing node based on the indication received at block 3102.

At block 3106, the node coordinator 262 assigns a second data group to the first processing node for backup purposes.

As described herein, assigning the second data group to the first processing node for backup purposes can configure the first processing node to retain or download at least a portion of the second data group in its local storage. In some cases, at least a portion of the second data group may have been generated by a different processing node and stored to the shared storage system 260 by that processing node.

As described herein, in some cases, the node coordinator 262 assigns the second data group to the first processing node based on the interim processing node assignment. In some cases, the blocks 3104 and 3106 are performed concurrently. For example, in some cases, the node coordinator 262 can generate a single processing node assignment that assigns the first data group to the first processing node for search purposes and assigns the second data group to the first processing node for backup purposes. In some cases, the node coordinator 262 generates the interim processing node assignment and/or assigns the second data group to the first processing node based on the indication received at block 3102.

At block 3108, the node coordinator 262 reassigns the second data group to the first processing node for search purposes. For example, as described herein, based on an assignment transition policy, the node coordinator 262 can use the interim processing node assignment for a period of time, and based on one or more thresholds, the node coordinator 262 can generate and transition to another processing node assignment.

In some cases, the node coordinator 262 reassigns the second data group to the first processing node for search purposes based on an additional processing node assignment. The node coordinator 262 can generate the processing node assignment concurrently with the first processing node assignment or after the first processing node assignment. In some cases, the node coordinator 262 can transition from the first or interim processing node assignment to the second processing node assignment based on an assignment transition policy, as described herein.

Reassigning the second data group to the first processing node for search purposes configures the first processing node to execute searches on at least a portion of the second data group. For example, since the first processing node was previously assigned to the second data group for backup purposes, the first processing node may already include a copy of at least a portion of the second data group in its local storage.

Fewer, more, or different blocks can be used as part of the routine 3100. In some cases, one or more blocks can be omitted, such as block 3104. For example, in some cases, the node coordinator 262 may not assign groups of data to the new processing node for search purposes until after the new processing node has functioned as a backup processing node for one or more data groups for a period of time.

In some embodiments, the blocks of routine 3100 can be combined with any one or any combination of blocks described herein with reference to at least FIGS. 24-27, 29 and/or 30.

4.7. Using Processing Node Maps and Data Group Reassignments to Transition a Processing Node into Use As described herein, when a new processing node is activated or made available, using it can negatively impact system performance and search times. Individually, using multiple processing node maps to iteratively increase the search assignments for the new processing node or assigning groups of data to the processing node for backup purposes and then reassigning the groups of data to the processing node for search purposes can improve system performance. Using both multiple processing node maps and data group reassignment can further improve system performance by reducing cache misses at the new processing node and at the system level.

Similar to the examples described above, consider the example in which a new processing node is to be grouped with a set of three legacy processing nodes (for a total of four processing nodes) to process buckets from twelve partitions. The node coordinator 262 can generate an interim processing node map for the four processing nodes that assigns fewer (or only one) partition to the new processing node for searching and one or more partitions to the new processing node for backup. An example interim processing node map is illustrated in Table 12.

TABLE 12

| Processing Node Map ID | Processing Node ID | Searching Partition ID | Backup Partition ID |
|---|---|---|---|
| 65 (interim) | A | P1, P5, P9, P8, P12 | P4 |
|  | B | P2, P6, P10 | P1, P5, P9 |
|  | C | P3, P7, P11 | P2, P6, P10 |
|  | D (new) | P4 | P3, P7, P8, P11, P12 |

Under the interim process node map, the new processing node D generates and searches buckets assigned to one partition (P4) and copies buckets assigned to five partitions (P3, P7, P8, P11, and P12) from the shared storage system 260 compared to the other partitions that search at least three partitions.

Two partitions (P8 and P12) would have been assigned to the processing node D, but were reassigned given that processing node D is new. In the illustrated example, partitions P8 and P12 were both assigned to processing node A (which would have been the backup processing node), however, it will be understood that the reassigned partitions can be distributed in variety of way. In some cases, the reassigned partitions can be assigned to the processing node that searched them under a previous processing node map. In certain cases, the reassigned partitions are assigned to the processing that will become the backup processing node in a subsequent processing node map. In some cases, the reassigned partitions can be reassigned in a load balancing fashion across the various legacy processing nodes.

In addition the two partitions (P8 and P12) that were reassigned to another processing node for searching are assigned to the new processing node D for backup purposes. In this way, the new processing node D can begin storing copies of buckets assigned to reassigned partitions (P8 and P12).

With continued reference to the example, the node coordinator 262 can generate a second processing node map, according to a map generation policy, that distributes the partitions in a more equitable way. An example processing node map is shown in Table 13.

TABLE 13

| Processing Node Map ID | Processing Node ID | Searching Partition ID | Backup Partition ID |
|---|---|---|---|
| 66 | A | P1, P5, P9 | P4, P8, P12 |
|  | B | P2, P6, P10 | P1, P5, P9 |

TABLE 13-continued

| Processing Node Map ID | Processing Node ID | Searching Partition ID | Backup Partition ID |
|---|---|---|---|
| | C | P3, P7, P11 | P2, P6, P10 |
| | D (new) | P4, P8, P12 | P3, P7, P11 |

As shown, in the second processing node map, the partitions P8 and P12 have been reassigned from processing node A to processing node D for searching purposes and from processing node D to processing node A for backup purposes. By assigning the partitions P8 and P12 to processing node D for backup purposes (in which the processing node D download buckets assigned to the partitions) and then reassigning the partitions P8 and P12 to the processing node D for searching purposes, the node coordinator 262 can reduce the number of cache misses when the processing node D executes searches on buckets from partition P8 and P12. In addition, by assigning a smaller set of partitions to the processing node D for search purposes using a first processing node map and later assigning more partitions, the node coordinator 262 can reduce the number of caches misses experienced by the system overall. By reducing the number of cache misses, the node coordinator 262 can decrease the amount of network traffic and decrease search times thereby increasing the efficiency of the distributed data intake and query system 108 as a whole.

Although the example only includes one interim processing node map, it will be understood that multiple interim processing node maps can be used. In addition, as described herein, in some cases, the node coordinator 262 can transition from the first processing node map to the second processing node map according to a map transition policy.

5.0 Example Embodiments

Embodiments of the present disclosure can be described in view of the following clauses:

Clause 1. A method, comprising:
receiving an indication that a first processing node in combination with a set of one or more distributed processing nodes forms a group of distributed processing nodes;
based on said receiving the indication, generating a first processing node map,
wherein the first processing node map indicates an assignment of at least one data group of a plurality of data groups to each processing node of the group of distributed processing nodes,
wherein at least a portion of a data group of the plurality of data groups is stored in a remote shared storage system,
wherein the first processing node map indicates an assignment of fewer data groups of the plurality of data groups to the first processing node than data groups of the plurality of data groups to other processing nodes of the group of distributed processing nodes;
managing data processed by the group of distributed processing nodes based on the first processing node map,
wherein a particular processing node of the group of distributed processing nodes is configured to at least one of generate at least a portion of a particular data group or search at least a portion of the particular data group,
wherein the first processing node map indicates an assignment of the particular data group to the particular processing node; and
based on a map transition policy, transitioning from the first processing node map to a second processing node map,
wherein based on the transitioning, the group of distributed processing nodes are configured to manage data based on the second processing node map,
wherein the second processing node map indicates an assignment of at least one data group of the plurality of data groups to each processing node of the group of distributed processing nodes, and
wherein the second processing node map indicates an assignment of more data groups of the plurality of data groups to the first processing node than the first processing node map.

Clause 2. The method of Clause 1, wherein each of the plurality of data groups is a partition, and wherein each partition includes a plurality of buckets.

Clause 3. The method of any of the previous clauses, wherein each of the plurality of data groups is a bucket.

Clause 4. The method of any of the previous clauses, wherein the shared storage system is accessible by any one of the group of distributed processing nodes.

Clause 5. The method of any of the previous clauses, further comprising transitioning from the second processing node map to a third processing node map,
wherein based on said transitioning from the second processing node map to the third processing node map, the group of distributed processing nodes is configured to manage data based on the third processing node map,
wherein the third processing node map indicates an assignment of at least one data group of the plurality of data groups to each processing node of the group of distributed processing nodes, and
wherein the third processing node map indicates an assignment of more data groups of the plurality of data groups to the first processing node than the second processing node map.

Clause 6. The method of any of the previous clauses, further comprising transitioning from the second processing node map to a third processing node map,
wherein based on said transitioning from the second processing node map to the third processing node map, the group of distributed processing nodes is configured to manage data based on the third processing node map,
wherein the third processing node map indicates an assignment of at least one data group of the plurality of data groups to each processing node of the group of distributed processing nodes,
wherein the third processing node map indicates an assignment of more data groups of the plurality of data groups to the first processing node than the second processing node map, and wherein first processing node map is used during a first time period, the second processing node map is used during a second time period that follows the first time period, and the third processing node map is used during a third time period that follows the second time period.

Clause 7. The method of any of the previous clauses, wherein the indication is based on a determination that the first processing node has been activated and is available to execute queries.

Clause 8. The method of any of the previous clauses, wherein first processing node map is used during a first time period and the second processing node map is used during a second time period that follows the first time period.

Clause 9. The method of any of the previous clauses, further comprising executing queries on data using the first processing node map during a first time period and executing queries on data using the second processing node map during a second time period that is after the first time period.

Clause 10. The method of any of the previous clauses, wherein prior to receiving the indication associated with the first processing node, the set of one or more distributed processing nodes are configured to perform one or more queries on data from the remote shared storage system based on a third processing node map, wherein the third processing node map indicates an assignment of a particular processing node of the set of one or more distributed processing nodes to search a particular data group.

Clause 11. The method of any of the previous clauses, wherein the first processing node map indicates an assignment of only one data group of the plurality of data groups to the first processing node.

Clause 12. The method of any of the previous clauses, wherein the first processing node map indicates an assignment fewer data groups of the plurality of data groups to the first processing node than any other processing node of the group of distributed processing nodes.

Clause 13. The method of any of the previous clauses, wherein the first processing node map indicates an assignment of at least one first data group to the first processing node as a search assignment and at least one second data group to the first processing node as a backup assignment.

Clause 14. The method of any of the previous clauses,
wherein the first processing node map indicates an assignment of at least one first data group to the first processing node as a search assignment and at least one second data group to the first processing node as a backup assignment, and
wherein the first processing node map indicates an assignment of the at least one second data group to a second processing node of the group of distributed processing nodes as a search assignment, wherein one or more buckets generated by the second processing node are stored in the shared storage system and associated with the at least one second data group.

Clause 15. The method of any of the previous clauses,
wherein the first processing node map indicates an assignment of at least one first data group to the first processing node as a search assignment and at least one second data group to the first processing node as a backup assignment,
wherein the first processing node map indicates an assignment of the at least one second data group to a second processing node of the group of distributed processing nodes as a search assignment, wherein one or more buckets generated by the second processing node are stored in the shared storage system and associated with the at least one second data group, and
wherein the first processing node downloads the one or more buckets associated with the at least one second data group in accordance with the backup assignment.

Clause 16. The method of any of the previous clauses,
wherein the first processing node map indicates an assignment of at least one first data group to the first processing node as a search assignment and at least one second data group to the first processing node as a backup assignment,
wherein the first processing node stores a copy of the at least one first data group to the shared storage system and downloads a copy of the at least one second data group from the shared storage system.

Clause 17. The method of any of the previous clauses, wherein the first processing node map indicates an assignment of a particular data group of the plurality of data groups to at least two processing nodes, wherein a first node of the at least two processing nodes is assigned as a search processing node for the particular data group and a second node of the at least two processing nodes is assigned as a backup processing node for the particular data group.

Clause 18. The method of any of the previous clauses,
wherein the first processing node map indicates an assignment of a particular data group of the plurality of data groups to at least two processing nodes, wherein a first node of the at least two processing nodes is assigned as a search processing node for the particular data group and a second node of the at least two processing nodes is assigned as a backup processing node for the particular data group, and
wherein the search processing node stores buckets associated with the particular data group stores buckets associated with the particular data group in the shared storage system and the backup processing node obtains copies of the buckets from the shared storage system and stores the copies of the buckets locally.

Clause 19. The method of any of the previous clauses,
wherein the first processing node map indicates an assignment of a particular data group of the plurality of data groups to at least two processing nodes, wherein a first node of the at least two processing nodes is assigned as a search processing node for the particular data group and a second node of the at least two processing nodes is assigned as a backup processing node for the particular data group, and
wherein the search processing node stores the particular data group in the shared storage system and the backup processing node obtains a copy of the particular data group from the shared storage system and stores it locally.

Clause 20. The method of any of the previous clauses, wherein said generating the first processing node map comprises:
assigning a set of data groups to the first processing node based on a hashing algorithm
reassigning a subset of data groups of the set of data groups to one or more other processing nodes of the group of distributed processing nodes, and
assigning the first processing node as a backup processing node for the subset of data groups.

Clause 21. The method of any of the previous clauses, wherein said generating the first processing node map comprises:
assigning a set of data groups to the first processing node based on a hashing algorithm,
reassigning a subset of data groups of the set of data groups to one or more other processing nodes of the group of distributed processing nodes, and
assigning the first processing node as a backup processing node for the subset of data groups,
wherein the first processing node copies buckets associated with the subset of data groups from the shared storage system.

Clause 22. The method of any of the previous clauses, wherein said generating the first processing node map comprises:
assigning a set of data groups to the first processing node based on a hashing algorithm, reassigning a subset of data groups of the set of data groups to one or more other processing nodes of the group of distributed processing nodes, and assigning the first processing node as a backup processing node for the subset of data groups, wherein the first processing node copies buckets associated with the subset of data groups from the shared storage system, wherein the copied buckets correspond to buckets generated by a second processing node.

Clause 23. The method of any of the previous clauses, wherein said generating the first processing node map comprises:

assigning a set of data groups to the first processing node based on a hashing algorithm, reassigning a subset of data groups of the set of data groups to one or more other processing nodes of the group of distributed processing nodes, and assigning the first processing node as a backup processing node for the subset of data groups, wherein the first processing node copies buckets associated with the subset of data groups from the shared storage system, wherein the copied buckets correspond to buckets generated by a second processing node after the first processing node map is generated.

Clause 24. The method of any of the previous clauses, further comprising generating the second processing node map by:

assigning a set of data groups to the first processing node based on a hashing algorithm, wherein the subset of data groups is assigned to the first processing node as part of a search assignment.

Clause 25. The method of any of the previous clauses, wherein said generating the first processing node map comprises:

assigning a set of data groups to the first processing node based on a hashing algorithm, reassigning a subset of data groups of the set of data groups to one or more other processing nodes of the group of distributed processing nodes, and assigning the first processing node as a backup processing node for the subset of data groups, the method further comprising generating the second processing node map by assigning the set of data groups to the first processing node based on the hashing algorithm, wherein the subset of data groups is assigned to the first processing node as part of a search assignment.

Clause 26. The method of any of the previous clauses, wherein the map transition policy indicates that the group of distributed processing nodes are to transition from the first processing node map to the second processing node map based on a determination that a timing threshold is satisfied.

Clause 27. The method of any of the previous clauses, wherein the map transition policy indicates that the group of distributed processing nodes are to transition from the first processing node map to the second processing node map based on a determination that a quantity of cache misses by the first processing node with respect to the data group satisfies a cache-miss threshold.

Clause 28. The method of any of the previous clauses, wherein the map transition policy indicates that the group of distributed processing nodes are to transition from the first processing node map to the second processing node map based on a determination that a quantity of searches executed by the first processing node satisfies a search quantity threshold.

Clause 29. The method of any of the previous clauses, wherein the map transition policy indicates that the group of distributed processing nodes are to transition from the first processing node map to the second processing node map based on a determination that a quantity of times the first processing node has searched a data group from the fewer data groups satisfies a search quantity threshold.

Clause 30. A computing system of a data intake and query system, the computing system comprising:

memory; and one or more processors coupled to the memory and configured to:

receive an indication that a first processing node in combination with a set of one or more distributed processing nodes forms a group of distributed processing nodes;

based on the indication, generate a first processing node map, wherein the first processing node map indicates an assignment of at least one data group of a plurality of data groups to each processing node of the group of distributed processing nodes, wherein at least a portion of a data group of the plurality of data groups is stored in a remote shared storage system, wherein the first processing node map indicates an assignment of fewer data groups of the plurality of data groups to the first processing node than data groups of the plurality of data groups to other processing nodes of the group of distributed processing nodes;

manage data processed by the group of distributed processing nodes based on the first processing node map, wherein a particular processing node of the group of distributed processing nodes is configured to at least one of generate at least a portion of a particular data group or search at least a portion of the particular data group, wherein the first processing node map indicates an assignment of the particular data group to the particular processing node; and based on a map transition policy, transition from the first processing node map to a second processing node map, wherein based on the transition from the first processing node map to the second processing node map, the group of distributed processing nodes are configured to manage data based on the second processing node map, wherein the second processing node map indicates an assignment of at least one data group of the plurality of data groups to each processing node of the group of distributed processing nodes, and wherein the second processing node map indicates an assignment of more data groups of the plurality of data groups to the first processing node than the first processing node map.

Clause 31. Non-transitory computer readable media comprising computer-executable instructions that, when executed by a computing system of a data intake and query system, cause the computing system to:

receive an indication that a first processing node in combination with a set of one or more distributed processing nodes forms a group of distributed processing nodes;

based on the indication, generate a first processing node map, wherein the first processing node map indicates an assignment of at least one data group of a plurality of data groups to each processing node of the group of distributed processing nodes, wherein at least a portion of a data group of the plurality of data groups is stored in a remote shared storage system, wherein the first processing node map indicates an assignment of fewer data groups of the plurality of data groups to the first processing node than data groups of the plurality of data groups to other processing nodes of the group of distributed processing nodes;

manage data processed by the group of distributed processing nodes based on the first processing node map, wherein a particular processing node of the group of distributed processing nodes is configured to at least one of generate at least a portion of a particular data group or search at least a portion of the particular data group, wherein the first processing node map indicates an assignment of the particular data group to the particular processing node; and based on a map transition policy, transition from the first processing node map to a second processing node map, wherein based on the transition from the first processing node map to the second processing node map, the group of distributed processing nodes are configured to manage data based on the second processing node map, wherein the second processing node map indicates an assignment of at least one data group of the plurality of data groups to each processing node of the group of distributed processing nodes, and wherein the second processing node map indicates an assignment of more data groups of the plurality of data groups to the first processing node than the first processing node map.

Clause 32. A method, comprising:
receiving, at a search node of a plurality of search nodes of a query system, a processing node map identifier from a search head of the query system, wherein the processing node map identifier is received in response to a query received by the query system, wherein the query includes filter criteria to identify a set of data and processing criteria that indicates how to process the set of data;
identifying a plurality of data identifiers based on the processing node map identifier, wherein the plurality of data identifiers includes a first set of data identifiers received from a node coordinator and a second set of data identifiers generated by the search node;
identifying a plurality of data groups assigned to the search node based on the plurality of data identifiers, wherein a particular data identifier of the plurality of data identifiers identifies a particular data group of the plurality of data groups;
applying at least a portion of the filter criteria from the query to identify a set of data groups of the plurality of data groups to search; and
searching the set of data groups based on the query.

Clause 33. The method of Clause 32, wherein said identifying plurality of data identifiers comprises:
communicating the processing node map identifier to a node coordinator; and
receiving the first set of data identifiers responsive to the node coordinator receiving the processing node map identifier.

Clause 34. The method of any of Clauses 32 to 33, wherein said identifying plurality of data identifiers comprises:
communicating the processing node map identifier to a node coordinator; and
receiving the first set of data identifiers responsive to the node coordinator receiving the processing node map identifier,
wherein the method further comprises:
storing the first set of data identifiers locally for subsequent lookup.

Clause 35. The method of any of Clauses 32 to 34, wherein said identifying plurality of data identifiers comprises identifying the second set of data identifiers based on a review of the data stored locally.

Clause 36. The method of any of Clauses 32 to 35, wherein said identifying plurality of data identifiers comprises:
performing a lookup of the processing node map identifier in cache to identify the first set of data identifiers; and
performing a lookup of the second set of data at a location other than the cache.

Clause 37. The method of any of Clauses 32 to 36, wherein said identifying plurality of data identifiers comprises:
performing a lookup of the processing node map identifier in cache to identify the first set of data identifiers and the second set of identifiers.

Clause 38. The method of any of Clauses 32 to 37, wherein said receiving the processing node map identifier comprises receiving the processing node map identifier for a second time, the method further comprising:
receiving the processing node map identifier from the search head for a first time, wherein said receiving the processing node map identifier for the first time occurs prior to said receiving the processing node map identifier for the second time;
responsive to receiving the processing node map identifier for the first time, communicating the processing node map identifier to the node coordinator; and
receiving the first set of data identifiers responsive to the node coordinator receiving the processing node map identifier.

Clause 39. The method of any of Clauses 32 to 38, wherein said receiving the processing node map identifier comprises receiving the processing node map identifier for a second time, the method further comprising:
receiving the processing node map identifier from the search head for a first time, wherein said receiving the processing node map identifier for the first time occurs prior to said receiving the processing node map identifier for the second time;
responsive to receiving the processing node map identifier for the first time, communicating the processing node map identifier to the node coordinator;
receiving the first set of data identifiers responsive to the node coordinator receiving the processing node map identifier; and
storing, in cache, an indication of an association between the processing node map identifier and the first set of data identifiers.

Clause 40. The method of any of Clauses 32 to 39, wherein said receiving the processing node map identifier comprises receiving the processing node map identifier for a second time, the method further comprising:
receiving the processing node map identifier from the search head for a first time, wherein said receiving the processing node map identifier for the first time occurs prior to said receiving the processing node map identifier for the second time;

responsive to receiving the processing node map identifier for the first time, communicating the processing node map identifier to the node coordinator;

receiving the first set of data identifiers responsive to the node coordinator receiving the processing node map identifier; and storing, in cache, an indication of an association between the processing node map identifier and the first set of data identifiers, wherein in response to receiving the processing node map identifier from the search head at a later time the search node perform of lookup of the processing node map identifier to obtain first set of data identifiers.

Clause 41. The method of any of Clauses 32 to 40, wherein said receiving the processing node map identifier comprises receiving the processing node map identifier for a second time, the method further comprising:

receiving the processing node map identifier from the search head for a first time, wherein said receiving the processing node map identifier for the first time occurs prior to said receiving the processing node map identifier for the second time;

responsive to receiving the processing node map identifier for the first time, communicating the processing node map identifier to the node coordinator;

receiving the first set of data identifiers responsive to the node coordinator receiving the processing node map identifier; and storing, in cache, an indication of an association between the processing node map identifier and the first set of data identifiers, wherein said identifying plurality of data identifiers comprises performing a lookup of the processing node map identifier in the cache to identify the first set of data identifiers.

Clause 42. The method of any of Clauses 32 to 41, further comprising:

processing a first data group, wherein the first data group is associated with a first data identifier; and storing an indication of the first data identifier in cache, wherein said identifying plurality of data identifiers comprises performing a lookup of the processing node map identifier in cache to identify the first data identifier.

Clause 43. The method of any of Clauses 32 to 42, further comprising:

downloading at least one data group of the plurality of data groups from a shared storage system.

Clause 44. The method of any of Clauses 32 to 43, further comprising:

downloading at least one data group of the plurality of data groups from a shared storage system, wherein the at least one data group corresponds to at least one data identifier of the first set of data identifiers.

Clause 45. The method of any of Clauses 32 to 44, further comprising:

downloading at least one data group of the plurality of data groups from a shared storage system, wherein the at least one data group corresponds to at least one data identifier of the first set of data identifiers, wherein the shared storage system is cloud storage.

Clause 46. The method of any of Clauses 32 to 45, further comprising:

downloading at least one data group of the plurality of data groups from a shared storage system, wherein the at least one data group corresponds to at least one data identifier of the first set of data identifiers, wherein the shared storage system is S3.

Clause 47. The method of any of Clauses 32 to 46, wherein said applying the at least a portion of the filter criteria from the query to identify the set of data groups of the plurality of data groups to search comprises comparing the filter criteria to information stored in the plurality of data groups.

Clause 48. The method of any of Clauses 32 to 47, wherein the plurality of data groups comprises a plurality of field-searchable time series buckets.

Clause 49. The method of any of Clauses 32 to 48, wherein the plurality of data groups comprises a plurality of field-searchable time series buckets, wherein each bucket of the plurality of field-searchable time series buckets comprises a plurality of events and an inverted index corresponding to the plurality of events.

Clause 50. A computing system of a data intake and query system, the computing system comprising:

memory; and one or more processors coupled to the memory and configured to:

receive, at a search node of a plurality of search nodes of a query system, a processing node map identifier from a search head of the query system, wherein the processing node map identifier is received in response to a query received by the query system, wherein the query includes filter criteria to identify a set of data and processing criteria that indicates how to process the set of data;

identify a plurality of data identifiers based on the processing node map identifier, wherein the plurality of data identifiers includes a first set of data identifiers received from a node coordinator and a second set of data identifiers generated by the search node;

identify a plurality of data groups assigned to the search node based on the plurality of data identifiers, wherein a particular data identifier of the plurality of data identifiers identifies a particular data group of the plurality of data groups;

apply at least a portion of the filter criteria from the query to identify a set of data groups of the plurality of data groups to search; and search the set of data groups based on the query.

Clause 51. Non-transitory computer readable media comprising computer-executable instructions that, when executed by a computing system of a data intake and query system, cause the computing system to:

receive, at a search node of a plurality of search nodes of a query system, a processing node map identifier from a search head of the query system, wherein the processing node map identifier is received in response to a query received by the query system, wherein the query includes filter criteria to identify a set of data and processing criteria that indicates how to process the set of data;

identify a plurality of data identifiers based on the processing node map identifier, wherein the plurality of data identifiers includes a first set of data identifiers received from a node coordinator and a second set of data identifiers generated by the search node;

identify a plurality of data groups assigned to the search node based on the plurality of data identifiers, wherein a particular data identifier of the plurality of data identifiers identifies a particular data group of the plurality of data groups;

apply at least a portion of the filter criteria from the query to identify a set of data groups of the plurality of data groups to search; and search the set of data groups based on the query.

Clause 52. A method, comprising:

receiving an indication that a first processing node in combination with a set of one or more distributed processing nodes forms a group of distributed processing nodes, wherein the set of one or more distributed processing nodes is associated with a plurality of data groups for search purposes and backup purposes, wherein at least one data group of the plurality of data groups is assigned to a particular processing node of the set of one or more distributed processing nodes for search purposes and a different data group of the plurality of data groups is assigned to the particular processing node for backup purposes;

based on said receiving the indication, reassigning a first data group of the plurality of data groups to the first processing node for search purposes and reassigning a second data group of the plurality of data groups to the first processing node for backup purposes, wherein based on the reassigning the first data group and the second data group, the first processing node is configured to execute searches on at least a portion of the first data group and copy at least a portion of the second data group from a shared storage system, wherein the at least a portion of the second data group is at least one of generated by another processing node of the group of distributed processing nodes, stored to the shared storage system by the another processing node, or searched by the another processing node; and based on an assignment transition policy, reassigning the second data group to the first processing node for search processes, wherein based on the reassigning the second data group to the first processing node for search processes, the first processing node is configured to execute searches on at least a portion of the first data group and on at least a portion of the second data group.

Clause 53. The method of Clause 52, wherein each of the plurality of data groups is a partition, and wherein each partition of the plurality of partitions includes a plurality of buckets.

Clause 54. The method of any of Clauses 52 to 53, wherein the second data group is a partition that includes a plurality of buckets, wherein responsive to said reassigning the second data group to the first processing node for backup purposes, the first processing node does not execute searches on the plurality of buckets of the partition, wherein responsive to said reassigning the second data group to the first processing node for search purposes, the first processing node executes searches on at least a portion of the plurality of buckets of the partition.

Clause 55. The method of any of Clauses 52 to 54, wherein the second data group is a partition that includes a plurality of buckets, wherein responsive to said reassigning the second data group to the first processing node for backup purposes, the first processing node downloads one or more buckets of the plurality of buckets of the partition.

Clause 56. The method of any of Clauses 52 to 55, wherein the first data group is a partition that includes a plurality of buckets, wherein responsive to said reassigning the second data group to the first processing node for backup purposes, the first processing node generates one or more buckets for the first partition.

Clause 57. The method of any of Clauses 52 to 56, wherein the first data group is a partition that includes a first plurality of buckets, wherein the second data group is a partition that includes a second plurality of buckets, wherein responsive to said reassigning the second data group to the first processing node for search purposes, the first processing node generates one or more buckets for the first partition and one or more buckets for the second partition.

Clause 58. The method of any of Clauses 52 to 57, wherein each of the plurality of data groups is a bucket.

Clause 59. The method of any of Clauses 52 to 58, wherein the second data group comprises a plurality of buckets, and wherein responsive to said reassigning the second data group to the first processing node for backup purposes, the first processing node does not execute searches on the plurality of buckets.

Clause 60. The method of any of Clauses 52 to 59, wherein the second data group comprises a plurality of buckets, and wherein responsive to said reassigning the second data group to the first processing node for backup purposes, the first processing node downloads one or more of the plurality of buckets.

Clause 61. The method of any of Clauses 52 to 60, wherein the shared storage system is accessible by any one of the group of distributed processing nodes.

Clause 62. The method of any of Clauses 52 to 61, wherein the indication is based on a determination that the first processing node has been activated and is available to execute queries.

Clause 63. The method of any of Clauses 52 to 62, wherein the assignment transition policy indicates that the second data group is to be reassigned to the first processing node based on a determination that a timing threshold is satisfied Clause 64. The method of any of Clauses 52 to 63, wherein the assignment transition policy indicates that the second data group is to be reassigned to the first processing node based on a determination that a quantity of cache misses by the first processing node with respect to the first data group satisfies a cache-miss threshold.

Clause 65. The method of any of Clauses 52 to 64, wherein the assignment transition policy indicates that the second data group is to be reassigned to the first processing node based on a determination that a quantity of searches executed by the first processing node satisfies a search quantity threshold.

Clause 66. The method of any of Clauses 52 to 65, wherein the assignment transition policy indicates that the second data group is to be reassigned to the first processing node based on a determination that a quantity of times the first processing node has searched data from the first data group satisfies a search quantity threshold Clause 67. The method of any of Clauses 52 to 66, wherein prior to receiving the indication associated with the first processing node, the first data group is assigned to one processing node of the set of one or more distributed processing nodes for search purposes and assigned one or more processing nodes of the set of one or more distributed processing for backup purposes.

Clause 68. The method of any of Clauses 52 to 67, wherein prior to receiving the indication associated with the first processing node, the second data group is assigned to one processing node of the set of one or more distributed processing nodes for search purposes and assigned one or more processing nodes of the set of one or more distributed processing for backup purposes.

Clause 69. The method of any of Clauses 52 to 68, wherein based on the assignment transition policy, a second processing node of the group of distributed processing node is configured to execute searches on at least a portion of the second data group.

Clause 70. The method of any of Clauses 52 to 69,
wherein prior to receiving the indication associated with the first processing node, the second data group is assigned to a second processing node of the set of one or more distributed processing nodes for search purposes, and
wherein based on the assignment transition policy, the second processing node remains assigned to the second processing node for search purposes.

Clause 71. The method of any of Clauses 52 to 70, further comprising:
based on the assignment transition policy, reassigning the second data group to the second processing node for backup processes.

Clause 72. The method of any of Clauses 52 to 71, further comprising:
based on said receiving the indication, reassigning a first data group of the plurality of data groups to one or more processing nodes of the set of one or more distributed processing nodes for backup purposes.

Clause 73. The method of any of Clauses 52 to 72, further comprising:
based on said receiving the indication, reassigning a first data group of the plurality of data groups to one or more processing nodes of the set of one or more distributed processing nodes for backup purposes, wherein prior to said receiving the indication the one or more processing nodes the first data group of the plurality of data groups was assigned to the one or more processing nodes for search purposes.

Clause 74. The method of any of Clauses 52 to 73, wherein only the first data group of the plurality of data groups is assigned to the first processing node based on said receiving the indication.

Clause 75. A computing system of a data intake and query system, the computing system comprising:
memory; and
one or more processors coupled to the memory and configured to:
receive an indication that a first processing node in combination with a set of one or more distributed processing nodes forms a group of distributed processing nodes,
wherein the set of one or more distributed processing nodes is associated with a plurality of data groups for search purposes and backup purposes,
wherein at least one data group of the plurality of data groups is assigned to a particular processing node of the set of one or more distributed processing nodes for search purposes and a different data group of the plurality of data groups is assigned to the particular processing node for backup purposes;
based on the indication, reassign a first data group of the plurality of data groups to the first processing node for search purposes and reassign a second data group of the plurality of data groups to the first processing node for backup purposes,
wherein based on the reassignment of the first data group and the second data group, the first processing node is configured to execute searches on at least a portion of the first data group and copy at least a portion of the second data group from a shared storage system, wherein the at least a portion of the second data group is at least one of generated by another processing node of the group of distributed processing nodes, stored to the shared storage system by the another processing node, or searched by the another processing node; and
based on an assignment transition policy, reassign the second data group to the first processing node for search processes, wherein based on the reassignment of the second data group to the first processing node for search processes, the first processing node is configured to execute searches on at least a portion of the first data group and on at least a portion of the second data group.

Clause 76. Non-transitory computer readable media comprising computer-executable instructions that, when executed by a computing system of a data intake and query system, cause the computing system to:
receive an indication that a first processing node in combination with a set of one or more distributed processing nodes forms a group of distributed processing nodes,
wherein the set of one or more distributed processing nodes is associated with a plurality of data groups for search purposes and backup purposes,
wherein at least one data group of the plurality of data groups is assigned to a particular processing node of the set of one or more distributed processing nodes for search purposes and a different data group of the plurality of data groups is assigned to the particular processing node for backup purposes;
based on the indication, reassign a first data group of the plurality of data groups to the first processing node for search purposes and reassign a second data group of the plurality of data groups to the first processing node for backup purposes,
wherein based on the reassignment of the first data group and the second data group, the first processing node is configured to execute searches on at least a portion of the first data group and copy at least a portion of the second data group from a shared storage system, wherein the at least a portion of the second data group is at least one of generated by another processing node of the group of distributed processing nodes, stored to the shared storage system by the another processing node, or searched by the another processing node; and
based on an assignment transition policy, reassign the second data group to the first processing node for search processes, wherein based on the reassignment of the second data group to the first processing node for search processes, the first processing node is configured to execute searches on at least a portion of the first data group and on at least a portion of the second data group.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components of the data intake and query system 108 or 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 or 108 by managing computing resources configured to implement various aspects of the system (e.g., search head 210, indexers 206, etc.) and by providing access to the system to end users via a network.

When implemented as a cloud-based service, various components of the system 108 can be implemented using containerization or operating-system-level virtualization, or other virtualization technique. For example, one or more components of the system 108 (e.g., search head 210, indexers 206, etc.) can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. A method comprising:
   identifying a plurality of processing nodes;
   generating a first processing node map, wherein the first processing node map indicates an assignment of a first subset of a plurality of data groups to a processing node of the plurality of processing nodes, wherein the processing node is configured to at least one of generate at least a portion of a first data group of the first subset of the plurality of data groups or search the at least the portion of the first data group based at least in part on the first processing node map; and
   based on a map transition policy, transitioning from the first processing node map to a second processing node map, wherein the second processing node map indicates an assignment of a second subset of the plurality of data groups to the processing node, wherein the second subset of the plurality of data groups includes a greater number of data groups as compared to the first subset of the plurality of data groups, wherein the processing node is configured to at least one of generate at least a portion of a second data group of the second subset of the plurality of data groups or search the at least the portion of the second data group based at least in part on the second processing node map.

2. The method of claim 1, wherein each of the plurality of data groups is a partition, and wherein each partition includes a plurality of buckets.

3. The method of claim 1, wherein each of the plurality of data groups is a bucket.

4. The method of claim 1 further comprising transitioning from the second processing node map to a third processing node map, wherein the third processing node map indicates an assignment of a third subset of the plurality of data groups to the processing node.

5. The method of claim 1, wherein the first processing node map is used during a first time period, and the second processing node map is used during a second time period that follows the first time period.

6. The method of claim 1, further comprising executing queries on data using the first processing node map during a first time period and executing queries on data using the second processing node map during a second time period.

7. The method of claim 1, wherein the first processing node map indicates an assignment of only one data group of the plurality of data groups to the processing node.

8. The method of claim 1, wherein the first processing node map indicates an assignment of fewer data groups of the plurality of data groups to the processing node than any other processing node of the plurality of processing nodes.

9. The method of claim 1, wherein at least a portion of a data group of the plurality of data groups is stored in a remote shared storage system.

10. The method of claim 1, wherein the first processing node map indicates an assignment of at least one first data group to the processing node as a search assignment and at least one second data group to the processing node as a backup assignment.

11. The method of claim 1,
wherein the first processing node map indicates an assignment of at least one first data group to the processing node as a search assignment and at least one second data group to the processing node as a backup assignment,
wherein the processing node stores a copy of the at least one first data group to a shared storage system and downloads a copy of the at least one second data group from the shared storage system.

12. The method of claim 1, wherein generating the first processing node map comprises assigning the first subset of the plurality of data groups to the processing node based on a hashing algorithm.

13. The method of claim 1, wherein the map transition policy indicates to transition from the first processing node map to the second processing node map based on a determination that a timing threshold is satisfied.

14. The method of claim 1, wherein the map transition policy indicates to transition from the first processing node map to the second processing node map based on a determination that a quantity of cache misses by the processing node satisfies a cache-miss threshold.

15. The method of claim 1, wherein the map transition policy indicates to transition from the first processing node map to the second processing node map based on a determination that a quantity of searches executed by the processing node satisfies a search quantity threshold.

16. A computing system of a data intake and query system, the computing system comprising:
memory; and
one or more processors coupled to the memory and configured to:
identify a plurality of processing nodes;
generate a first processing node map, wherein the first processing node map indicates an assignment of a first subset of a plurality of data groups to a processing node of the plurality of processing nodes, wherein the processing node is configured to at least one of generate at least one of a portion of a first data group of the first subset of the plurality of data groups or search the at least the portion of the first data group based at least in part on the first processing node map; and
based on a map transition policy, transition from the first processing node map to a second processing node map, wherein the second processing node map indicates an assignment of a second subset of the plurality of data groups to the processing node, wherein the second subset of the plurality of data groups includes a greater number of data groups as compared to the first subset of the plurality of data groups, wherein the processing node is configured to at least one of generate at least the portion of a second data group of the second subset of the plurality of data groups or search the at least a portion of the second data group based at least in part on the second processing node map.

17. The computing system of claim 16,
wherein the first processing node map indicates an assignment of at least one first data group to the processing node as a search assignment and at least one second data group to the processing node as a backup assignment,
wherein the processing node stores a copy of the at least one first data group to a shared storage system and downloads a copy of the at least one second data group from the shared storage system.

18. Non-transitory computer readable media comprising computer-executable instructions that, when executed by a computing system of a data intake and query system, cause the computing system to:
identify a plurality of processing nodes;
generate a first processing node map, wherein the first processing node map indicates an assignment of a first subset of a plurality of data groups to a processing node of the plurality of processing nodes, wherein the processing node is configured to at least one of generate at least a portion of a first data group of the first subset of the plurality of data groups or search the at least the portion of the first data group based at least in part on the first processing node map; and
based on a map transition policy, transition from the first processing node map to a second processing node map, wherein the second processing node map indicates an assignment of a second subset of the plurality of data groups to the processing node, wherein the second subset of the plurality of data groups includes a greater number of data groups as compared to the first subset of the plurality of data groups, wherein the processing node is configured to at least one of generate at least a portion of a second data group of the second subset of the plurality of data groups or search the at least the portion of the second data group based at least in part on the second processing node map.

19. The non-transitory computer readable media of claim 18, wherein the first processing node map is used during a first time period, and the second processing node map is used during a second time period that follows the first time period.

20. The non-transitory computer readable media of claim 18, wherein the first processing node map indicates an assignment of only one data group of the plurality of data groups to the processing node.

* * * * *